United States Patent
Yasugi et al.

(10) Patent No.: US 10,972,732 B2
(45) Date of Patent: Apr. 6, 2021

(54) IMAGE DECODING APPARATUS, IMAGE CODING APPARATUS, IMAGE DECODING METHOD, AND IMAGE CODING METHOD

(71) Applicants: SHARP KABUSHIKI KAISHA, Sakai (JP); FG Innovation Company Limited, Hong Kong (CN)

(72) Inventors: Yukinobu Yasugi, Sakai (JP); Tomohiro Ikai, Sakai (JP); Yoshiya Yamamoto, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 16/328,690

(22) PCT Filed: Aug. 7, 2017

(86) PCT No.: PCT/JP2017/028642
§ 371 (c)(1),
(2) Date: Feb. 26, 2019

(87) PCT Pub. No.: WO2018/037896
PCT Pub. Date: Mar. 1, 2018

(65) Prior Publication Data
US 2019/0208201 A1 Jul. 4, 2019

(30) Foreign Application Priority Data

Aug. 26, 2016 (JP) .............................. JP2016-166320
Sep. 27, 2016 (JP) .............................. JP2016-188789

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/11* (2014.11);
(Continued)

(58) Field of Classification Search
CPC .... H04N 19/119; H04N 19/593; H04N 19/70; H04N 19/463; H04N 19/105;
(Continued)

(56) References Cited

U.S. PATENT DOCUMENTS

| 10,230,961 B2* | 3/2019 | Liu .................. H04N 19/159 |
| 2014/0140404 A1* | 5/2014 | Liu .................. H04N 19/105 |
| | | 375/240.12 |

(Continued)

FOREIGN PATENT DOCUMENTS

| CN | 102857763 A | 1/2013 |
| CN | 103636208 A | 3/2014 |

OTHER PUBLICATIONS

Jun Xu et al.,"Non-CE6: Improvements for SDIP", JCTVC-G354, Joint Collaborative Team on Video Coding(JCT-VC) of ITU-T SG16 WP3 and ISO/IEC JTC1/SC29/WG11 7th Meeting: Geneva, CH, Nov. 21-30, 2011 (Year: 2011).*

(Continued)

*Primary Examiner* — Dramos Kalapodas
(74) *Attorney, Agent, or Firm* — ScienBiziP, P.C.

(57) ABSTRACT

An image decoding apparatus includes: an MPM candidate list deriving unit that derives an MPM candidate list by adding a plurality of different intra prediction modes to the MPM candidate list based on a shape of a target block, and an MPM parameter decoding unit decoding parameters for deriving the intra-prediction modes from the MPM candidate list.

12 Claims, 34 Drawing Sheets

(51) Int. Cl.
  *H04N 19/593* (2014.01)
  *H04N 19/70* (2014.01)
  *H04N 19/463* (2014.01)
  *H04N 19/11* (2014.01)
  *H04N 19/159* (2014.01)
  *H04N 19/176* (2014.01)
  *H04N 19/96* (2014.01)

(52) U.S. Cl.
  CPC ......... *H04N 19/159* (2014.11); *H04N 19/176* (2014.11); *H04N 19/463* (2014.11); *H04N 19/593* (2014.11); *H04N 19/70* (2014.11); *H04N 19/96* (2014.11)

(58) Field of Classification Search
  CPC .... H04N 19/11; H04N 19/159; H04N 19/176; H04N 19/96; H04N 19/167; H04N 19/126; H04N 19/186; H04N 19/124; H04N 19/61
  See application file for complete search history.

(56) References Cited

U.S. PATENT DOCUMENTS

| | | | |
|---|---|---|---|
| 2016/0065960 | A1 | 3/2016 | Kondo |
| 2017/0339404 | A1* | 11/2017 | Panusopone ......... H04N 19/107 |
| 2017/0347095 | A1* | 11/2017 | Panusopone ........... H04N 19/96 |
| 2017/0347096 | A1* | 11/2017 | Hong .................... H04N 19/70 |
| 2017/0347102 | A1* | 11/2017 | Panusopone ....... H04N 19/1883 |
| 2017/0347103 | A1* | 11/2017 | Yu ...................... H04N 19/1883 |
| 2017/0347128 | A1* | 11/2017 | Panusopone ......... H04N 19/174 |
| 2019/0104322 | A1* | 4/2019 | Tsukuba ............... H04N 19/176 |
| 2019/0166370 | A1* | 5/2019 | Xiu ....................... H04N 19/147 |
| 2019/0373287 | A1* | 12/2019 | Lim ....................... H04N 19/46 |

OTHER PUBLICATIONS

Jianle Chen et al.,: "Algorithm Description of Joint Exploration Test Model 2" Doc. JVET-B1001_v3, San Diego, Feb. 20-26, 2016 (Year: 2016).*

Vadim Seregin et al., "Block shape dependent intra mode coding", JVET-Do114r1, Joint Video Exploration Team (JVET) of ITU-T SG 16 WP3 and ISO/IEC JTC 1/SC29/WG 11 4th Meeting: Chengdu, CN, Oct. 15-21, 2016.

Jianle Chen et al., "Algorithm Description of Joint Exploration Test Model 2", JVET-B1001_v3, Joint Video Exploration Team (JVET) of ITU-T SG 16 WP 3 and ISO/IEC JTC 1/SC 29/WG 11, 2nd Meeting: San Diego, USA, Feb. 20-26, 2016.

Jianle Chen et al., "Algorithm Description of Joint Exploration Test Model 3", JVET-C1001_v3, Joint Video Exploration Team (JVET)of ITU-T SG 16 WP3 and ISO/IEC JTC 1/SC 29/WG 11 3rd Meeting: Geneva, CH, May 26-Jun. 1, 2016.

Jun Xu et al., "Non-CE6: Improvements for SDIP", JCTVC-G354r2, Joint Collaborative Team of Video Coking (JCT-VC) of ITU-T SG16 WP3 and ISO/IEC JTC1/SC29WG11 7th Meeting: Geneva, CH, Nov. 21-30, 2011.

Jianle Chen et al., "Algorithm Description of Joint Exploration Test Model 2", JVET-B1001, Joint Video Exploration Team(JVET) of ITU-SG 16 WP 3 and ISO/IEC JTC 1/SC 29/WG 11 2nd Meeting: San Diego, USA, Feb. 20-26, 2016.

Jun Xu et al., "Non-CE6: Improvements for SDIP", JCTVC-G354, Joint Collaborative Team on Video Coding(JCT-VC) of ITU-T SG16 WP3 and ISO/IEC JTC1/SC29/WG11 7th Meeting: Geneva, CH, Nov. 21-30, 2011.

* cited by examiner

FIG. 2A CODING VIDEO SEQUENCE 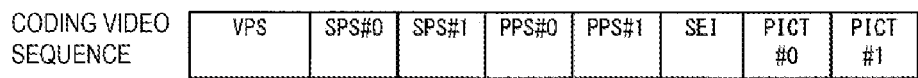
FIG. 2B CODING PICTURE 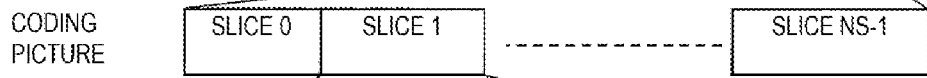
FIG. 2C CODING SLICE 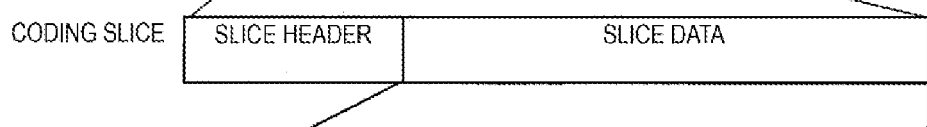
FIG. 2D CODING SLICE DATA 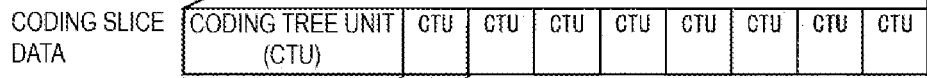
FIG. 2E CODING TREE UNIT
FIG. 2F CODING UNIT
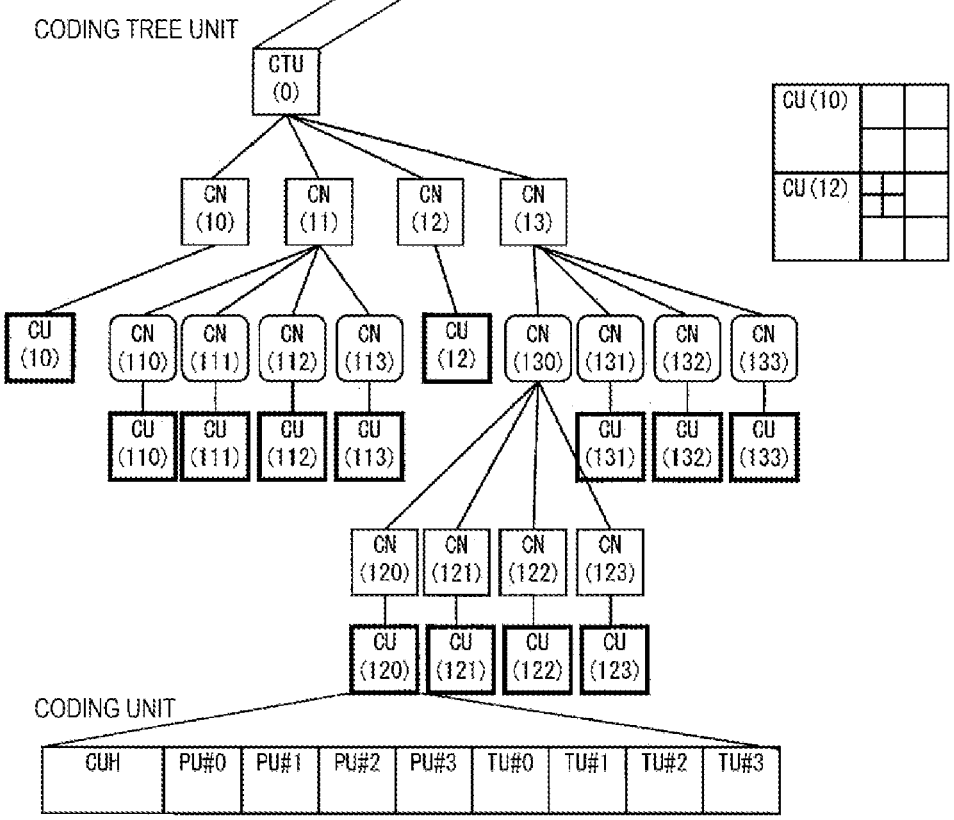

2Nx2N

2NxN

2NxnU

2NxnD

Nx2N nLx2N nRx2N

NxN

TIME (POC)

| coding_unit( x0, y0, log2CbWidth, log2CbHeight ) { | Descriptor |
|---|---|
| < (OMITTED: SYNTAX WHEN FLAG AND SKIP) > | |
| {   // ONLY WHEN NOT IN SKIP MODE | |
|   if( slice_type != I ) | |
|     pred_mode_flag | ae(v) |
|   if( isLuma ) | |
|     if( pdpc_enabled_flag && CuPredMode[ x0 ][ y0 ] != MODE_INTER ) | |
|       pdpc_flag[ x0 ][ y0 ] | ae(v) |
|   if( CuPredMode[ x0 ][ y0 ] == MODE_INTRA ) { | |
|     < (OMITTED: PCM ENCODING INFORMATION) > | |
|     {   // ONLY WHEN IT IS NOT PCM ENCODING | |
|       if( isLuma ) { | |
|         prev_intra_luma_pred_flag[ x0 ][ y0 ] | ae(v) |
|         if( prev_intra_luma_pred_flag[ x0 ][ y0 ] ) | |
|           mpm_idx[ x0 ][ y0 ] | ae(v) |
|         else { | |
|           rem_selected_mode_flag[ x0 ][ y0 ] | ae(v) |
|           if( selected_mode_flag ) | |
|             rem_selected_mode[ x0 ][ y0 ] | ae(v) |
|           else | |
|             rem_non_selected_mode[ x0 ][ y0 ] | ae(v) |
|         } | |
|       if( chromaArrayType != 0 && ( isChroma || slice_type != I ) ) { | |
|         not_dm_chroma_flag[ x0 ][ y0 ] | ae(v) |
|         if( not_dm_chroma_flag[ x0 ][ y0 ] ) { | |
|           if( cross_component_prediction_enabled_flag ) | |
|             not_lm_chroma_flag[ x0 ][ y0 ] | ae(v) |
|           if( not_lm_chroma_flag[ x0 ][ y0 ] ) | |
|             chroma_intra_mode_idx[ x0 ][ y0 ] | ae(v) |
|         } | |
|       } | |
|     } | |
|   } else { | |
|     < (OMITTED: INTER PREDICTION MODE INFORMATION) > | |
|   } | |
|   < (OMITTED: CONVERSION COEFFICIENT INFORMATION) > | |
| } | |
| } | |

(INTRA PREDICTION PARAMETERS bracket spans from "// ONLY WHEN IT IS NOT PCM ENCODING" through the closing braces)

FIG. 13

| // INTRA PREDICTION PARAMETERS | Descriptor |
|---|---|
| if( isLuma ) { | |
|     prev_intra_luma_pred_flag[ x0 ][ y0 ] | ae(v) |
|     if( prev_intra_luma_pred_flag[ x0 ][ y0 ] ) | |
|         mpm_idx[ x0 ][ y0 ] | ae(v) |
|     else { | |
|         rem_selected_mode_flag[ x0 ][ y0 ] | ae(v) |
|         if( selected_mode_flag ) | |
|             rem_selected_mode[ x0 ][ y0 ] | ae(v) |
|         else | |
|             rem_non_selected_mode[ x0 ][ y0 ] | ae(v) |
|     } | |
| if( chromaArrayType != 0 && ( isChroma || slice_type != I ) ) { | |
|     not_dm_chroma_flag[ x0 ][ y0 ] | ae(v) |
|     if( not_dm_chroma_flag[ x0 ][ y0 ] ) { | |
|         if( cross_component_prediction_enabled_flag ) | |
|         not_lm_chroma_flag[ x0 ][ y0 ] | ae(v) |
|         if( not_lm_chroma_flag[ x0 ][ y0 ] ) | |
|         chroma_intra_mode_idx[ x0 ][ y0 ] | ae(v) |
|     } | |
| } | |

FIG. 14

(3) PLANAR
(4) DC (3) PLANAR
(4) DC (3) PLANAR
(4) DC (3) PLANAR
(4) DC

FIG. 27A
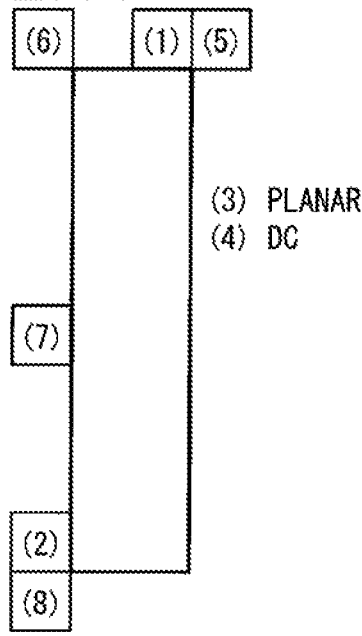
(3) PLANAR
(4) DC
FIG. 27B
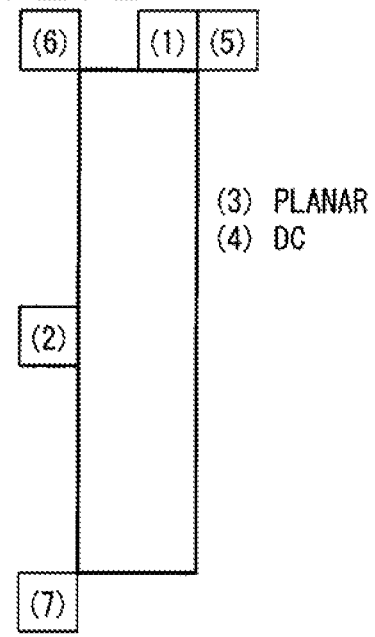
(3) PLANAR
(4) DC
FIG. 28
| | k= | 0 | 1 | 2 | 3 | 4 |
|---|---|---|---|---|---|---|
| EACH BIT ($b_k$) of mpm_idx : | | $b_0$ | $b_1$ | $b_2$ | $b_3$ | $b_4$ |
| CONTEXT ($c_k$) TO USE WHEN DECODING $b_k$ | | $c_0$ | $c_1$ | $c_2$ | (EP) | (EP) |
FIG. 29A
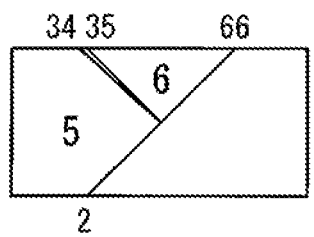
FIG. 29B
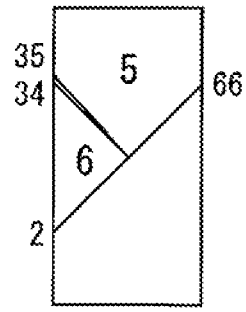

IMAGE DECODING APPARATUS, IMAGE CODING APPARATUS, IMAGE DECODING METHOD, AND IMAGE CODING METHOD

TECHNICAL FIELD

The disclosure relates to an image decoding apparatus, an image coding apparatus, an image decoding method, and an image coding method.

BACKGROUND ART

For efficiently transmitting or recording a video, an image coding apparatus that generates coding data by coding a video, and an image decoding apparatus that generates a decoded image by decoding the coding data are used.

Specific examples of video coding method include methods proposed in H.264/AVC or High-Efficiency Video Coding (HEVC), and the like.

In such a video coding method, an image (picture) constituting a video is managed by a hierarchical structure including a slice obtained by dividing an image, a coding unit obtained by dividing a slice (may be referred to as a Coding Unit: CU), and a Prediction Unit (PU) and a Transformation Unit (TU), which are blocks obtained by dividing the coding unit, and the coding/decoding is performed for each CU.

Further, in such a video coding system, generally, a prediction image is generated based on a locally decoded image obtained by coding/decoding an input image, and a prediction residual (also referred to as "difference image" or "residual image") obtained by subtracting the prediction image from the input image (original image) is coded. Examples of method for generating the prediction image include inter-picture prediction (inter prediction) and intra-picture prediction (intra prediction).

In addition, techniques of video coding and decoding in recent years include Non Patent Literature 1.

Furthermore, in recent years, as a division method of a Coding Tree Unit (CTU) constituting a slice, in addition to the QT division for dividing the CTU into quad tree, Binary Tree (BT) division for dividing the CTU into binary tree has been introduced. This BT division includes horizontal division and vertical division.

As described above, in the QTBT division in which the BT division is performed in addition to the QT division, the type of the CU shape is greatly increased as compared with the known case. Therefore, various block shapes or combinations of them which are different from known ones, have been generated.

CITATION LIST

Non Patent Literature

Non Patent Literature 1: "Algorithm Description of Joint Exploration Test Model 2", JVET-B1002, Joint Video Exploration Team (JVET) of ITU-T SG 16 WP 3 and ISO/IEC JTC 1/SC 29/WG 11, 20-26 Feb. 2016

SUMMARY

Technical Problem

In QTBT division, CUs of various shapes (aspect ratios) can be generated as follows.

Square, vertically long (1:2, 1:4, 1:8, and the like), horizontally long (2:1, 4:1, 8:1, and the like)

Then, the CUs of vertically long or horizontally long are often used to represent continuous edges such as contour lines, and their prediction directions are relatively often close to the prediction direction used for the upper adjacent CU if the CU is vertically long, and close to the prediction direction used for the left adjacent CU if the CU is horizontally long. However, in the related art, the difference in shape is not fully considered, and there is room for improvement in coding efficiency. Therefore, an object of the disclosure is to improve coding efficiency or decoding efficiency of CU obtained by picture division such as the QTBT division compared to the related art.

Solution to Problem

An image decoding apparatus according to one aspect of the disclosure configured to perform an intra prediction with respect to a block obtained by preforming a QTBT division which performs a binary tree division in addition to a quad tree division when dividing a picture and decode the picture, includes:

a candidate list deriving unit configured to derive a candidate list by adding a plurality of mutually different intra prediction modes to the candidate list based on a shape of the block, and a parameter decoding unit configured to decode a parameter for deriving an intra prediction mode from the candidate list.

An image decoding apparatus according to one aspect of the disclosure configured to perform an intra prediction with respect to a block obtained by preforming a QTBT division which performs a binary tree division in addition to a quad tree division when dividing a picture and decode the picture, includes:

a candidate list deriving unit configured to derive a candidate list by changing the number of one or a plurality of mutually different intra prediction modes added to the candidate list or a context of an intra prediction parameter, based on a shape of the block or the number of times of division performed until the block is obtained, and a parameter decoding unit configured to decode a parameter for deriving an intra prediction mode from the candidate list.

An image decoding apparatus according to one aspect of the disclosure configured to perform an intra prediction with respect to a block obtained by preforming a QTBT division which performs a binary tree division in addition to a quad tree division when dividing a picture and decode the picture, includes:

an intra prediction parameter decoding control unit configured to change an association between a prediction direction and a mode number in an intra prediction mode based on a shape of the block, and a parameter decoding unit that decodes a parameter for deriving the intra prediction mode by referring to the association.

An image coding apparatus according to one aspect of the disclosure configured to perform an intra prediction with respect to a block obtained by preforming a QTBT division which performs a binary tree division in addition to a quad tree division when dividing a picture and code the picture, includes:

a candidate list deriving unit configured to derive a candidate list by adding a plurality of mutually different intra prediction modes to the candidate list based on a shape of the block, and a parameter deriving unit configured to derive a parameter for deriving an intra prediction mode from the candidate list.

An image coding apparatus according to one aspect of the disclosure configured to perform an intra prediction with respect to a block obtained by preforming a QTBT division which performs a binary tree division in addition to a quad tree division when dividing a picture and the picture, includes:

a candidate list deriving unit configured to derive a candidate list by changing a number of one or a plurality of mutually different intra prediction modes adding to the candidate list or a context of an intra prediction parameter, based on a shape of the block or the number of times of division performed until the block is obtained, and a parameter deriving unit configured to derive a parameter for deriving an intra prediction mode from the candidate list.

An image coding apparatus according to one aspect of the disclosure configured to perform an intra prediction with respect to a block obtained by preforming a QTBT division which performs a binary tree division in addition to a quad tree division when dividing a picture and decode the picture, includes:

an intra prediction parameter coding control unit configured to change an association between a prediction direction and a mode number in an intra prediction mode based on a shape of the block, and a parameter deriving unit configured to derive a parameter for deriving an intra prediction mode by referring to the association.

An image decoding method according to one aspect of the disclosure, for performing an intra prediction with respect to a block obtained by preforming a QTBT division which performs a binary tree division in addition to a quad tree division when dividing a picture, and decoding the picture, includes:

a candidate list deriving step for deriving a candidate list by adding a plurality of mutually different intra prediction modes to the candidate list based on a shape of the block, a parameter decoding step for decoding a parameter for deriving an intra prediction mode from the candidate list.

An image decoding method according to one aspect of the disclosure, for performing an intra prediction with respect to a block obtained by preforming a QTBT division which performs a binary tree division in addition to a quad tree division when dividing a picture, and decoding the picture, includes:

a candidate list deriving step for deriving a candidate list by changing the number of one or a plurality of mutually different intra prediction modes added to the candidate list or a context of an intra prediction parameter, based on a shape of the block or the number of times of division performed until the block is obtained, and a parameter decoding step for decoding a parameter for deriving an intra prediction mode from the candidate list.

An image decoding method according to one aspect of the disclosure, for performing an intra prediction with respect to a block obtained by preforming a QTBT division which performs a binary tree division in addition to a quad tree division when dividing a picture, and decoding the picture, includes:

an intra prediction parameter decoding control step for changing an association between a prediction direction and a mode number in an intra prediction mode based on a shape of the block, and a parameter decoding step for decoding a parameter for deriving the intra prediction mode by referring to the association.

An image coding method according to one aspect of the disclosure, for performing an intra prediction with respect to a block obtained by preforming a QTBT division which performs a binary tree division in addition to a quad tree division when dividing a picture, and decoding the picture, includes:

a candidate list deriving step for deriving a candidate list by adding a plurality of mutually different intra prediction modes to the candidate list based on a shape of the block, a parameter deriving step for deriving a parameter for deriving an intra prediction mode from the candidate list.

An image coding method according to one aspect of the disclosure, for performing an intra prediction with respect to a block obtained by preforming a QTBT division which performs a binary tree division in addition to a quad tree division when dividing a picture, and decoding the picture, includes:

a candidate list deriving step for deriving a candidate list by changing the number of one or a plurality of mutually different intra prediction modes added to a candidate list or a context of an intra prediction parameter, based on a shape of the block or the number of times of division performed until the block is obtained, and a parameter deriving step for deriving a parameter for deriving an intra prediction mode from the candidate list.

An image coding method according to one aspect of the disclosure, for performing an intra prediction with respect to a block obtained by preforming a QTBT division which performs a binary tree division in addition to a quad tree division when dividing a picture, and decoding the picture, includes:

an intra prediction parameter coding control step for changing an association between a prediction direction and a mode number in an intra prediction mode based on a shape of the block, and a parameter deriving step for deriving a parameter for deriving the intra prediction mode by referring to the association.

An image decoding apparatus according to one aspect of the disclosure, includes:

a candidate list deriving unit configured to derive a candidate list including a candidate of a target intra prediction mode used for intra prediction of a target block, a decoding unit configured to decode a parameter for deriving the target intra prediction mode in a case where the target intra prediction mode is not included in the candidate list, and a deriving unit configured to derive the target intra prediction mode by associating the parameter with an intra prediction mode which is not included in the candidate list in an order according to a directionality in terms of the target block.

An image decoding apparatus according to one aspect of the disclosure, includes:

a candidate list deriving unit configured to derive a candidate list including a candidate of a target intra prediction mode used for intra prediction of a target block, a decoding unit configured to decode a parameter for deriving the target intra prediction mode in a case where the target intra prediction mode is not included in the candidate list, and a deriving unit configured to derive the target intra prediction mode by associating the parameter with an intra prediction mode not included in the candidate list in an order with the intra prediction mode included in the candidate list as a base point.

An image coding apparatus according to one aspect of the disclosure, includes:

a candidate list deriving unit configured to derive a candidate list including a candidate of a target intra prediction mode used for intra prediction of a target block, a coding unit configured to code a parameter for deriving the target intra prediction mode in a case where the target intra prediction mode is not included in the candidate list, and a deriving unit configured to code the target intra prediction mode by associating the parameter with an intra prediction mode which is not included in the candidate list in an order according to a directionality in terms of the target block.

An image coding apparatus according to one aspect of the disclosure, includes:

a candidate list deriving unit configured to derive a candidate list including a candidate of a target intra prediction mode used for intra prediction of a target block, a coding unit configured to code a parameter for deriving the target intra prediction mode in a case where the target intra prediction mode is not included in the candidate list, and a deriving unit configured to derive the target intra prediction mode by associating the parameter with an intra prediction mode which is not included in the candidate list in an order with the intra prediction mode included in the candidate list as a base point.

Advantageous Effects of Disclosure

According to each aspect of the disclosure, the coding efficiency or decoding efficiency of the CU obtained by picture division such as QTBT division can be improved compared to the related art.

BRIEF DESCRIPTION OF DRAWINGS

FIG. 2 is a diagram illustrating a hierarchical structure of data of a coded stream according to the embodiment 1.

FIGS. 3A to 3H illustrate partition shapes in the case where the PU division modes are 2N×2N, 2N×N, 2N×nU, 2N×nD, N×2N, nL×2N, nR×2N, and N×N, respectively.

FIG. 8A illustrates the transmission device provided with the image coding apparatus, and FIG. 8B illustrates the reception device provided with the image decoding apparatus.

FIG. 9A illustrates the recording device provided with the image coding apparatus, and FIG. 9B illustrates the playback device provided with the image decoding apparatus.

FIG. 13 is a schematic diagram illustrating a syntax of CU used by a prediction parameter decoding unit of the image decoding apparatus illustrated in FIG. 5.

FIG. 14 is a schematic diagram illustrating intra prediction parameters in the syntax of the CU illustrated in FIG. 13.

FIGS. 27A and 27B are schematic diagrams illustrating an addition order of prediction modes when the MPM candidate list deriving unit adds the prediction mode to the MPM candidate list based on a shape of a block, which is different from the addition order illustrated in FIGS. 22A to 22D.

FIG. 28 is a schematic diagram illustrating the correspondence between each bit of an MPM candidate mode index and a context used when decoding the bits, according to an embodiment 2.

FIGS. 29A and 29B are schematic diagrams illustrating a relationship between a mode number and a context number in a case where a target block is non-square (vertically long) in shape in the example in which the plane is not shared according to the embodiment 2.

DESCRIPTION OF EMBODIMENTS

Embodiment 1

Figure 1:
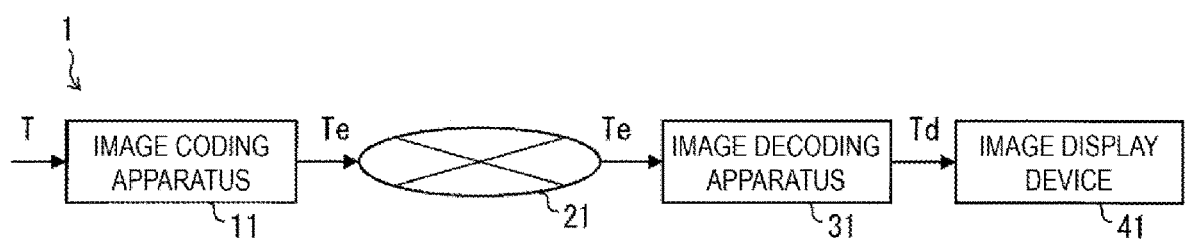
FIG. 1 is a schematic diagram illustrating a configuration of an image transmission system according to an embodiment 1.

Hereinafter, embodiments of the disclosure are described by referring to the drawings.

FIG. 1 is a schematic diagram illustrating a configuration of an image transmission system 1 according to the present embodiment.

The image transmission system 1 is a system configured to transmit a code that codes a coding target image, and to decode the transmitted code to display an image. The image transmission system 1 is configured to include an image coding apparatus 11, a network 21, an image decoding apparatus 31, and an image display apparatus 41.

An image T indicating an image of a single layer or a plurality of layers is input to the image coding apparatus 11. A layer is a concept used to distinguish a plurality of pictures in a case where a certain time is constituted with one or more pictures. For example, if a common picture is coded by the plurality of layers having different image qualities and resolutions, scalable coding is performed, and if pictures of different viewpoints are coded by the plurality of layers, view scalable coding is performed. In a case where prediction is performed between pictures of the plurality of layers (inter-layer prediction, inter-view prediction), the coding efficiency is greatly improved. Further, in a case where the prediction is not performed (simulcast), the coding data can be summarized.

The network 21 transmits the coded stream Te generated by the image coding apparatus 11 to the image decoding apparatus 31. The network 21 may be, for example, the Internet, a Wide Area Network (WAN), a Local Area Network (LAN), or a combination of them. The network 21 is not necessarily limited to a bidirectional communication network, but may be a unidirectional communication network that transmits broadcast waves such as terrestrial digital broadcasting, satellite broadcasting and the like. In addition, the network 21 may be replaced by a storage medium in which a coded stream Te such as a DVD (Digital Versatile Disc), a BD (Blue-ray Disc), or the like is recorded.

The image decoding apparatus 31 decodes each of the coded streams Te transmitted by the network 21, and generates one or a plurality of decoded images Td decoded respectively.

The image display device 41 displays all or part of one or a plurality of decoded images Td generated by the image decoding apparatus 31. The image display device 41 includes, for example, a display device such as a liquid crystal display or an organic Electro-Luminescence (EL) display. In addition, in a spatial scalable coding and an SNR scalable coding, an enhancement layer image with high image quality are displayed in a case where the image decoding apparatus 31 and the image display apparatus 41 have high processing capability, and a base layer image not requiring a higher processing capability and display capability as the enhancement layer is displayed in a case where the image decoding apparatus 31 and the image display apparatus 41 only have lower processing capability.

Operator

The operators used herein are described below.

$\gg$ is a right bit shift, $\ll$ is a left bit shift, & is a bitwise AND, | is a bitwise OR, |= is a sum operation (OR) with another condition.

x ? y: z is a triplet operator that takes y in a case where x is true (other than 0) and takes z in the case where x is false (0).

Clip3(a, b, c) is a function for clipping c to a value not less than a and not greater than b, returning a when c<a, returning b when c>b, and returning c in other cases (however, a<=b).

Structure of Coded Stream Te

Prior to the detailed description of the image coding apparatus 11 and the image decoding apparatus 31 according to the present embodiment, the data structure of the coded stream Te generated by the image coding apparatus 11 and decoded by the image decoding apparatus 31 will be described.

FIG. 2 is a diagram illustrating a hierarchical structure of data in the coded stream Te. The coded stream Te illustratively includes a sequence and a plurality of pictures constituting the sequence. FIGS. 2A to 2F are diagrams respectively illustrating a coding video sequence to default a sequence SEQ, a coding picture defining a picture PICT, a coding slice defining a slice S, coding slice data defining slice data, a coding tree unit included in the coding slice data, and a Coding Unit (CU) included in the coding tree unit.

Coding Video Sequence

In the coding video sequence, a set of data to be referred to by the image decoding apparatus 31 in order to decode the sequence SEQ as a processing target is defined. As illustrated in FIG. 2A, the sequence SEQ includes a Video Parameter Set (VPS), a Sequence Parameter Set (SPS), a Picture Parameter Set (PPS), a picture PICT, and Supplemental Enhancement Information (SEI). Here, the value after # indicates the layer ID. FIG. 2 illustrates an example in which the coding data #0 and #1, that is, Layer 0 and Layer 1 are present, but the type of layers and the number of layers are not limited to this.

In the video parameter set VPS, a set of coding parameters common to a plurality of videos, a plurality of layers included in the video, and a set of the coding parameters related to each of the layers are defined in a video constituted with a plurality of layers.

In the sequence parameter set SPS, a set of coding parameters referred to by the image decoding apparatus 31 to decode the target sequence is defined. For example, a width and a height of a picture are defined. Note that, there may be a plurality of the SPSs. In this case, one of the plurality of the SPSs is selected from the PPS.

In the picture parameter set PPS, a set of coding parameters referred to by the image decoding apparatus 31 to decode each picture in the target sequence is defined. For example, a reference value (pic_init_qp_minus 26) of a quantization step size used for decoding the picture, or a flag (weighted_pred_flag) indicating application of weighted prediction is included. Note that, there may be a plurality of the PPSs. In this case, one of the plurality of the PPSs is selected from each picture in the target sequence.

Coded Picture

In the coded picture, a set of data referred to by the image decoding apparatus 31 is defined to decode the picture PICT to be processed. As illustrated in FIG. 2B, the picture PICT includes slices $S_0$ to $S_{NS-1}$ (NS is the total number of the slices included in the picture PICT).

Note that, in the following description, in a case where there is no need to distinguish each of the slices $S_0$ to $S_{NS-1}$, the suffix of the numerals may be omitted. In addition, the data included in the coded stream Te to be described below is the same for other data with suffix.

Coding Slice

In the coding slice, a set of data to be referred to by the image decoding apparatus 31 is defined to decode the slice S to be processed. As illustrated in FIG. 2(c), the slice S includes a slice header SH and slice data SDATA.

The slice header SH includes a coding parameter group referred to by the image decoding apparatus 31 in order to determine the decoding method of a target slice. The slice-type designation information (slice_type) for designating the slice-type is an example of a coding parameter included in the slice header SH.

Examples of the slice-type that can be designated by the slice-type designation information include (1) I slice using only intra prediction at the time of coding, (2) P slice using unidirectional prediction or intra prediction at the time of coding, and (3) B slice using unidirectional prediction, bidirectional prediction, or intra prediction at the time of coding, and the like.

Note that the slice header SH may include a reference (pic_parameter_set_id) to the picture parameter set PPS included in the coding video sequence.

Coding Slice Data

In coding slice data, a set of data to be referred to by the image decoding apparatus 31 is defined to decode the slice data SDATA to be processed. As illustrated in FIG. 2D, the slice data SDATA includes a Coding Tree Unit (CTU). The CTU is a rectangle has a fixed size (for example, 64×64) constituting a slice, and may be referred to as Largest Coding Unit (LCU).

Coding Tree Unit

As illustrated in FIG. 2E, a set of data to be referred to by the image decoding apparatus 31 is defined to decode the coding tree unit to be processed. The coding tree unit is divided by recursive Quad Tree division (QT division) or Binary Tree division (BT division). A tree structure node obtained by the recursive quad tree division or binary tree division is referred to as a Coding Node (CN). The intermediate node between the quad tree and the binary tree is a Coding Tree (CT), and the coding tree unit itself is also defined as the highest order coding tree.

The CTU includes a QT division flag (cu_split_flag) indicating whether or not to perform the QT division, and a BT division mode (split_bt_mode) indicating a division method for the BT division. In a case where cu_split_flag is 1, the CTU is divided into four coding nodes CNs. In a case where cu_split_flag is 0, the coding node CN is not divided, and one Coding Unit (CU) is held as a node. On the other hand, if split_bt_mode is 1, it is horizontally divided into two coding nodes CNs. In a case where split_bt_mode is 1, it is vertically divided into two coding nodes CNs. In a case where split_bt_mode is 0, the coding node CN is not divided, and one coding unit CU is held as a node. The coding unit CU is a terminal node of the coding tree and is not further divided. The coding unit CU is a basic unit of coding processing.

In a case where the size of the coding tree unit CTU is 64×64 pixels, the size of the coding unit may be taken as, for example, any one of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, and 8×8 pixels. However, other sizes also may be taken depending on constraints on a number or a combination of division, a size of the coding unit, and the like.

Coding Unit

As illustrated in FIG. 2F, a set of data to be referred to by the image decoding apparatus 31 is defined to decode the coding unit as a processing target. Specifically, the coding unit includes a prediction tree, a transform tree, and a CU Header CUH. A prediction mode, a division method (PU division mode), and the like are defined in the CU header.

In the prediction tree, prediction information (reference picture index, motion vector, and the like) of each Prediction Unit (PU) obtained by dividing the coding unit into one or a plurality of units is defined. In other words, the prediction unit refers to one or more non-overlapping regions constituting the coding unit. In addition, the prediction tree also includes one or more prediction units obtained by the above-described division. Hereinafter, note that the prediction unit obtained by further dividing the prediction unit is referred to as "sub-block". The sub-block is constituted with a plurality of pixels. In a case where the size of the prediction unit and the size of the sub-block are equal, the number of the sub-block in the prediction unit is one. In a case where the size of the prediction unit is greater than the size of the sub-block, the prediction unit is divided into sub-blocks. For example, in a case where the prediction unit is 8×8 and the sub-block is 4×4, the prediction unit is divided into 4 sub-blocks, which are horizontally divided into two and vertically divided into two.

The prediction processing may be performed for each prediction unit (sub-block).

Generally, there are two types of division in the prediction tree, in the case of intra prediction and in the case of inter prediction. Intra prediction is prediction in the same picture, and inter prediction refers to prediction processing performed between different pictures (for example, between display times, between layer images).

In the case of intra prediction, the division method includes 2N×2N (the same size as the coding unit) and N×N.

In the case of inter prediction, the division method is coded according to the PU division mode (part_mode) of the coding data and includes 2N×2N (the same size as the coding unit), 2N×N, 2N×nU, 2N×nD, N×2N, nL×2N, nR×2N, N×N and the like. Note that 2N×N and N×2N indicate 1:1 symmetric division, 2N×nU, 2N×nD and nL×2N, nR×2N indicate asymmetric division of 1:3, 3:1. The PUs included in the CU are sequentially represented as PU0, PU1, PU2, and PU3.

Figure 3A:
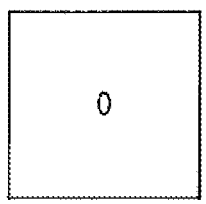
FIGS. 3A to 3H are diagrams illustrating a pattern in a PU division mode.
Figure 3B:
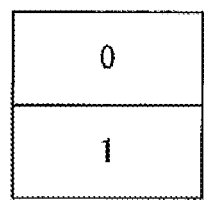
Figure 3C:
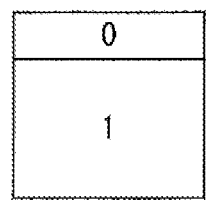
Figure 3D:
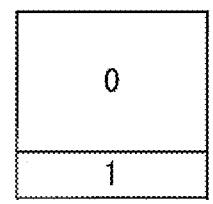
Figure 3E:
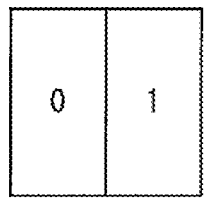
Figure 3F:
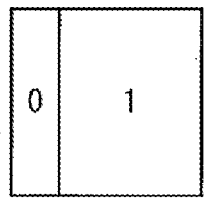
Figure 3G:
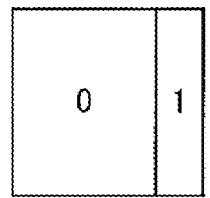
Figure 3H:
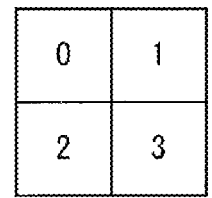

FIGS. 3A to 3H illustrate the shape of the partition (the position of the boundary of the PU division) in each PU division mode specifically. FIG. 3A illustrates a partition of 2N×2N, FIGS. 3B, 3C and 3D respectively illustrate partitions (horizontally long partitions) of 2N×N, 2N×nU and 2N×nD. FIGS. 3E, 3F and 3G respectively illustrate the partitions (vertically long partitions) in the case of N×2 N, nL×2N, nR×2N, and FIG. 3H illustrates the partition of N×N. Note that the horizontally long partitions and the vertically long partitions are generically referred to as rectangular partitions, 2N×2N, N×N are generically referred to as square partitions.

Further, in the transform tree, the coding unit is divided into one or a plurality of transform units, and the position and the size of each transform unit are defined. In other words, the transform unit refers to one or more non-overlapping regions constituting the coding unit. In addition, the transform tree includes one or a plurality of transform units obtained from the above-described division.

As the division in the transform tree, a method in which an area having the same size as the coding unit is allocated as a transform unit and a method due to a recursive quad tree division similar to the division of the CU described above are included.

The transform processing is performed for each transform unit.

Prediction Parameter

The prediction image of the Prediction Unit (PU) is derived by prediction parameters associated with the PU. The prediction parameters include prediction parameters for intra prediction or prediction parameters for inter prediction. Hereinafter, the prediction parameters (inter prediction parameters) for inter prediction will be described. The inter prediction parameters include prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags respectively indicating whether a reference picture list referred to as an L0 list and an L1 list is used, and a reference picture list corresponding to a value of 1 is used. Note that, in the present specification, in a case where "a flag indicating whether XX or not" is described, or a case where a flag other than 0 (for example, 1) is XX, or a case where 0 is not XX, and in logical negation or logical product, and the like, 1 is treated as true and 0 is treated as false (the same applies below). However, other values may be used as the true value or the false value in an actual device or method.

The syntax elements for deriving the inter prediction parameters included in the coding data include, for example, a PU division mode part_mode, a merge flag merge_flag, a merge index merge_idx, an inter prediction identifier inter_pred_idc, a reference picture index refIdxLX, a prediction vector index mvp_LX_idx, and a difference vector mvdLX.

Reference Picture List

Figure 4A:
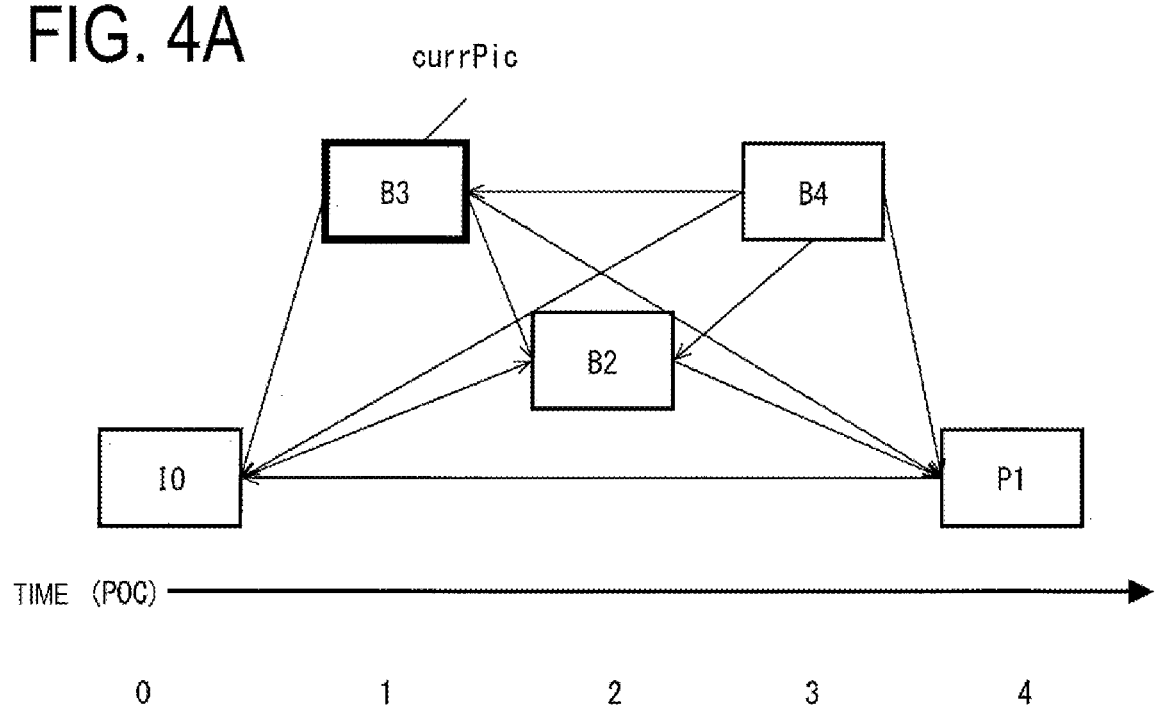
FIGS. 4A and 4B are conceptual diagrams illustrating an example of reference pictures and reference picture lists.
Figure 4B:
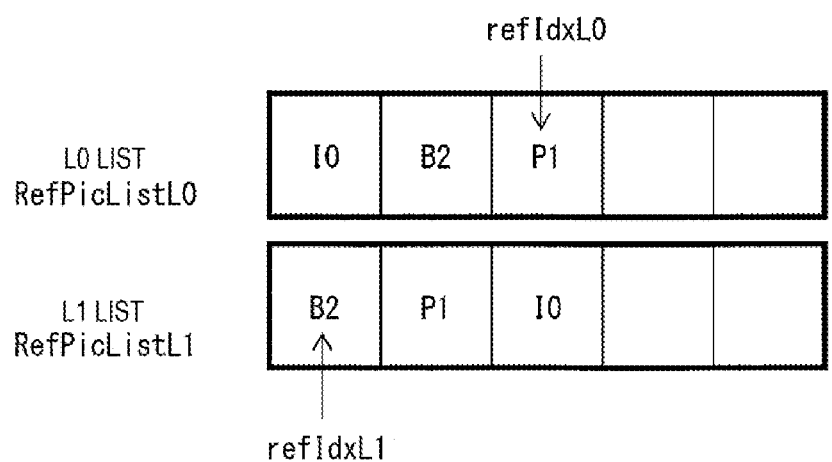

The reference picture list is a list that includes reference pictures stored in the reference picture memory 306. FIGS. 4A and 4B are conceptual diagrams illustrating an example of the reference pictures and the reference picture lists. In FIG. 4A, the rectangle indicates the picture, the arrow indicates the reference relation of the picture, the horizontal axis indicates time, I, P and B in the rectangle respectively indicate intra picture, uni-prediction picture and bi-prediction picture, and numbers in the rectangle indicate a decoding order. As illustrated in the figure, the decoding order of the pictures is I0, P1, B2, B3, B4, and the display order is I0, B3, B2, B4, P1. FIG. 4B illustrates an example of the reference picture list. The reference picture list is a list representing candidates of the reference pictures, and one picture (slice) may have one or more reference picture lists. In the example illustrated in the figure, the target picture B3 has two reference picture lists, an L0 list RefPicList0 and an L1 list RefPicList1. In a case where the target picture is B3, the reference pictures are I0, P1 and B2, and reference pictures include these pictures as elements. In each prediction unit, which picture in the reference picture list RefPicListX is actually to be referenced is designated by the reference picture index refIdxLX. In the figure, an example is illustrated that reference pictures P1 and B2 are referred to by refIdxL0 and refIdxL1.

Merge Prediction and AMVP Prediction

The decoding (coding) method of the prediction parameter includes a merge prediction (merge) mode and an (AMVP) mode, and the merge flag merge_flag is a flag for identifying them. The merge prediction mode is a mode to be used for deriving from the prediction parameters of a processed neighboring PU without including the prediction list utilization flag predFlagLX (or the inter prediction identifier inter_pred_idc), the reference picture index refIdxLX, and the motion vector mvLX in the coding data, the AMVP mode is a mode in which the inter prediction identifier inter_pred_idc, the reference picture index refIdxLX, and the motion vector mvLX are included in the coding data. Note that, the motion vector mvLX is coded as a prediction vector index mvp_LX_idx that identifies the prediction vector mvpLX and a difference vector mvdLX.

The inter prediction identifier inter_pred_idc is a value indicating the type and the number of reference pictures, and takes a value of any of PRED_L0, pred_L1, and PRED_BI. PRED_L0 and PRED_L1 indicate that the reference pictures managed in the reference picture lists of the L0 list and the L1 list are used respectively, and indicate that one reference picture is used (Uni-Prediction). PRED_BI indicates that two reference pictures are used (Bi-Prediction BiPred), and the reference pictures managed by the L0 list and the L1 list are used. The prediction vector index mvp_LX_idx is an index indicating a prediction vector, and the reference picture index refIdxLX is an index indicating the reference picture managed in the reference picture list. Note that LX is a description method used in a case where L0 prediction and L1 prediction are not distinguished, and by replacing LX with L0 and L1, the parameters for the L0 list and the parameters for the L1 list are distinguished.

The merge index merge_idx is an index indicating whether one of the prediction parameter in the prediction parameter candidates (merge candidates) derived from the PU whose processing has been completed is used as the prediction parameter of the decoding target PU.
Motion Vector The motion vector mvLX indicates an amount of deviation between blocks on two different pictures. The prediction vector and the difference vector relating to the motion vector mvLX are referred to as the prediction vector mvpLX and the difference vector mvdLX, respectively.
Inter Prediction Identifier Inter_Pred_Idc and Prediction List Utilization Flag predFlagLX The relationship between the inter prediction identifier inter_pred_idc and the prediction list utilization flag predFlagL0, predFlagL1 is as follows and can be mutually converted.

inter_pred_idc=(predFlagL1<<1)+predFlagL0 predFlagL0=inter_pred_idc & 1 predFlagL1=inter_pred_idc>>1

Note that, as the inter prediction parameter, a prediction list utilization flag may be used, or an inter prediction identifier may be used. In addition, the determination using the prediction list utilization flag may be replaced with the determination using the inter prediction identifier. Conversely, the determination using the inter prediction identifier may be replaced with the determination using the prediction list utilization flag.
Bi-Prediction biPred Determination A flag biPred for determining the Bi-Prediction BiPred can be derived depending on whether two prediction list utilization flags are both 1. For example, it can be derived by the following equation.

biPred=(predFlagL0==1 && predFlagL1==1)

The flag biPred can also be derived depending on whether the inter prediction identifier is a value indicating that two prediction lists (reference pictures) are used. For example, it can be derived by the following equation.

biPred=(inter_pred_idc==PRED_BI)?1:0

The above equation can also be expressed by the following equation.

biPred=(inter_pred_idc==PRED_BI)

Figure 5:
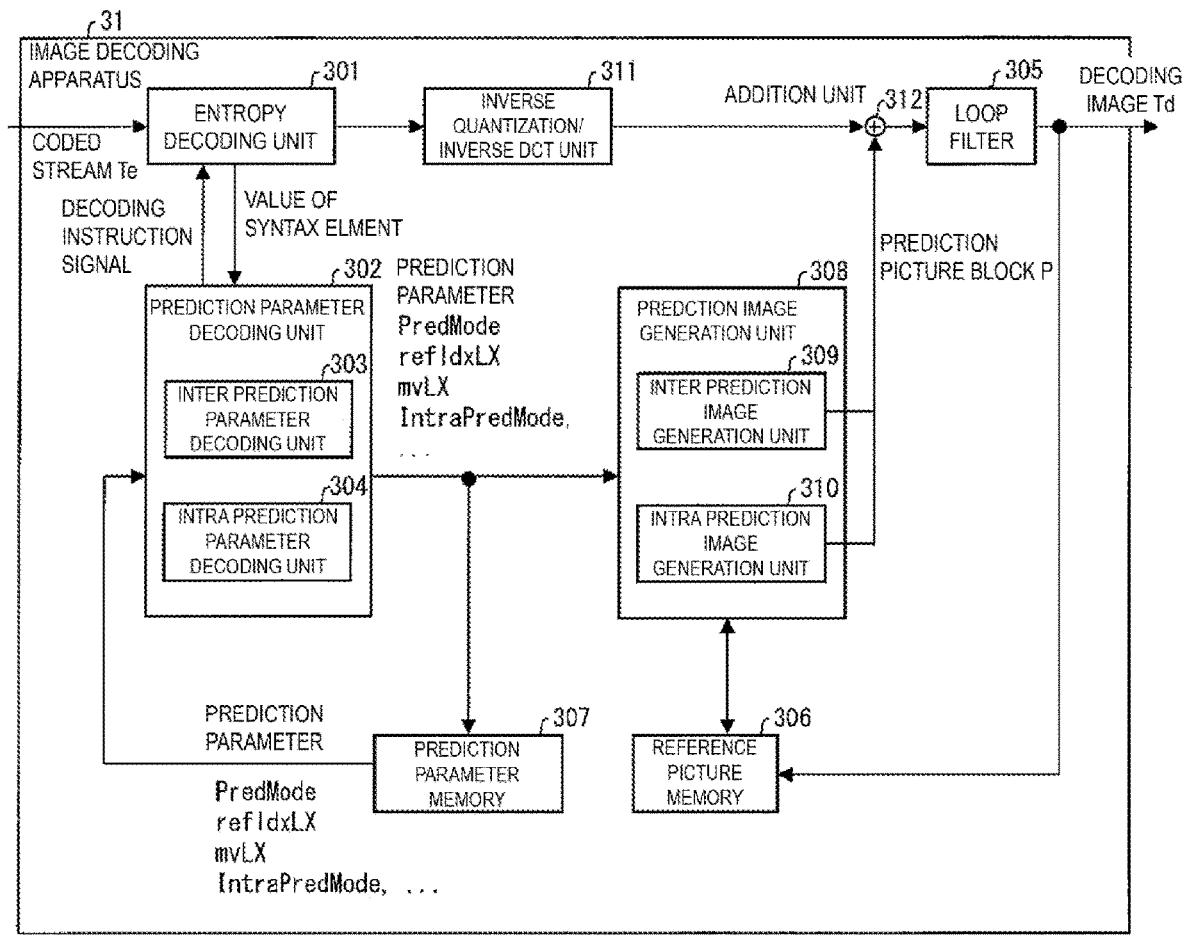
FIG. 5 is a block diagram illustrating a configuration of an image decoding apparatus according to the embodiment 1.

Note that, PRED_BI may use, for example, three values.
Configuration of Image Decoding Apparatus Next, a configuration of the image decoding apparatus 31 according to the present embodiment will be described. FIG. 5 is a block diagram illustrating a configuration of the image decoding apparatus 31 according to the present embodiment. The image decoding apparatus 31 is configured to include an entropy decoding unit 301, a prediction parameter decoding unit (prediction image decoding device) 302, a loop filter 305, a reference picture memory 306, a prediction parameter memory 307, a prediction image generation unit (prediction image generation device) 308, an inverse quantization/inverse DCT unit 311, and an addition unit 312.

In addition, the prediction parameter decoding unit 302 is configured to include an inter prediction parameter decoding unit 303 and an intra prediction parameter decoding unit 304. The prediction image generation unit 308 is configured to include an inter prediction image generation unit 309 and an intra prediction image generation unit 310.

The entropy decoding unit 301 performs entropy decoding of the coded stream Te input from the outside to separate and decode individual codes (syntax elements). The separated code includes prediction information for generating a prediction image and residual information for generating a difference image.

The entropy decoding unit 301 outputs a part of the separated code to the prediction parameter decoding unit 302. A part of the separated codes are, for example, a prediction mode predMode, a PU division mode part_mode, a merge flag merge_flag, a merge index merge_idx, an inter prediction identifier inter_pred_idc, a reference picture index refIdxLX, a prediction vector index mvp_LX_idx, and a difference vector mvdLX. Control of which code to decode is performed based on an instruction of the prediction parameter decoding unit 302. The entropy decoding unit 301 outputs a quantization coefficient to the inverse quantization/inverse DCT unit 311. The quantization coefficient is a coefficient obtained by performing Discrete Cosine Transform (DCT) and quantization with respect to the residual signal in the coding processing.

The inter prediction parameter decoding unit 303 decodes the inter prediction parameter by referring to the prediction parameter stored in the prediction parameter memory 307 based on the code inputted from the entropy decoding unit 301.

The inter prediction parameter decoding unit 303 outputs the decoded inter prediction parameter to the prediction image generation unit 308, and stores it in the prediction parameter memory 307. The inter prediction parameter decoding unit 303 will be described in detail later.

The intra prediction parameter decoding unit 304 decodes the intra prediction parameter by referring to the prediction parameter stored in the prediction parameter memory 307 based on the code input from the entropy decoding unit 301. The intra prediction parameter is a parameter used in a process of predicting a CU within one picture, for example, an intra prediction mode IntraPredMode. The intra prediction parameter decoding unit 304 outputs the decoded intra prediction parameter to the prediction image generation unit 308, and stores it in the prediction parameter memory 307.

The intra prediction parameter decoding unit 304 may derive different intra prediction modes with luminance and chrominance. In this case, the intra prediction parameter decoding unit 304 decodes a luminance prediction mode IntraPredModeY as the prediction parameter of the luminance and a chrominance prediction mode IntraPredModeC as the prediction parameter of the chrominance. The luminance prediction mode IntraPredModeY has 35 modes corresponding to planar prediction (0), DC prediction (1), and directional predictions (2 to 34). The chrominance prediction mode IntraPredModeC uses one of the planar prediction (0), the DC prediction (1), the directional predictions (2 to 34), and the LM mode (35). The intra prediction parameter decoding unit 304 decodes a flag indicating whether IntraPredModeC is the same mode as the luminance mode, if the flag indicates that the mode is the same as the luminance mode, IntraPredModeY may be assigned to IntraPredModeC, and if the flag indicates that the mode is different from the luminance mode, the planar prediction (0), the DC prediction (1), the directional predictions (2 to 34), and the LM mode (35) may be decode as IntraPredModeC.

The loop filter 305 applies filters to the decoded image of the CU generated by the addition unit 312, such as a deblocking filter, a Sample Adaptive Offset (SAO), and an Adaptive Loop Filter (ALF).

The reference picture memory 306 stores the decoded image of the CU generated by the addition unit 312 at a predetermined position for each picture and CU to be decoded.

The prediction parameter memory 307 stores the prediction parameter at a predetermined position for each picture and prediction unit (or sub-block, fixed size block, pixel) to be decoded. Specifically, the prediction parameter memory 307 stores the inter prediction parameter decoded by the inter prediction parameter decoding unit 303, the intra prediction parameter decoded by the intra prediction parameter decoding unit 304, and the prediction mode predMode separated by the entropy decoding unit 301. The stored inter prediction parameters include, for example, a prediction list utilization flag predFlagLX (inter prediction identifier inter_pred_idc), a reference picture index refIdxLX, and a motion vector mvLX.

The prediction mode predMode input from the entropy decoding unit 301 and the prediction parameter input from the prediction parameter decoding unit 302 are input to the prediction image generation unit 308. In addition, the prediction image generation unit 308 reads the reference picture from the reference picture memory 306. The prediction image generation unit 308 generates a prediction image of PU using the input prediction parameter and the read reference picture in the prediction mode indicated by the prediction mode predMode.

Here, in a case where the prediction mode predMode indicates the inter prediction mode, the inter prediction image generation unit 309 generates a prediction image of PU by inter prediction using the inter prediction parameter input from the inter prediction parameter decoding unit 303 and the read reference picture.

The inter prediction image generation unit 309 reads a reference picture block at a position indicated by the motion vector mvLX by referring to the decoding target PU from a reference picture indicated by the reference picture index refIdxLX from the reference picture memory 306, with respect to the reference picture list (L0 list or L1 list) in which the prediction list utilization flag predFlagLX is 1. The inter prediction image generation unit 309 performs prediction based on the read reference picture block to generate the prediction image of the PU. The inter prediction image generation unit 309 outputs the generated prediction image of the PU to the addition unit 312

In a case where the prediction mode predMode indicates the intra prediction mode, the intra prediction image generation unit 310 performs intra prediction using the intra prediction parameter input from the intra prediction parameter decoding unit 304 and the read reference picture. Specifically, the intra prediction image generation unit 310 reads a neighboring PU within a predetermined range from the decoding target PU among the decoded PUs from the reference picture memory 306. The predetermined range is, for example, any one of the neighboring PUs on the left, the upper left, the upper, and the upper right, in a case where the decoding target PU sequentially moves in an order of so-called raster scan, which is different according to the intra prediction mode. The raster scan order is an order that each row from the upper end to the lower end is sequentially moved from the left end to the right end in each picture.

The intra prediction image generation unit 310 performs prediction in a prediction mode indicated by the intra prediction mode IntraPredMode for the read neighboring PU to generate a prediction image of the PU. The intra prediction image generation unit 310 outputs the generated prediction image of the PU to the addition unit 312.

In the intra prediction parameter decoding unit 304, in a case where different intra prediction modes are derived for luminance and chrominance, the intra prediction image generation unit 310 generates a prediction image of the PU of luminance by any one of the planar prediction (0), the DC prediction (1), and the directional predictions (2 to 34) according to the luminance prediction mode IntraPredModeY, and generates a prediction image of the PU of chrominance by any one of the planar prediction (0), the DC prediction (1), the directional predictions (2 to 34), and the LM mode (35) according to the chrominance prediction mode IntraPredModeC.

The inverse quantization/inverse DCT unit 311 inverse quantizes the quantization coefficient input from the entropy decoding unit 301 to obtain DCT coefficients. The inverse quantization/inverse DCT unit 311 performs Inverse Discrete Cosine Transform (inverse DCT) on the obtained DCT coefficients, and calculates a residual signal. The inverse quantization/inverse DCT unit 311 outputs the calculated residual signal to the addition unit 312.

The addition unit 312 adds the prediction image of the PU input from the inter prediction image generation unit 309 or the intra prediction image generation unit 310 and the residual signal input from the inverse quantization/inverse DCT unit 311 for each pixel to generate a decoded image of the PU. The addition unit 312 stores the generated decoded image of the PU in the reference picture memory 306, and outputs the decoded image Td integrating the generated decoded image of the PU for each picture to the outside.

Configuration of Image Coding Apparatus

Figure 6:
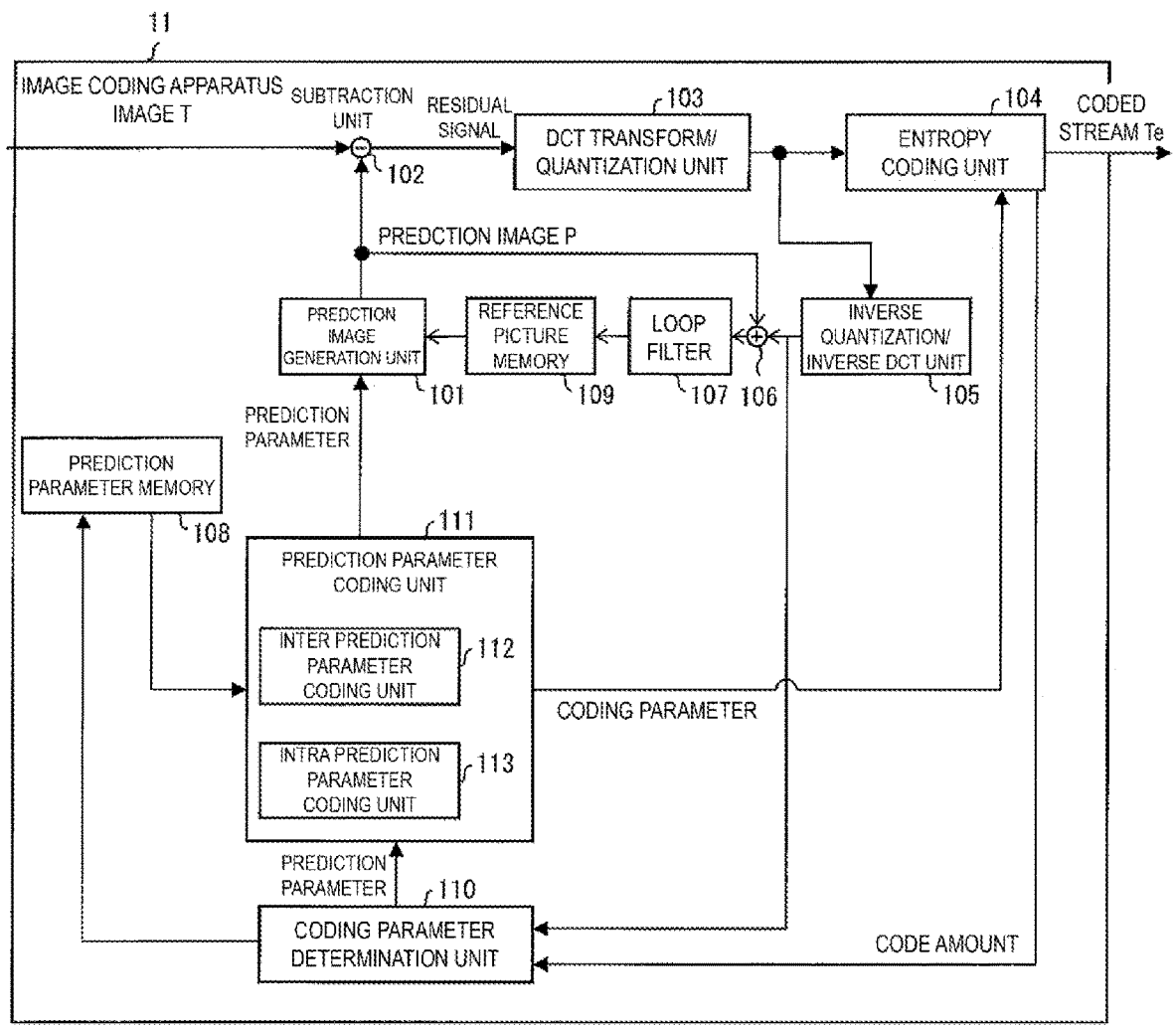
FIG. 6 is a block diagram illustrating the configuration of an image coding apparatus according to the embodiment 1.

Next, a configuration of the image coding apparatus 11 according to the present embodiment will be described. FIG. 6 is a block diagram illustrating the configuration of the image coding apparatus 11 according to the present embodiment. The image coding apparatus 11 is configured to include a prediction image generation unit 101, a subtraction unit 102, and a DCT/quantization unit 103, an entropy coding unit 104, an inverse quantization/inverse DCT unit 105, an addition unit 106, and a loop filter 107, a prediction parameter memory (prediction parameter storage unit, frame memory) 108, and a reference picture memory (reference image storage unit, frame memory) 109, an coding parameter determination unit 110, and a prediction parameter coding unit 111. The prediction parameter coding unit 111 is configured to include an inter prediction parameter coding unit 112 and an intra prediction parameter coding unit 113.

The prediction image generation unit 101 generates the prediction image P of the prediction unit PU for each coding unit CU which is a region obtained by dividing the picture for each picture of the image T. Here, the prediction image generation unit 101 reads the decoded block from the reference picture memory 109 based on the prediction parameter input from the prediction parameter coding unit 111. The prediction parameter input from the prediction parameter coding unit 111 is, for example, a motion vector in the case of inter prediction. The prediction image generation unit 101 reads a block at a position on the reference image indicated by the motion vector from the target PU as a starting point. In the case of intra prediction, the prediction parameter is, for example, an intra prediction mode. The pixel value of the neighboring PU used in the intra prediction mode is read from the reference picture memory 109, and the prediction image P of the PU is generated. The prediction image generation unit 101 generates the prediction image P of the PU using one prediction method among a plurality of prediction methods for the read reference picture block. The prediction image generation unit 101 outputs the generated prediction image P of the PU to the subtraction unit 102.

Figure 7:
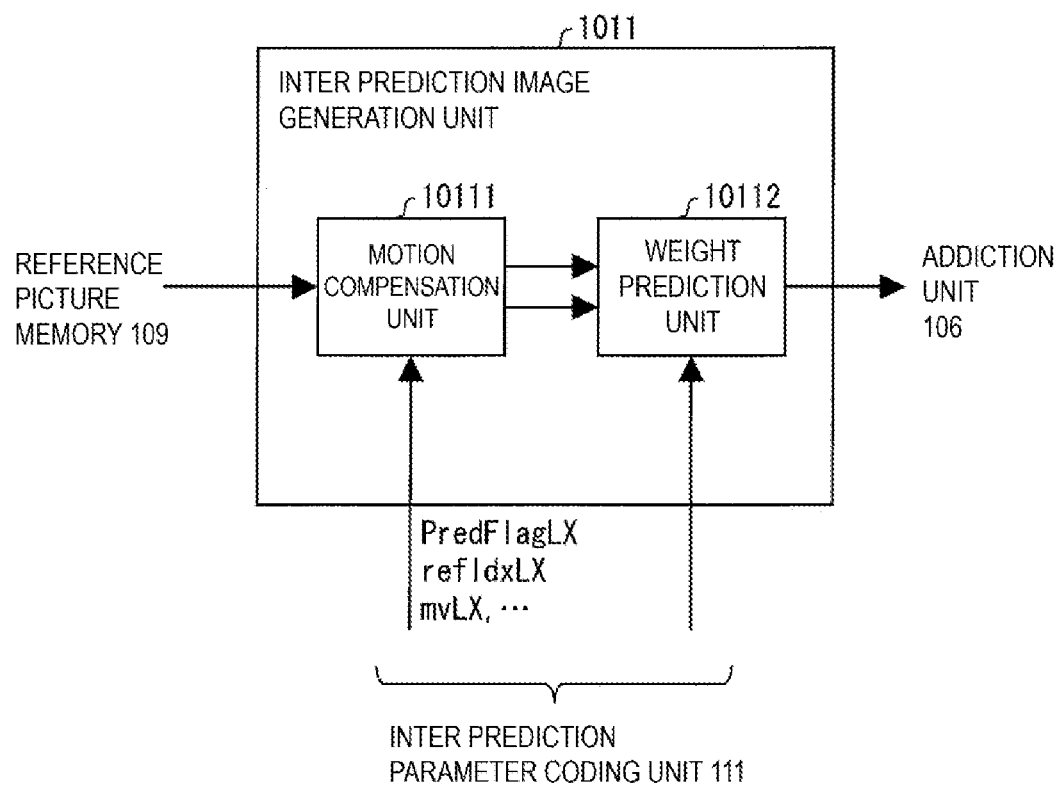
FIG. 7 is a schematic diagram illustrating a configuration of an inter prediction image generation unit of the image coding apparatus according to the embodiment 1.

Note that the prediction image generation unit 101 is the same operation as the prediction image generation unit 308 described above. For example, FIG. 7 is a schematic diagram illustrating a configuration of the inter prediction image generation unit 1011 included in the prediction image generation unit 101 The inter prediction image generation unit 1011 is configured to include a motion compensation unit 10111 and a weight prediction unit 10112. The motion compensation unit 10111 and the weight prediction unit 10112 have the same configurations as those of the motion compensation unit 3091 and the weight prediction unit 3094, respectively, and hence description of them will be omitted.

The prediction image generation unit 101 generates a prediction image P of the PU based on the pixel value of the reference block read from the reference picture memory by using the parameters input from the prediction parameter coding unit. The prediction image generated by the prediction image generation unit 101 is output to the subtraction unit 102 and the addition unit 106.

The subtraction unit 102 subtracts the signal value of the prediction image P of the PU input from the prediction image generation unit 101 from the pixel value of the corresponding PU of the image T to generate a residual signal. The subtraction unit 102 outputs the generated residual signal to the DCT/quantization unit 103.

The DCT/quantization unit 103 performs DCT on the residual signal input from the subtraction unit 102 to calculate DCT coefficient. The DCT/quantization unit 103 quantizes the calculated DCT coefficient to obtain a quantization coefficient. The DCT/quantization unit 103 outputs the obtained quantization coefficient to the entropy coding unit 104 and the inverse quantization/inverse DCT unit 105.

A quantization coefficient is input to the entropy coding unit 104 from the DCT/quantization unit 103, and coding parameters are input from the prediction parameter coding unit 111. The input coding parameters include numerals, for example, such as reference picture index refIdxLX, prediction vector index mvp_LX_idx, difference vector mvdLX, prediction mode predMode, and merge index merge_idx.

The entropy coding unit 104 entropy-codes the inputted quantization coefficient and coding parameter to generate a coded stream Te and outputs the generated coded stream Te to the outside.

The inverse quantization/inverse DCT unit 105 inversely quantizes the quantization coefficient input from the DCT/quantization unit 103 to obtain a DCT coefficient. The inverse quantization/inverse DCT unit 105 performs inverse DCT on the obtained DCT coefficient to calculate a residual signal. The inverse quantization/inverse DCT unit 105 outputs the calculated residual signal to the addition unit 106.

The addition unit 106 adds the signal value of the prediction image P of the PU input from the prediction image generation unit 101 and the signal value of the residual signal input from the inverse quantization/inverse DCT unit 105 for each pixel to generate a decoded image. The addition unit 106 stores the generated decoded image in the reference picture memory 109.

The loop filter 107 applies a deblocking filter, a Sample Adaptive Offset (SAO), and an Adaptive Loop Filter (ALF) to the decoded image generated by the addition unit 106.

The prediction parameter memory 108 stores the prediction parameter generated by the coding parameter determination unit 110 at a predetermined position for each picture to be coded and each CU.

The reference picture memory 109 stores the decoded image generated by the loop filter 107 at a predetermined position for each picture to be coded and each CU.

The coding parameter determination unit 110 selects one set of a plurality of sets of coding parameters. The coding parameter is the prediction parameter described above or the parameter to be coded generated in relation to the prediction parameter. The prediction image generation unit 101 generates the prediction image P of the PU using each of these sets of coding parameters.

The coding parameter determination unit 110 calculates the size of the information amount and a cost value indicating the coding error for each of the plurality of sets. The cost value is, for example, the sum of the code amount and the value obtained by multiplying a square error by the coefficient $\lambda$. The code amount is an information amount of the coded stream Te obtained by entropy coding the quantization error and the coding parameter. The square error is a total sum of square values of residual values of the residual signal calculated by the subtraction unit 102 among pixels. The coefficient X is an actual number greater than zero which is set in advance. The coding parameter determination unit 110 selects a set of the coding parameters that the calculated cost value is the smallest. As a result, the entropy coding unit 104 outputs the selected set of coding parameters to outside as the coded stream Te, and does not output the set of the coding parameters not selected. The coding parameter determination unit 110 stores the determined coding parameter in the prediction parameter memory 108.

The prediction parameter coding unit 111 derives a format for coding from the parameter input from the coding parameter determination unit 110, and outputs the derived format to the entropy coding unit 104. The derivation of the format for coding refers to, for example, deriving a difference vector from a motion vector and a prediction vector. The prediction parameter coding unit 111 derives a necessary parameter for generating a prediction image from the parameter input from the coding parameter determination unit 110, and outputs the derived parameter to the prediction image generation unit 101. The necessary parameter for generating the prediction image is, for example, a motion vector in a sub-block unit.

The inter prediction parameter coding unit 112 derives an inter prediction parameter such as a difference vector based on the prediction parameter input from the coding parameter determination unit 110. The inter prediction parameter coding unit 112 includes the same configuration as the configuration in which the inter prediction parameter decoding unit 303 (see FIG. 6, and the like) derives the inter prediction parameter as a configuration for deriving the necessary parameters for generating the prediction image to be output to the prediction image generation unit 101. The configuration of the inter prediction parameter coding unit 112 will be described later.

The intra prediction parameter coding unit 113 derives a format (for example, MPM_idx, rem:intra_luma_pred_mode, and the like) for coding from the intra prediction mode IntraPredMode input from the coding parameter determination unit 110.

Shape of CU Obtained by QTBT Division

Figure 10:
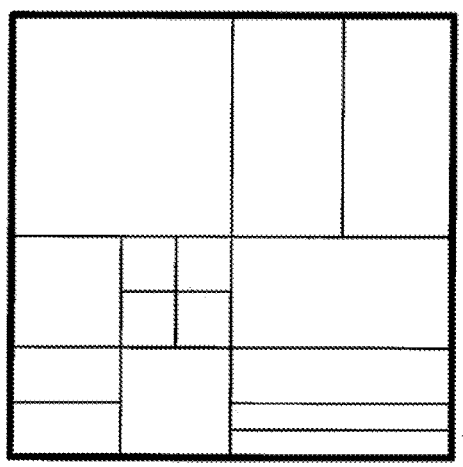
FIG. 10 is a schematic diagram illustrating a shape of a CU obtained by QTBT division according to the embodiment 1.

FIG. 10 is a schematic diagram illustrating a shape of a CU obtained by QTBT division according to the present embodiment. As illustrated in FIG. 10, the picture is QT divided and further QT or BT divided to obtain a vertically long/horizontally long/square CU.

Note that, although not specifically illustrated, attribute information such as the position and size of the block (CU/PU/TU) being processed or processed is appropriately supplied to the necessary location.

Operation of Prediction Parameter Decoding Unit 302

Figure 11:
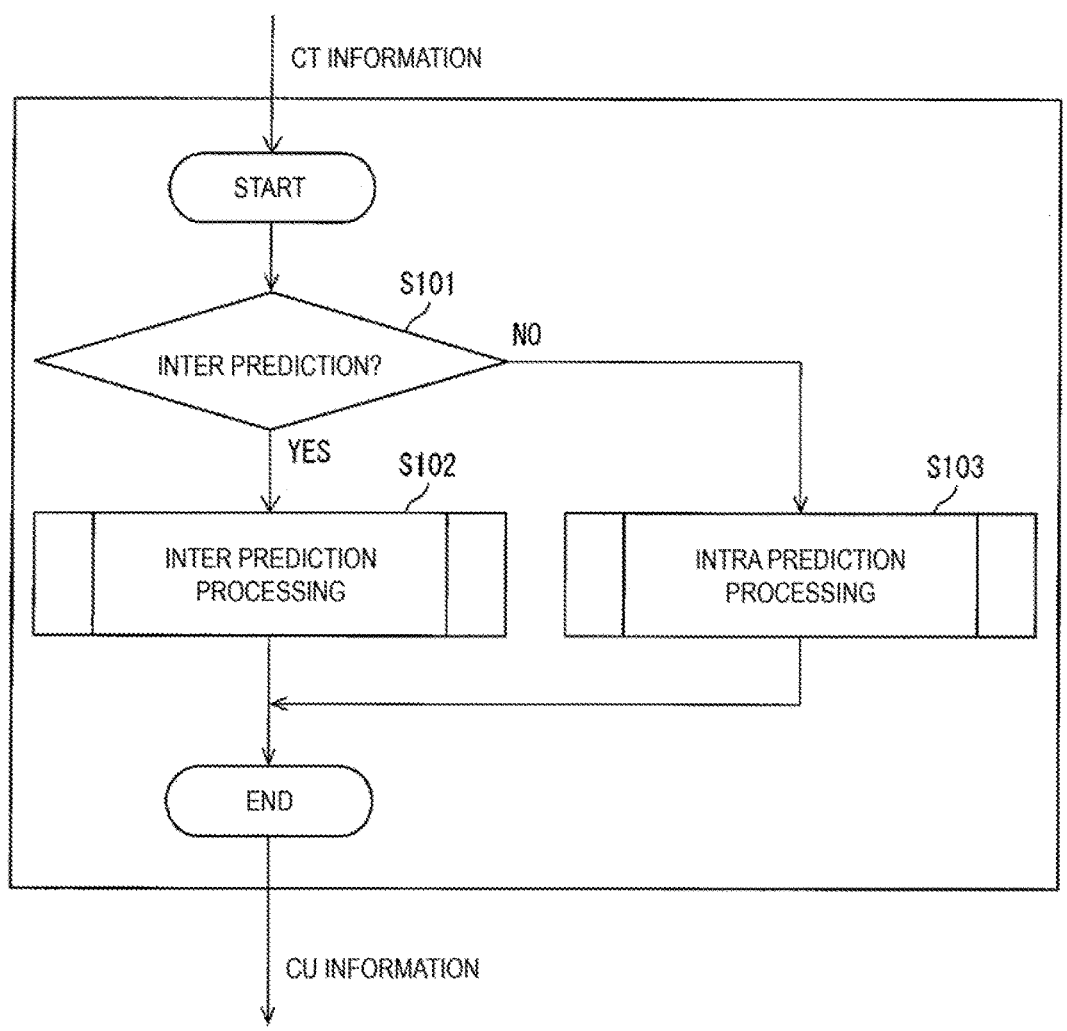
FIG. 11 is a flowchart illustrating an operation of a prediction parameter decoding unit of the image decoding apparatus illustrated in FIG. 5.

FIG. 11 is a flowchart illustrating an operation of a prediction parameter decoding unit 302 of the image decoding apparatus 31 illustrated in FIG. 5. The operation illustrated in FIG. 11 includes steps S101 to S103.

Step S101

The prediction parameter decoding unit 302 receives the CT information related to CT and determines whether to perform inter prediction. In step S101, in a case where the prediction parameter decoding unit 302 determines that inter prediction is performed (YES), step S102 is performed. In step S101, in a case where the prediction parameter decoding unit 302 determines that inter prediction is not performed (NO), step S103 is performed.

Step S102

In the image decoding apparatus 31, inter prediction processing is performed. The prediction parameter decoding unit 302 supplies the CU information related to the CU according to the processing result of the inter prediction to the prediction image generation unit 308 (FIG. 5).

Step S103

In the image decoding apparatus 31, intra prediction processing is performed. The prediction parameter decoding unit 302 supplies the CU information related to the CU according to the processing result of the intra prediction to the prediction image generation unit 308.

Note that, the above processing can be applied not only to the decoding processing but also to the coding processing. In the coding process, the "image decoding device 31", "prediction parameter decoding unit 302", and "prediction image generation unit 308" illustrated in FIG. 5 respectively correspond to "image coding apparatus 11", "prediction parameter coding unit 111" and "prediction image generation unit 101". Note that, in the following processing, each part of the image decoding apparatus 31 illustrated in FIG. 5 also can be associated with each part of the image coding apparatus 11 illustrated in FIG. 6.

Type of Intra Prediction Mode

Figure 12:
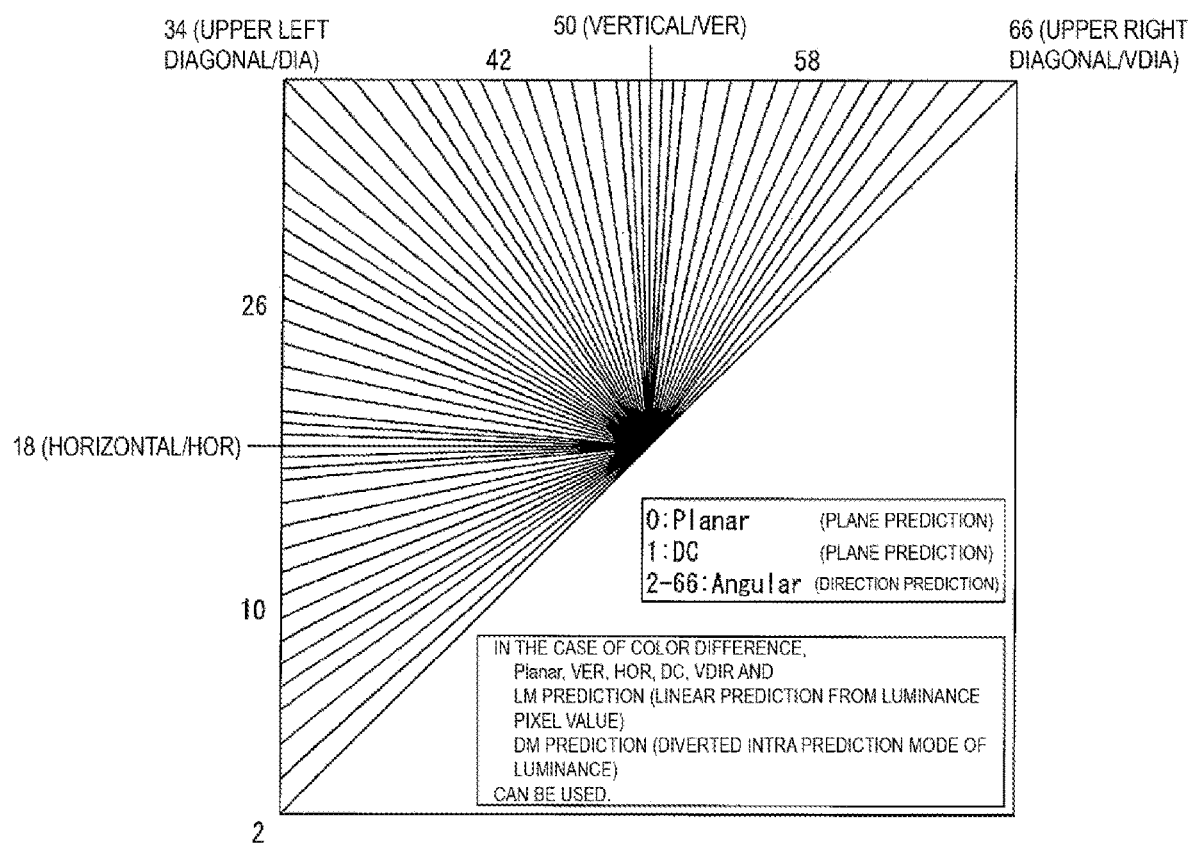
FIG. 12 is a schematic diagram illustrating the type (mode number) of the intra prediction mode used in one step included in the operation of the prediction parameter decoding unit illustrated in FIG. 11.

FIG. 12 is a schematic diagram illustrating the type (mode number) of the intra prediction mode used in step S103 included in the operation of the prediction parameter decoding unit 302 illustrated in FIG. 11. As illustrated in FIG. 12, for example, there are 67 kinds (0 to 66) of intra prediction modes.

CU and Intra Prediction Parameter Syntax

FIG. 13 is a schematic diagram illustrating a syntax of CU used by a prediction parameter decoding unit 302 of the image decoding apparatus 31 illustrated in FIG. 5. As illustrated in FIG. 13, the prediction parameter decoding unit 302 performs the coding_unit function. The coding_unit function takes the following arguments.

x0: an X coordinate of the upper left luminance pixel of the target CU
y0: a Y coordinate of the upper left luminance pixel of the target CU
log 2CbWidth: width of target CU (length in X direction)
log 2CbHeight: height of target CU (length in Y direction)

Note that, although the logarithm value of 2 is used for the width and height of the target CU, it is not limited to this.

FIG. 14 is a schematic diagram illustrating intra prediction parameters in the syntax of the CU illustrated in FIG. 13. As illustrated in FIG. 14, the coding_unit function identifies an intra prediction mode IntraPredModeY [x0] [y0] to be applied to luminance pixels using the following five syntax elements.

prev_intra_luma_pred_flag [x0] [y0]
MPM_idx [x0] [y0]
rem_selected_mode_flag [x0] [y0]
rem_selected_mode [x0] [y0]
rem_non_selected_mode [x0] [y0]

MPM prev_intra_luma_pred_flag [x0] [y0] is a flag indicating a match between the intra prediction mode IntraPredModeY [x0] [y0] of the target PU (block) and MPM (Most Probable Mode). The MPM is a prediction mode included in the MPM candidate list, and is an intra prediction mode value estimated to have a high probability of being applied in the target PU, and one or more values are derived. Note that, even in a case where there are multiple MPMs, they may be collectively referred to as MPM in some cases.

MPM_idx [x0] [y0] is the MPM candidate mode index for selecting the MPM.

REM rem_selected_mode_flag [x0] [y0] is a flag for identifying whether to perform selecting the intra prediction mode by referring to rem_selected_mode [x0] [y0] or to perform selecting the intra prediction mode by referring to rem_non_selected_mode [x0] [y0]

rem_selected_mode [x0] [y0] is a syntax for identifying RemIntraPredMode.

rem_non_selected_mode [x0] [y0] is a syntax for identifying RemIntraPredMode not identified by rem_selected_mode [x0] [y0]

Note that RemIntraPredMode is a temporary variable for obtaining the intra prediction mode IntraPredModeY [x0] [y0]. RemIntraPredMode selects the remaining mode excluding the intra prediction mode corresponding to the MPM from the entire intra prediction mode. The intra prediction mode selectable as RemIntraPredMode is referred to as "non-MPM" or "REM".

REM is a luminance intra prediction mode, and is a prediction mode other than MPM (not included in the MPM candidate list). 0 (PLANAR) and 1 (DC) of intra prediction mode numbers are always included in the MPM, thus REM is the directional prediction mode. REM is selected by RemIntraPredMode. In the example illustrated in FIG. 12, a value of RemIntraPredMode and an intra prediction mode number are associated with each other such that the value of RemIntraPredMode is ascending with respect to the intra prediction mode number from the lower left (2) to the upper right (66) in the clockwise order.

Configuration of Intra Prediction Parameter Coding Unit 113

Figure 15:
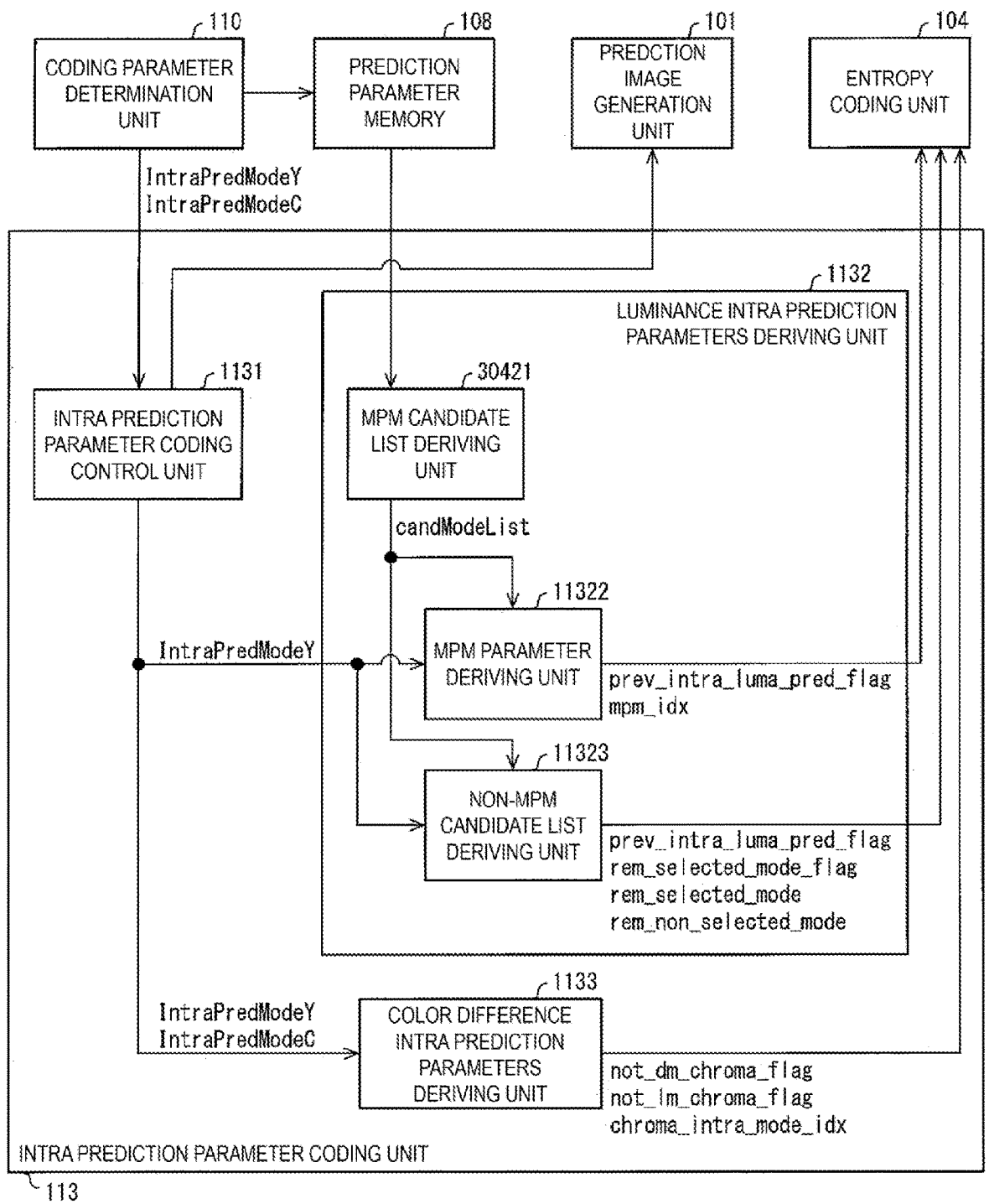
FIG. 15 is a schematic diagram illustrating a configuration of an intra prediction parameter coding unit of a prediction parameter coding unit of the image coding apparatus illustrated in FIG. 6.

FIG. 15 is a schematic diagram illustrating a configuration of an intra prediction parameter coding unit of a prediction parameter coding unit of the image coding apparatus illustrated in FIG. 6. As illustrated in FIG. 15, the intra prediction parameter coding unit 113 is configured to include an intra prediction parameter coding control unit 1131, a luminance intra prediction parameter deriving unit 1132, and a chrominance intra prediction parameter deriving unit 1133.

The intra prediction parameter coding control unit 1131 receives the luminance prediction mode IntraPredModeY and the chrominance prediction mode IntraPredModeC from the coding parameter determination unit 110. In addition, the intra prediction parameter coding control unit 1131 supplies (controls) IntraPredModeY/C to the prediction image generation unit 101. In addition, the intra prediction parameter coding control unit 1131 supplies the luminance prediction mode IntraPredModeY to the MPM parameter deriving unit 11322 and the non-MPM parameter deriving unit 11323 described later. In addition, the intra prediction parameter coding control unit 1131 supplies the luminance prediction mode IntraPredModeY and the chrominance prediction mode IntraPredModeC to the chrominance intra prediction parameter deriving unit 1133.

The luminance intra prediction parameter deriving unit 1132 is configured to include an MPM candidate list deriving unit 30421 (candidate list deriving unit), an MPM parameter deriving unit 11322 (parameter deriving unit), a non-MPM parameter deriving unit 11323 (parameter deriving unit, deriving unit).

The MPM candidate list deriving unit 30421 receives prediction parameters stored in the prediction parameter memory 108. In addition, the MPM candidate list deriving unit 30421 supplies the MPM candidate list candModeList to the MPM parameter deriving unit 11322 and the non-MPM parameter deriving unit 11323. In the following description, the MPM candidate list candModeList is simply described as "MPM candidate list".

The MPM parameter deriving unit 11322 supplies prev_intra_luma_pred_flag and MPM_idx described above to the entropy coding unit 104. The non-MPM parameter deriving unit 11323 supplies prev_intra_luma_pred_flag, rem_selected_mode_flag, rem_selected_mode, and rem_non_selected_mode described above to the entropy coding unit 104. The chrominance intra prediction parameter deriving unit 1133 supplies not_dm_chroma_flag, not_lm_chroma_flag, and chroma_intra_mode_idx described later to the entropy coding unit 104.

Configuration of Intra Prediction Parameter Decoding Unit 304

Figure 16:
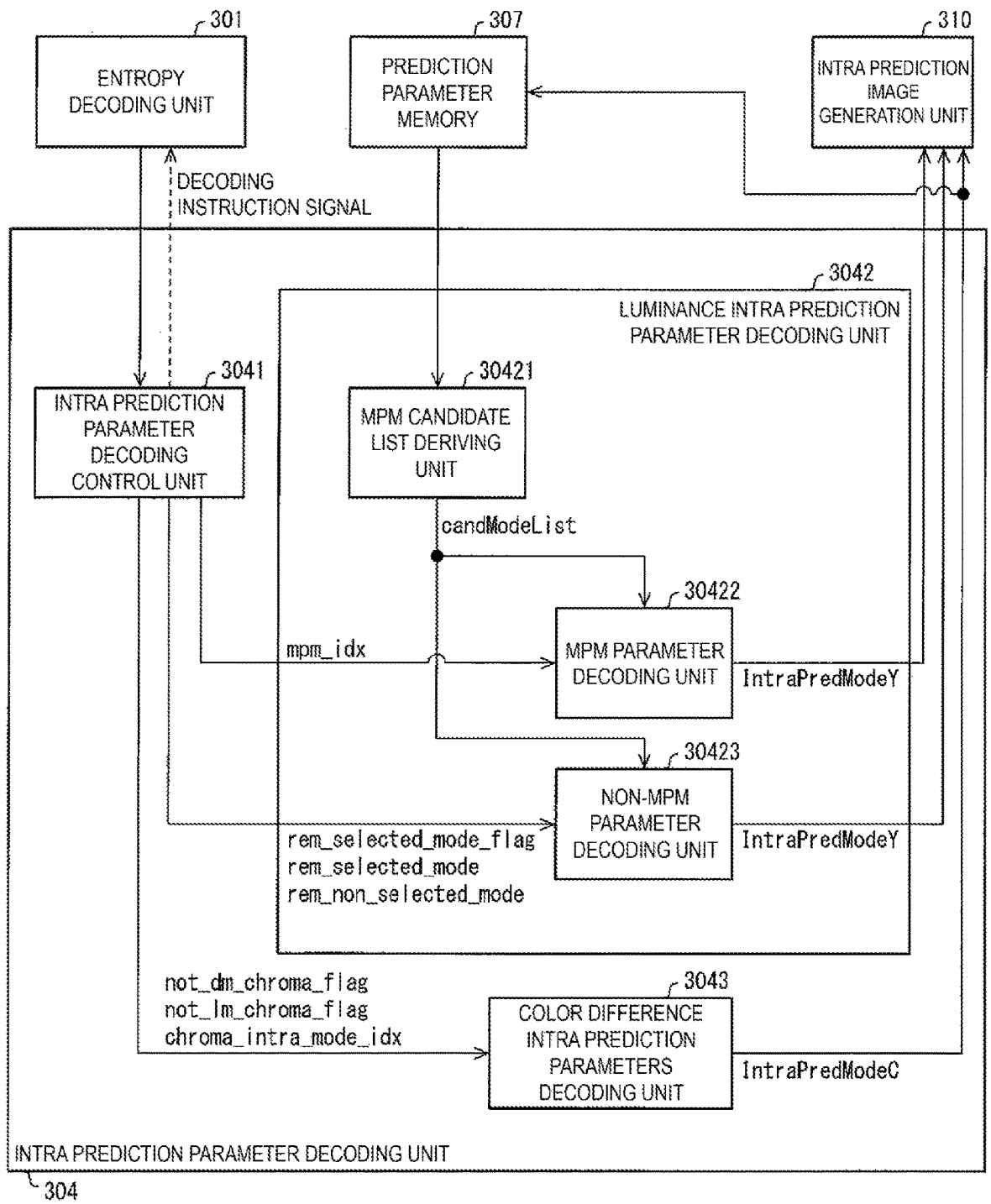
FIG. 16 is a schematic diagram illustrating a configuration of an intra prediction parameter decoding unit of a prediction parameter decoding unit of the image decoding apparatus illustrated in FIG. 5.

FIG. 16 is a schematic diagram illustrating a configuration of an intra prediction parameter decoding unit 304 of a prediction parameter decoding unit 302 of the image decoding apparatus 31 illustrated in FIG. 5. As illustrated in FIG. 16, the intra prediction parameter decoding unit 304 is configured to include an intra prediction parameter decoding control unit 3041, a luminance intra prediction parameter decoding unit 3042, and a chrominance intra prediction parameter decoding unit 3043.

The intra prediction parameter decoding control unit 3041 receives a code from the entropy decoding unit 301. In addition, the intra prediction parameter decoding control unit 3041 supplies a decoding instruction signal to the entropy decoding unit 301. In addition, the intra prediction parameter decoding control unit 3041 supplies the above-described MPM_idx to the MPM parameter decoding unit 30422 described later. In addition, the intra prediction parameter decoding control unit 3041 supplies rem_selected_mode_flag, rem_selected_mode, and rem_non_selected_mode to the non-MPM parameter decoding unit 30423 described later. In addition, the intra prediction parameter decoding control unit 3041 supplies not_dm_chroma_flag, not_lm_chroma_flag, and chroma_intra_mode_idx described above to the chrominance intra prediction parameter decoding unit 3043.

The luminance intra prediction parameter decoding unit 3042 is configured to include an MPM candidate list deriving unit 30421, an MPM parameter decoding unit 30422 (parameter decoding unit), and a non-MPM parameter decoding unit 30423 (parameter decoding unit, decoding unit, deriving unit).

The MPM candidate list deriving unit 30421 supplies the MPM candidate list to the MPM parameter decoding unit 30422 and the non-MPM parameter decoding unit 30423.

The MPM parameter decoding unit 30422 and the non-MPM parameter decoding unit 30423 supply the above-described luminance prediction mode IntraPredModeY to the intra prediction image generation unit 310.

The chrominance intra prediction parameter decoding unit 3043 supplies the chrominance prediction mode IntraPredModeC to the intra prediction image generation unit 310.

Derivation Method of Intra Prediction Parameters (Luminance) 1

When prev_intra_luma_pred_flag [x0] [y0] is 1, the prediction parameter decoding unit 302 selects the intra prediction mode IntraPredModeY [x0] [y0] of the target block (PU) in the luminance pixel from the MPM candidate list. The MPM candidate list (candidate list) is a list including a plurality of (for example, six) intra prediction modes, and is derived from the intra prediction mode and the predetermined intra prediction mode of an adjacent block.

The MPM parameter decoding unit 30422 selects the intra prediction mode IntraPredModeY [x0] [y0] stored in the MPM candidate list, using MPM_idx [x0] [y0] described in the syntax illustrated in FIG. 14.

Derivation Method of Intra Prediction Parameters (Luminance) 2

Next, a derivation method of the MPM candidate list will be described. The MPM candidate list deriving unit 30421 occasionally determines whether a certain prediction mode is already included in the MPM candidate list. The MPM candidate list deriving unit 30421 does not repeatedly add the prediction mode included in the MPM candidate list to the MPM candidate list. Then, when the number of prediction modes of the MPM candidate list reaches a predetermined number (for example, six), the MPM candidate list deriving unit 30421 ends the derivation of the MPM candidate list.

1. Addition of Adjacent Mode and Planar Mode

Figure 17:
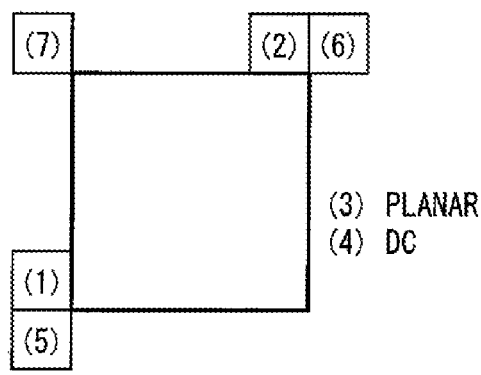
FIG. 17 is a schematic diagram illustrating an order of prediction modes when an MPM candidate list deriving unit adds to the MPM candidate list in the intra prediction parameter coding unit illustrated in FIG. 15 and in the intra prediction parameter decoding unit illustrated in FIG. 16.

FIG. 17 is a schematic diagram illustrating an order of prediction modes when an MPM candidate list deriving unit 30421 adds to the MPM candidate list in the intra prediction parameter coding unit 113 illustrated in FIG. 15 and in the intra prediction parameter decoding unit 304 illustrated in FIG. 16. As illustrated in FIG. 17, the MPM candidate list deriving unit 30421 adds the adjacent mode and the planar mode to the MPM candidate list in the following order.

(1) Intra prediction mode of the left block of the target block (adjacent mode)
(2) Intra prediction mode of the upper block of the target block (adjacent mode)
(3) PLANAR prediction mode (planar mode)
(4) DC prediction mode (planar mode)
(5) Intra prediction mode of the lower left block of the target block (adjacent mode)
(6) Intra prediction mode of the upper right block of the target block (adjacent mode)

(7) Intra prediction mode of the upper left block of the target block (adjacent mode)

2. Addition of Derived Mode

The MPM candidate list deriving unit 30421 adds a derived mode, which is a prediction mode before and after the prediction mode, that is a prediction mode with the mode number±1 illustrated in FIG. 12, to the MPM candidate list, for each of the directional prediction modes (other than the PLANAR prediction and the DC prediction) in the MPM candidate list.

3. Addition of Default Mode

The MPM candidate list deriving unit 30421 adds the default mode to the MPM candidate list. The default mode is a prediction mode in which the mode number is 50 (vertical/VER), 18 (horizontal/HOR), 2 (lower left), or 34 (upper left diagonal/DIA).

Note that, for convenience, it is assumed that the prediction mode where the mode number is 2 (lower left) and the prediction mode where the mode number is 66 (upper right/VDIA) are adjacent (mode number is ±1).

Derivation Method of MPM Candidate List

Figure 18:
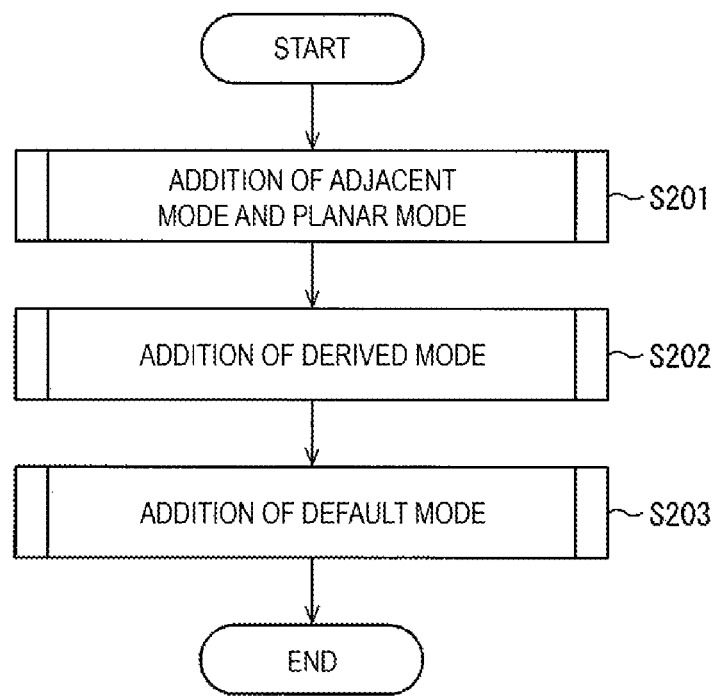
FIG. 18 is a flowchart illustrating an operation for deriving the MPM candidate list by the MPM candidate list deriving unit in the intra prediction parameter coding unit illustrated in FIG. 15 and in the intra prediction parameter decoding unit illustrated in FIG. 16.

FIG. 18 is a flowchart illustrating an operation for deriving the MPM candidate list by the MPM candidate list deriving unit 30421 in the intra prediction parameter coding unit 113 illustrated in FIG. 15 and in the intra prediction parameter decoding unit 304 illustrated in FIG. 16. As illustrated in FIG. 18, the operation in which the MPM candidate list deriving unit 30421 derives the MPM candidate list includes steps S201, S202, and S203.

Step S201

Figure 19A:
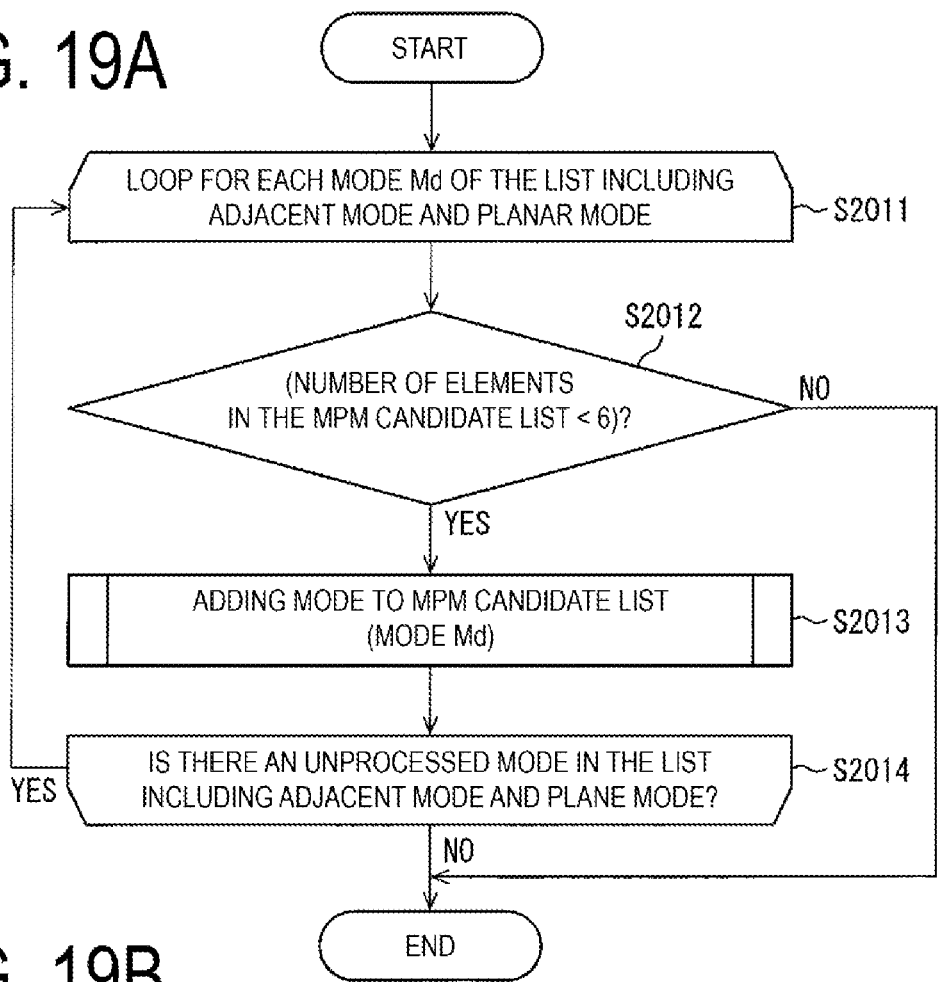
FIGS. 19A and 19B are flowcharts illustrating details of one step of the operation illustrated in FIG. 18.

The MPM candidate list deriving unit 30421 adds the adjacent mode and the planar mode to the MPM candidate list. FIG. 19A is a flowchart illustrating details step S201 of the operation illustrated in FIG. 18. As illustrated in FIG. 19A, the step S201 includes steps S2011 to S2014.

Step S2011

The MPM candidate list deriving unit 30421 starts loop processing for each mode Md of the list including the adjacent mode and the planar mode. Here, in Md, the i-th element of the loop target list is substituted for each loop (the same applies to the loops of other lists). Note that, "list including the adjacent mode and the planar mode" is a concept for convenience in described. This does not indicate an actual data structure, and the elements included may be processed in a predetermined order.

Step S2012

The MPM candidate list deriving unit 30421 determines whether the number of elements in the MPM candidate list is smaller than a predetermined number (for example, 6). In a case where the number of elements is smaller than 6 (YES), step S2013 is performed. In a case where the number of elements is not smaller than 6 (NO), step S201 is terminated.

Step S2013

Figure 19B:
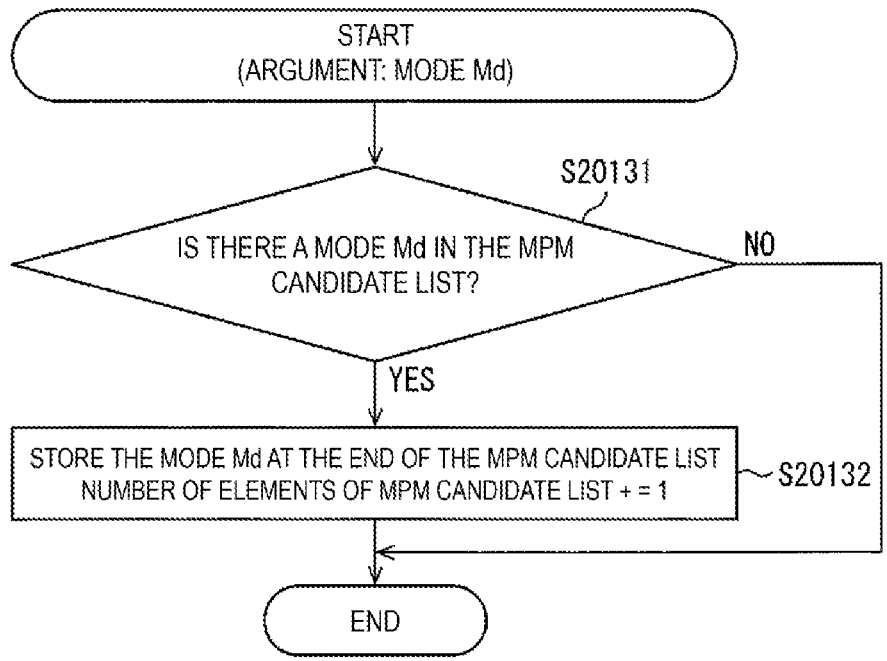

FIG. 19B is a flowchart illustrating details of step S2013 of step S201 illustrated in FIG. 19A. As illustrated in FIG. 19B, step S2013 includes steps S20131 and S20132.

In step S20131, the MPM candidate list deriving unit 30421 determines whether there is a mode Md in the MPM candidate list. In a case where there is no mode Md in the MPM candidate list (YES), step S20132 is performed. In a case where there is a mode Md in the MPM candidate list (NO), step S2013 is terminated.

In step S 20132, the MPM candidate list deriving unit 30421 adds the mode Md to the end of the MPM candidate list, and increases the number of elements of the MPM candidate list by one.

Step S2014

The MPM candidate list deriving unit 30421 determines whether there is an unprocessed mode in the list including the adjacent mode and the planar mode. In a case where there is an unprocessed mode (YES), step S2011 is re-performed. In a case where there is no unprocessed mode (NO), step S201 is terminated.

Step S202 (FIG. 18)

Figure 20A:
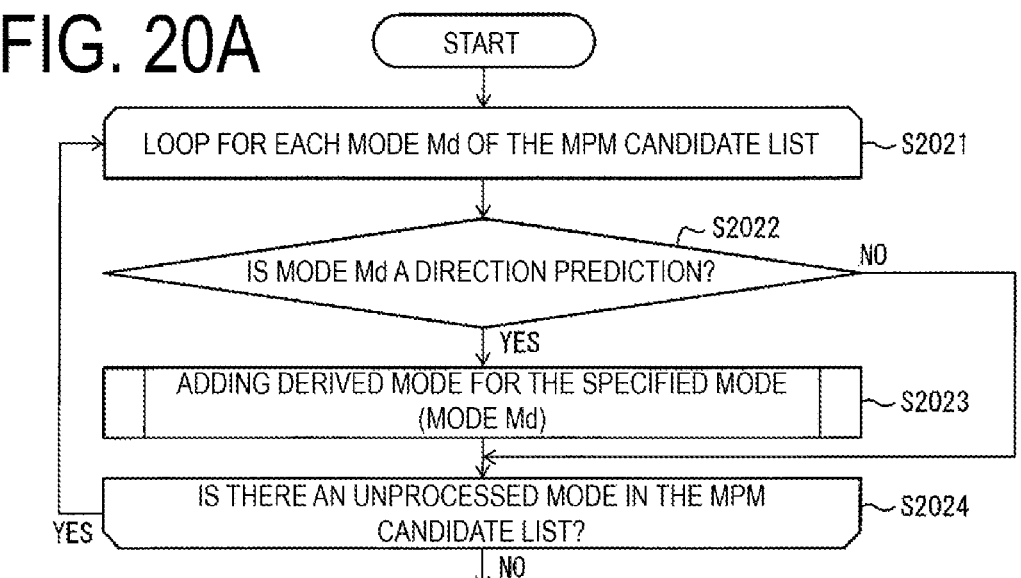
FIGS. 20A and 20B are flowcharts illustrating details of one step of the operation illustrated in FIG. 18.

The MPM candidate list deriving unit 30421 adds a derived mode to the MPM candidate list. FIG. 20A is a flowchart illustrating the details of step S202 of the operation illustrated in FIG. 18. As illustrated in FIG. 20A, step S202 includes steps S2021 to S2024.

Step S2021

The MPM candidate list deriving unit 30421 starts loop processing for each mode Md of the MPM candidate list.

Step S2022

The MPM candidate list deriving unit 30421 determines whether the mode Md is a directional prediction. In a case where the mode Md is directional prediction (YES), step S2023 is performed and step S2024 is performed. In a case where the mode Md is not directional prediction (NO), step S2024 is performed.

Step S2023

Figure 20B:
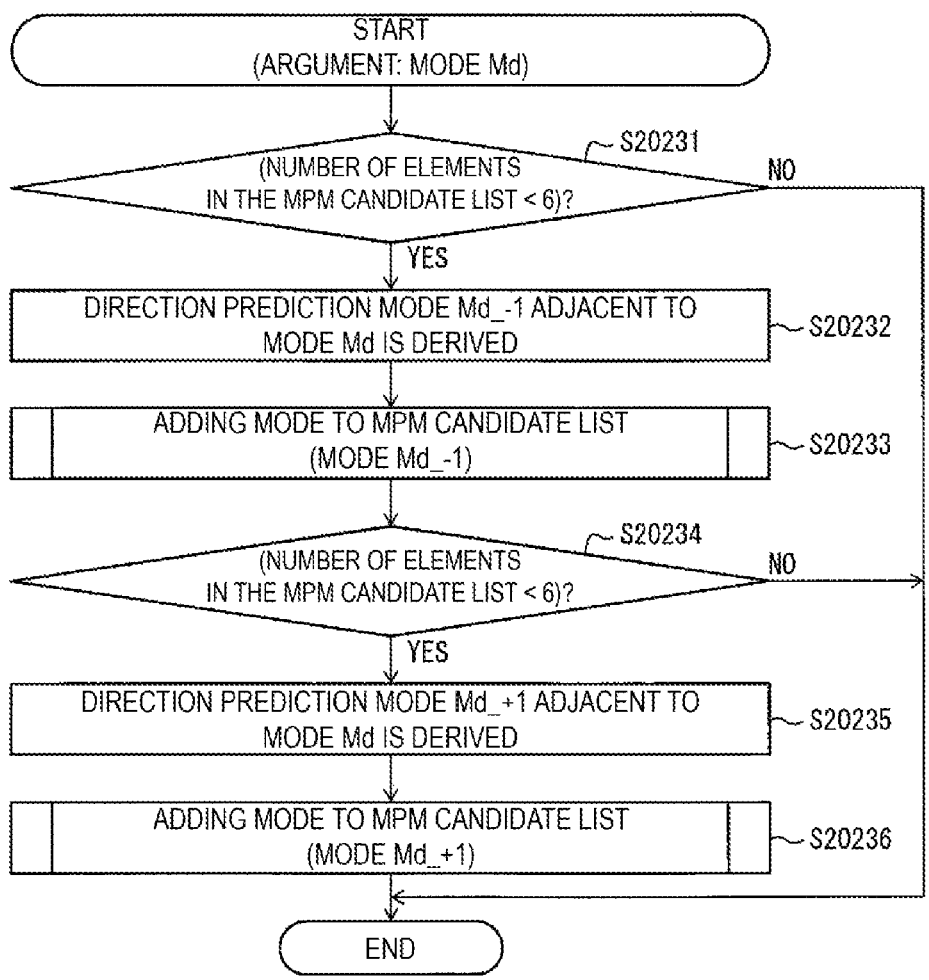

FIG. 20B is a flowchart illustrating details of step S2023 of step S202 illustrated in FIG. 20A. As illustrated in FIG. 20B, step S2023 includes steps S20231 to S20236.

In step S20231, the MPM candidate list deriving unit 30421 determines whether the number of elements in the MPM candidate list is smaller than 6. In a case where the number of elements is smaller than 6 (YES), step S20232 is performed. In a case where the number of elements is not smaller than 6 (NO), step S2023 is terminated.

In step S20232, the MPM candidate list deriving unit 30421 derives the directional prediction mode Md_−1 adjacent to the mode Md. As described above, the mode Md is determined to be the directional prediction mode in step S2022, and the mode number corresponding to the mode Md is any one of 2 to 66 illustrated in FIG. 12. At this time, the directional prediction mode Md_−1 adjacent to the mode Md is a directional prediction mode corresponding to the mode number obtained by subtracting 1 from the mode number corresponding to the mode Md. However, when the mode number corresponding to the mode Md is 2, the directional prediction mode Md_−1 adjacent to the mode Md is the prediction direction mode corresponding to the mode number 66.

In step S20233, Md_−1 is passed to the argument Md in step S2013 illustrated in FIG. 19B and processing is performed.

In step S20234, the MPM candidate list deriving unit 30421 determines whether the number of elements in the MPM candidate list is smaller than 6. In a case where the number of elements is smaller than 6 (YES), step S20235 is performed. In a case where the number of elements is not smaller than 6 (NO), step S2023 is terminated.

In step S20235, the MPM candidate list deriving unit 30421 derives the directional prediction mode Md_+1 adjacent to the mode Md. The directional prediction mode Md_+1 adjacent to the mode Md is a directional prediction mode corresponding to the mode number obtained by adding 1 to the mode number corresponding to the mode Md. However, when the mode number corresponding to the mode Md is 66, the directional prediction mode Md_+1 adjacent to the mode Md is set to mode number 2.

In step S20236, Md_+1 is passed to the argument Md in step S2013 illustrated in FIG. 19B and processing is performed.

Step S2024

The MPM candidate list deriving unit 30421 determines whether there is an unprocessed mode in the MPM candidate list. In a case where there is an unprocessed mode in the MPM candidate list (YES), step S2021 is re-performed. In a case where there is no unprocessed mode in the MPM candidate list (NO), step S202 is terminated.

Step S203 (FIG. 18)

Figure 21:
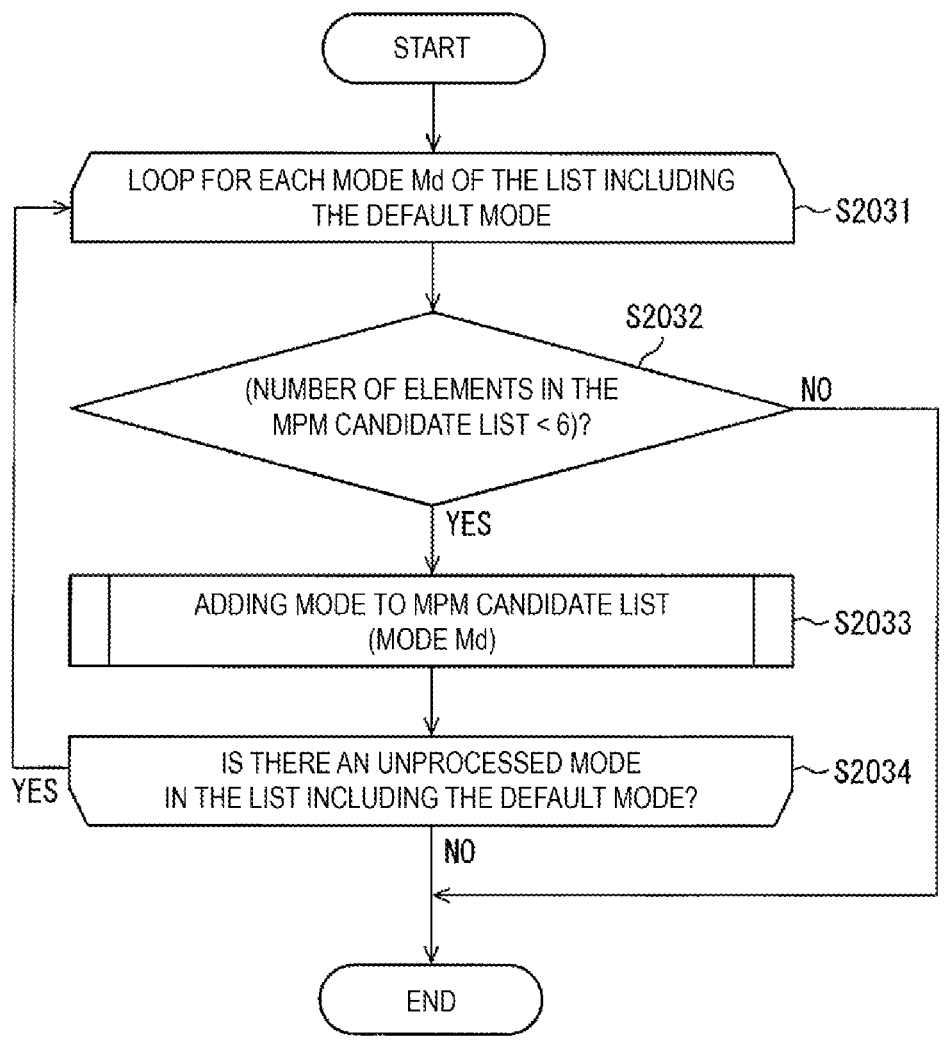
FIG. 21 is a flowchart illustrating details of one step of the operation illustrated in FIG. 18.

The MPM candidate list deriving unit 30421 adds a default mode to the MPM candidate list. FIG. 21 is a flowchart illustrating the details of step S203 of the operation illustrated in FIG. 18. As illustrated in FIG. 21, step S203 includes steps S2031 to S2034.

Step S2031

The MPM candidate list deriving unit 30421 starts loop processing for each mode Md of the list including the default mode.

Step S2032

The MPM candidate list deriving unit 30421 determines whether the number of elements in the MPM candidate list is smaller than 6. In a case where the number of elements is smaller than 6 (YES), step S2033 is performed. In a case where the number of elements is not smaller than 6 (NO), step S203 is terminated.

Step S2033

In step S2033, Md in step S2031 is passed to the argument Md in step S2013 illustrated in FIG. 19B, and processing is performed.

Step S2034

The MPM candidate list deriving unit 30421 determines whether there is an unprocessed mode in the list including the default mode. In a case where there is an unprocessed mode (YES), step S2031 is re-performed. In a case where there is no unprocessed mode (NO), step S203 is terminated.

Derivation Method of Intra Prediction Parameters (Luminance) 3

When prev_intra_luma_predflag[x0] [y0] is 0, the non-MPM parameter decoding unit 30423 derives the intra prediction mode IntraPredModeY [x0] [y0] of the target block (PU) in the luminance pixel using the RemIntraPredMode and the MPM candidate list.

First, if rem_selected_mode_flag [x0] [y0] is 1, RemIntraPredMode is a value obtained by bit-shifting the value of rem_selected_mode to the left by 2 bits. If rem_selected_mode_flag [x0] [y0] is 0, then RemIntraPredMode is a value obtained by adding 1 to a quotient obtained by dividing a value of 4 times the value of rem_non_selected_mode, by 3. Table 1 shows the correspondence between rem_selected_mode, rem_non_selected_mode, and RemIntraPredMode. RemIntraPredMode may be calculated using a table as shown in Table 1 instead of the above-described calculation.

TABLE 1

| rem_selected_mode | 0 | | | | 1 | | | 2 | | | ... |
|---|---|---|---|---|---|---|---|---|---|---|---|
| rem_non_selected_mode | | 0 | 1 | 2 | | 3 | 4 | 5 | 6 | | ... |
| RemIntraPredMode | 0 | 1 | 2 | 3 | 4 | 5 | 6 | 7 | 8 | 9 | ... |

Note that, the calculation of RemIntraPredMode is not limited to the above example. Further, the correspondence between the values of RemIntraPredMode, rem_selected_mode, and rem_non_selected_mode may be different from the above example. For example, if rem_selected_mode_flag [x0] [y0] is 1, RemIntraPredMode can be calculated by setting RemIntraPredMode as a value obtained by bit-shifting the value of rem_selected_mode to the left by 3 bits, and if rem_selected_mode_flag [x0] [y0] is 0, RemIntraPredMode can also be calculated by setting a value obtained by adding 1 to a quotient obtained by dividing a value, which is obtained by multiplying the value of rem_non_selected_mode by 8, by 7, as RemIntraPredMode.

In a case where rem_selected_mode [x0] [y0] is fixed-length coded, as shown in Table 1, by dispersing and allocating rem_selected_mode with respect to RemIntraPredMode, the magnitude of the mode number does not affect the code amount of the coding data, and the bias in direction selection is reduced.

Derivation Method of Intra Prediction Parameters (Luminance) 4

Since RemIntraPredMode represents the serial number assigned to non-MPM, in order to derive IntraPredModeY [x0] [y0], it is necessary to perform a correction by comparison with the prediction mode value of the MPM included in the MPM candidate list. Examples of derivation processing by pseudo code are as follows.

```
intraPredMode = RemIntraPredMode
sortedCandModeList = sort (candModeList) // Sort by mode number in ascending order
for (i = 0; i < size of sortedCandModeList; i ++) {
    if (intraPredMode >= sortedCandModeList [i]) {
        intraPredMode + = 1
    }
}
IntraPredModeY [x0] [y0] = intraPredMode
```

After initializing the variable intraPredMode with RemIntraPredMode, the non-MPM parameter decoding unit 30423 compares the variable intraPredMode with the prediction mode value included in the MPM candidate list in ascending order, and in a case where the prediction mode value is smaller than intraPredMode, 1 is added to intraPredMode. The value of intraPredMode obtained by performing this process on all elements of the MPM candidate list is IntraPredModeY [x0] [y0].

Derivation Method of Intra Prediction Parameters (Luminance) 5

Table 2 shows the relationship between the MPM candidate (candModeList), RemIntraPredMode, rem_selected_mode, and rem_non_selected_mode when the intra prediction modes (mode numbers) 0, 1, 18, and 49 to 51 (black) are set as the MPM candidate (candModeList).

TABLE 2

| A: TYPE OF INTRA PREDICTION MODE (MODE NUMBER) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| B: MPM CANDIDATE (CANDMODELIST) | X | X | | | | | | | | | | | | | | | | | X | | | | |
| C: RemIntraPredMode | | | 0 | 1 | 2 | 3 | 4 | 5 | 6 | 7 | 8 | 9 | 10 | 11 | 12 | 13 | 14 | 15 | | 16 | 17 | 18 | 19 |
| D: rem_selected_mode | | | 0 | | | | 1 | | | | 2 | | | | 3 | | | | | 4 | | | |
| E: rem_non_selected_mode | | | | 0 | 1 | 2 | | 3 | 4 | 5 | | 6 | 7 | 8 | | 9 | 10 | 11 | | | 12 | 13 | 14 |

| A: TYPE OF INTRA PREDICTION MODE (MODE NUMBER) | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|---|---|---|---|---|---|
| B: MPM CANDIDATE (CANDMODELIST) | | | | | | | | | | | | | | | | | | | | | | | |
| C: RemIntraPredMode | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
| D: rem_selected_mode | 5 | | | | 6 | | | | 7 | | | | 8 | | | | 9 | | | | 10 | | |
| E: rem_non_selected_mode | | 15 | 16 | 17 | | 18 | 19 | 20 | | 21 | 22 | 23 | | 24 | 25 | 26 | | 27 | 28 | 29 | | 30 | 31 |

| A: TYPE OF INTRA PREDICTION MODE (MODE NUMBER) | 46 | 47 | 48 | 49 | 50 | 51 | 52 | 53 | 54 | 55 | 56 | 57 | 58 | 59 | 60 | 61 | 62 | 63 | 64 | 65 | 66 |
|---|---|---|---|---|---|---|---|---|---|---|---|---|---|---|---|---|---|---|---|---|---|
| B: MPM CANDIDATE (CANDMODELIST) | | | | X | X | X | | | | | | | | | | | | | | | |
| C: RemIntraPredMode | 43 | 44 | 45 | | | | 46 | 47 | 48 | 49 | 50 | 51 | 52 | 53 | 54 | 55 | 56 | 57 | 58 | 59 | 60 |
| D: rem_selected_mode | | 11 | | | | | | | 12 | | | | 13 | | | | 14 | | | | 15 |
| E: rem_non_selected_mode | 32 | | 33 | | | | 34 | 35 | | 36 | 37 | 38 | | 39 | 40 | 41 | | 42 | 43 | 44 | |

As described above, REM is classified into selected mode and non-selected mode.

Selected Mode

Selected mode is a mode group selected from RemIntraPredMode. For example, the remainder obtained by dividing RemIntraPredMode by 4 is 0. In this case, there is no difference in the number of bits of the coding data depending on the direction of the prediction mode, that is, the directional bias of the prediction mode selection can be reduced in the image coding apparatus 11 (FIG. 6). The serial number (rem_selected_mode) in the selected mode is fixed-length coded (4 bits for selecting 16 prediction modes in the present embodiment). Since it can be converted to coding data having a shorter number of bits than the non-selected mode to be described later, among RemIntraPredMode, a prediction mode having a relatively high probability of being selected may be selected.

Non-Selected Mode

The serial number (rem_non_selected_mode) in the non-selected mode is variable length coded. Since the coded rem_non_selected_mode is a variable length code, the number of bits of the coding data differs depending on the direction of the prediction mode. Specifically, the number of bits is 5 bits or 6 bits, and 20 prediction modes are coded with 5 bits from the one with the smaller prediction mode number. Similarly to this, even in a case where coding is performed to 5 bits or 6 bits, the coding amount can be reduced by associating the prediction direction with a high possibility of being selected with shorter codes. Alternatively, if the number of bits of coding data of rem_non_selected_mode is wider (for example, in the range of 4 bits to 8 bits) and the prediction direction with high possibility of being selected corresponds to a shorter (4 bit) code, the code amount can be further reduced.

Modification of Derivation Method of MPM Candidate List Based on Shape of Block

As described above, in the related art, differences in shape of block of PU are not sufficiently taken into consideration, and there is room for improvement in coding efficiency. For example, the derivation method of the MPM candidate list which emphasizes the vertical direction in the vertically long block and the horizontal direction in the horizontally long block can be adopted.

A-1.1: Addition of Adjacent Mode and Planar Mode Based on Shape of Block

The above-described problem can be solved by changing the order and/or contents of the prediction modes to be added to the MPM candidate list as the adjacent mode and the planar mode, according to whether the shape of the block is vertically long or horizontally long.

Specifically, in a case where the target block is vertically long, the prediction mode of the adjacent block on the upper side of the target block is to be added preferentially or in a greater amount. In a case where the target block is horizontally long, the prediction mode of the adjacent block on the left side of the target block is to be added preferentially or in a larger amount.

Figure 22A:
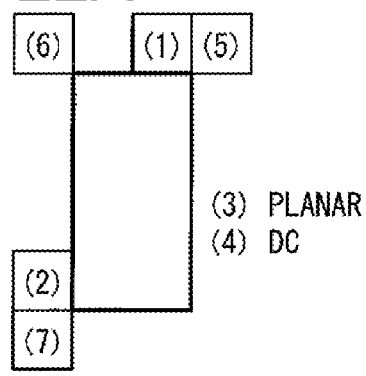
FIGS. 22A to 22D are schematic diagrams illustrating the order of prediction modes when the MPM candidate list deriving unit adds to the MPM candidate list based on the shape of the block, which is different from the addition order illustrated in FIG. 17.

FIG. 22A is a schematic diagram illustrating an addition order of prediction modes when the MPM candidate list deriving unit 30421 adds the prediction mode to the MPM candidate list based on the shape of the block, which is different from the addition order illustrated in FIG. 17. As illustrated in FIG. 22A, the MPM candidate list deriving unit 30421 adds the adjacent mode and the planar mode to the MPM candidate list in the following order.

(1) Intra prediction mode of the upper block of the target block (adjacent mode)

(2) Intra prediction mode of the left block of the target block (adjacent mode)

(3) PLANAR prediction mode (planar mode)

(4) DC prediction mode (planar mode)

(5) Intra prediction mode of the upper right block of the target block (adjacent mode)

(6) Intra prediction mode of the upper left block of the target block (adjacent mode)

(7) Intra prediction mode of the lower left block of the target block (adjacent mode)

In FIG. 17, the intra prediction mode of the adjacent block on the upper side of the target block is added to the second in the MPM candidate list, but in FIG. 22A it is added to the first in the MPM candidate list. In this manner, in a case where the target block is vertically long, the intra prediction mode of the adjacent block on upper side of the target block is to be added preferentially.

Preferentially adding the intra prediction mode to the MPM candidate list (that is, with respect to the index with a smaller value) is to make the bit length of the syntax element (MPM_idx) required to selecting the intra prediction mode as the MPM shorter to improve coding efficiency.

Note that, in a case where the target block is horizontally long, the intra prediction mode of the adjacent block on the left side of the target block may to be added preferentially. However, as illustrated in FIG. 17, in a case where the intra prediction mode of the adjacent block on the left side of the target block is prioritized, that is, added to the first in the MPM candidate list, the MPM candidate list may remain as it is.

Figure 22B:
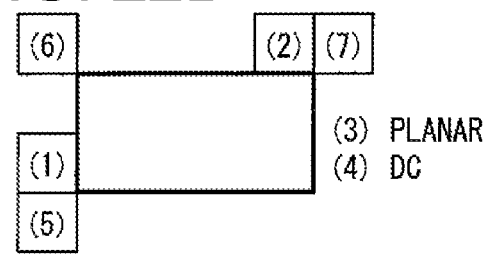

FIG. 22B is a schematic diagram illustrating an addition order different from the addition order illustrated in FIG. 22A. As illustrated in FIG. 22B, the MPM candidate list deriving unit 30421 adds the adjacent mode and the planar mode to the MPM candidate list in the following order.

(1) Intra prediction mode of the left block of the target block (adjacent mode)
(2) Intra prediction mode of the upper block of the target block (adjacent mode)
(3) PLANAR prediction mode (planar mode)
(4) DC prediction mode (planar mode)
(5) Intra prediction mode of the lower left block of the target block (adjacent mode)
(6) Intra prediction mode of the upper left block of the target block (adjacent mode)
(7) Intra prediction mode of the upper right block of the target block (adjacent mode)

As illustrated in FIG. 17, in a case where the intra prediction mode of the adjacent block on the left side of the target block is prioritized, that is, added to the first position in the MPM candidate list, as illustrated in FIG. 22B, the MPM candidate list remains as it is.

On the other hand, in FIG. 17, the intra prediction mode of the adjacent block on the lower left side of the target block is added to the seventh in the MPM candidate list, but in FIG. 22B, the intra prediction mode is added to the fifth in the MPM candidate list. In this manner, in a case where the target block is horizontally long, the intra prediction mode of the adjacent block on the left side of the target block is to be added preferentially.

Figure 22C:
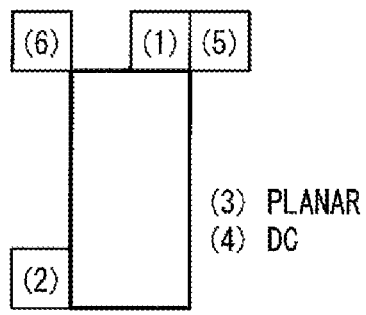

A-1.2: Addition of Adjacent Mode and Planar Mode Based on Shape of Block: Modified Example FIG. 22C is a modification of the aspect illustrated in FIG. 22A. As illustrated in FIG. 22C, the MPM candidate list deriving unit 30421 may add the adjacent mode and the planar mode to the MPM candidate list as following.

(1) Intra prediction mode of the upper block of the target block (adjacent mode)
(2) Intra prediction mode of the left block of the target block (adjacent mode)
(3) PLANAR prediction mode (planar mode)
(4) DC prediction mode (planar mode)
(5) Intra prediction mode of the upper right block of the target block (adjacent mode)
(6) Intra prediction mode of the upper left block of the target block (adjacent mode)

In FIG. 22A, the intra prediction mode of the adjacent block on the lower left side of the target block is added to the seventh in the MPM candidate list, but the intra prediction mode is not added in FIG. 22C. In this manner, in a case where the target block is vertically long, by not adding the intra prediction mode of the adjacent block on the lower left side of the target block to the MPM candidate list, the ratio of the intra prediction mode of the adjacent block on the upper side of the target block in the MPM candidate list is relatively high. In addition, by not adding, unnecessary prediction modes is suppressed from being added to the MPM candidate list as a derived mode.

Figure 22D:
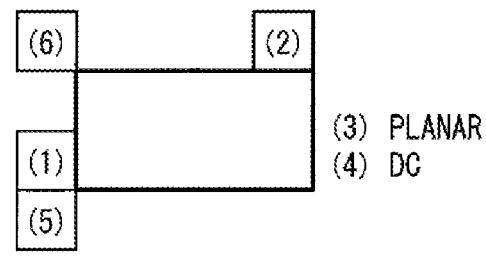

FIG. 22D is a modification of the aspect illustrated in FIG. 22B. As illustrated in FIG. 22D, the MPM candidate list deriving unit 30421 may add the adjacent mode and the planar mode to the MPM candidate list as following.

(1) Intra prediction mode of the left block of the target block (adjacent mode)
(2) Intra prediction mode of the upper block of the target block (adjacent mode)
(3) PLANAR prediction mode (planar mode)
(4) DC prediction mode (planar mode)
(5) Intra prediction mode of the lower left block of the target block (adjacent mode)
(6) Intra prediction mode of the upper left block of the target block (adjacent mode)

In FIG. 22B, the intra prediction mode of the adjacent block on the upper right side of the target block is added to the seventh in the MPM candidate list, but the intra prediction mode is not added in FIG. 22D. In this manner, in a case where the target block is horizontally long, by not adding the intra prediction mode of the adjacent block on the upper right side of the target block to the MPM candidate list, the ratio of the intra prediction mode of the adjacent block on the left side of the target block in the MPM candidate list is relatively high. In addition, by not adding, unnecessary prediction modes is suppressed from being added to the MPM candidate list as a derived mode.

A-2: Addition of Derived Mode Based on Shape of Block

The above-described problem can be solved by that the MPM candidate list deriving unit 30421 changes the order and/or contents of prediction modes to be added to the MPM candidate list as a derived mode according to whether the shape of the block is vertically long or horizontally long. Note that, in the following, the subject which performs adding the prediction mode and the like to the MPM candidate list is the MPM candidate list deriving unit 30421.

Changing Order

Specifically, in a case where the target block is vertically long, first try to add a derived mode for the vertical directional prediction mode and then try to add a derived mode for the horizontal directional prediction mode. In a case where the target block is horizontally long, reverse it to the case where the target block is vertically long, that is, first try to add a derived mode for the horizontal directional prediction mode and then try to add a derived mode for the vertical directional prediction mode.

In a case where the target block is a square block, the derived mode is added in the same way as "2. Addition of Derived Mode". The method for classifying the prediction mode into the vertical direction/horizontal direction is preferably the same as the context of Context Adaptive Binary Arithmetic Coding (CABAC). The context of CABAC will be described in detail later.

Addition Operation of Derived Mode Based on Shape of Block

Figure 23:
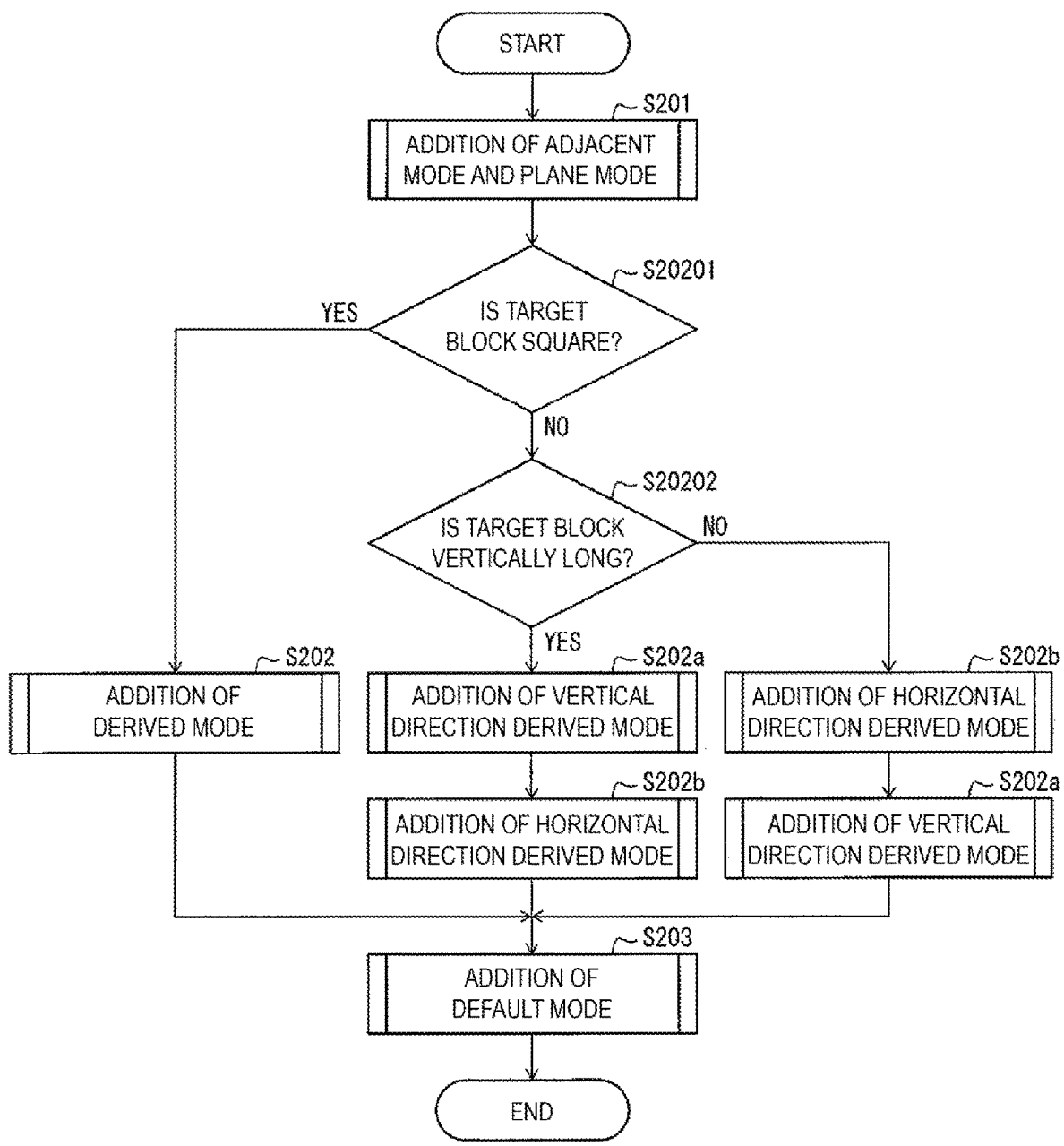
FIG. 23 is a flowchart illustrating an operation of deriving an MPM candidate list by an MPM candidate list deriving unit, which is different from the operation illustrated in FIG. 18.

FIG. 23 is a flowchart illustrating the operation for deriving the MPM candidate list by the MPM candidate list deriving unit 30421 which is different from the operation illustrated in FIG. 18. The operation illustrated in FIG. 23 includes steps S201, S20201, S202, S20202, two S202a, two S202b, and S203.

Step S20201

After the step S201, the MPM candidate list deriving unit 30421 determines whether the target block is a square. In a case where the target block is a square (YES), step S202 is performed. In a case where the target block is not a square (NO), step S20202 is performed.

Step S20202

The MPM candidate list deriving unit 30421 determines whether the target block is vertically long. In a case where the target block is vertically long (YES), step S202a is performed. In a case where the target block is not vertically long (NO), step S202b is performed.

Step S202a

The MPM candidate list deriving unit 30421 adds the vertical direction derivation mode to the MPM candidate list. In a case where step S202a is performed after step S20202, step S202b is performed after step S202a. In a case where step S202b is performed after step S202a, step S203 is performed after step S202b.

Figure 24A:
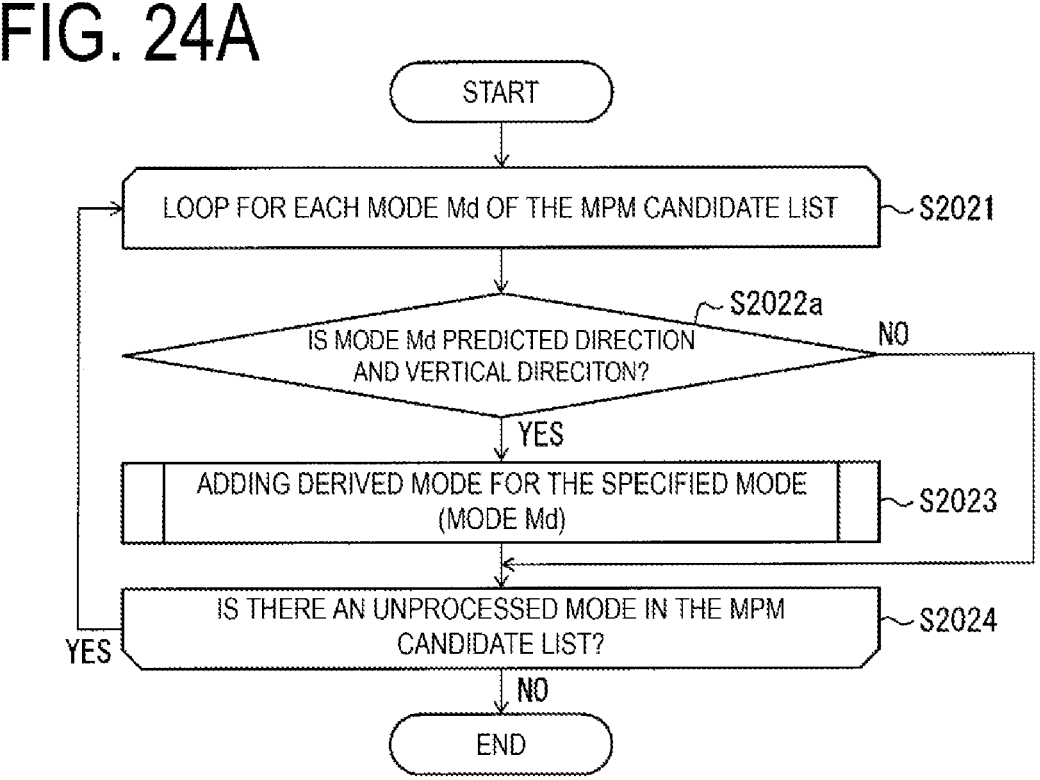
FIGS. 24A and 24B are flowcharts illustrating details of one step of the operation illustrated in FIG. 23.

FIG. 24A is a flowchart illustrating the details of step S202a of the operation illustrated in FIG. 23. As illustrated in FIG. 24A, step S202a includes steps S2021, S2022a, S2023, and S2024.

Step S2022a

After step S2021, the MPM candidate list deriving unit 30421 determines whether the mode Md is direction predicted and is in the vertical direction. In a case where the mode Md is directional prediction and is in the vertical direction (YES), step S2023 is performed and step S2024 is performed. In a case where the mode Md is not the directional prediction and is not in the vertical direction (NO), step S2024 is performed.

Step S202b

The MPM candidate list deriving unit 30421 adds a horizontal direction derivation mode to the MPM candidate list. In a case where step S202b is performed after step S20202, step S202a is performed after step S202b. In a case where step S202a is performed after step S202b, step S203 is performed after step S202a.

Figure 24B:
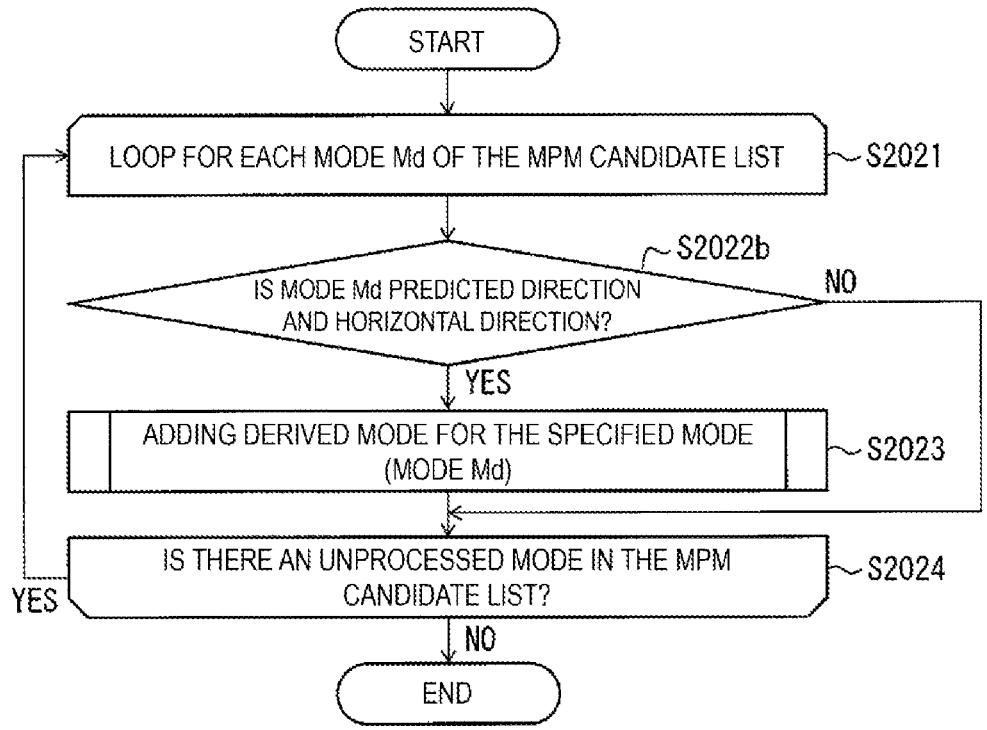

FIG. 24B is a flowchart illustrating the details of step S202b of the operation illustrated in FIG. 23. As illustrated in FIG. 24B, step S202b includes steps S2021, S2022b, S2023, and S2024.

Step S2022b

After step S2021, the MPM candidate list deriving unit 30421 determines whether the mode Md is direction predicted and is in the horizontal direction. In a case where the mode Md is directional prediction and is in the horizontal direction (YES), step S2023 is performed and step S2024 is performed. In a case where the mode Md is not the directional prediction and is not in the horizontal direction, (NO), step S2024 is performed.

Changing Content

In a case where the target block is vertically long, try to add the derived mode only for the prediction mode in the vertical direction. For the prediction mode in the horizontal direction, it is not supposed to add the derived mode. As an exception, only some modes (such as the horizontal direction in which the mode number is 18) may be added.

In a case where the target block is horizontally long, reverse it to the case where the target block is vertically long, that is, try to add the derived mode only for the prediction mode in the horizontal direction. For the prediction mode in the vertical direction, it is not supposed to add the derived mode. As an exception, only some modes (such as the vertical direction in which the mode number is 50) may be added.

A-3: Addition of Default Mode Based on Shape of Block

The above-described problem can be solved by changing the order and/or content of the prediction modes added to the MPM candidate list as the default mode according to whether the shape of the block is vertically long or horizontally long.

Specifically, in a case where the target block is vertically long, the default mode is configured such that the prediction mode in the vertical direction is added in advance or more. In the case of the horizontally long blocks, the default mode is configured such that the prediction mode in horizontal direction is added in advance or more.

In a case where the target block is a square block, the default mode is added in the same way as the "3. addition of the default mode". At least the order of the prediction mode in horizontal direction with mode number 18 or the prediction mode in vertical direction with mode number 50 is changed according to the direction of the long side/short side of the target block. Since the diagonal direction is relatively less important than the horizontal direction/vertical direction, it may not be changed, but it is changed, the directions are prioritized closer to the horizontal directions/vertical directions, respectively.

A-3: Addition Operation of Default Mode Based on Shape of Block Sequence Change Example In a case where the shape of the block is vertically long/horizontally long, the prediction mode in the vertical direction/horizontal direction is prioritized respectively. For example, change the default mode as follows. In the following, the prediction mode is indicated by mode number.

| Before change: | | 50, 18, 2, 34 |
|---|---|---|
| After change: | Vertically long: | 50, 18, 34, 2 |
| | Horizontally long: | 18, 50, 2, 34 |
| | Square: | 50, 18, 2, 34 |

In a case where the target block is vertically long, the MPM candidate list deriving unit 30421 prioritizes 34 to 2. In a case where the target block is horizontally long, the MPM candidate list deriving unit 30421 prioritizes 18 to 50.

As described above, 50 is a prediction mode in the vertical (VER) direction. 18 is a prediction mode in the horizontal (HOR) direction. 2 is a prediction mode from the lower left to the upper right. 34 is a prediction mode from the upper left to the lower right (DIA) direction.

Content Change Example 1

In a case where the shape of the block is vertically long/horizontally long, inclined directions close to the vertical direction/horizontal direction are included in the default mode respectively. For example, change the default mode as follows.

| After change: | Vertically long: | 50, 58, 42, 18, 2, 34 |
|---|---|---|
| | Horizontally long: | 18, 10, 26, 50, 2, 34 |
| | Square: | 50, 18, 2, 34 |

In a case where the target block is vertically long, the default mode includes 58 and 42. If the target block is horizontally long, the default mode includes 10 and 26.

Here, 58 and 42 are near-vertical diagonal prediction modes. 10 and 26 are near-horizontal diagonal prediction modes.

Content Change Example 2

If the total number of prediction modes included in the default mode is fixed, for example, the default mode is changed as follows.

| After change: | Vertically long: | 50, 58, 42, 18 |
| --- | --- | --- |
| | Horizontally long: | 18, 10, 26, 50 |
| | Square: | 50, 18, 2, 34 |

A-4: Change of Condition to be Viewed as Duplicated Direction Based on Shape of Block The above-described problem can be solved by changing the condition to be viewed as duplicated direction, according to whether the shape of the block is vertically long or horizontally long. "Condition to be viewed as duplicated direction" means a condition for determining whether the prediction mode is already included in the MPM candidate list when adding a prediction mode to the MPM candidate list.

In a case where the target block is vertically long, add the following condition to the condition to be viewed as duplicated direction. Condition: If the MPM candidate list already includes a prediction mode indicating a neighboring direction of a certain horizontal directional prediction mode, the directional prediction mode is not repeatedly added.

In a case where the target block is horizontally long, add the following condition to the condition to be viewed as duplicated direction. Condition: If the MPM candidate list already includes a prediction mode indicating a neighboring direction of a certain vertical directional prediction mode, the directional prediction mode is not repeatedly added.

"Prediction mode indicating a neighboring direction" designates a directional prediction mode having a mode number in a predetermined range (for example, ±1) before and after the directional prediction mode. Note that, by the wrap around processing, 2 (lower left) and 66 (upper right) are viewed as adjacent directions.

By adding such a condition, the directional prediction mode of the short side direction (meaning a direction crossing the long side. the distance from the reference pixel is short, the difference in angle is hard to appear) is prevented from being added to the MPM candidate list, and the opportunity to add directional prediction of the long side direction (Meaning the direction crossing the short side) to the MPM candidate list is relatively increased.

Figure 25:
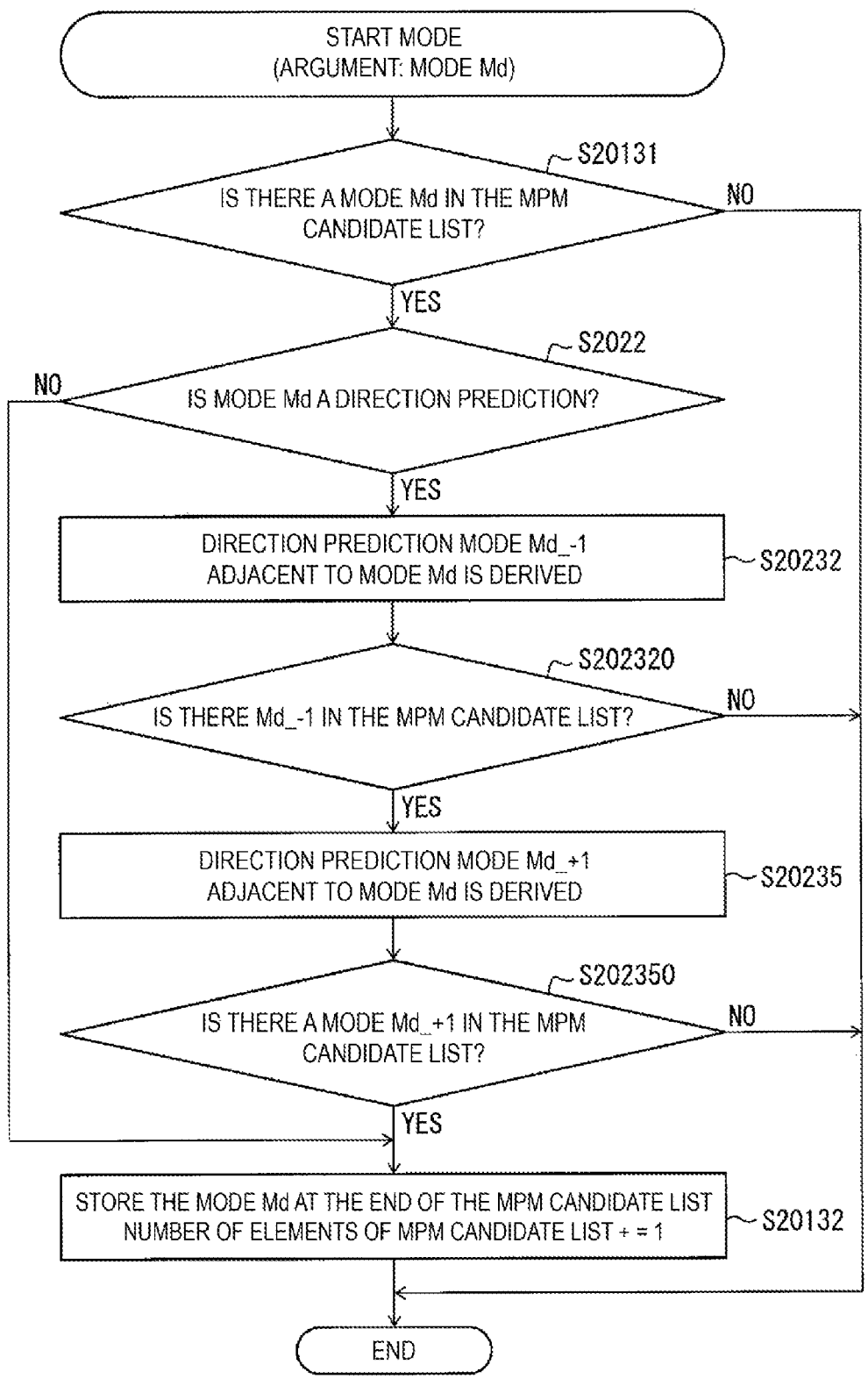
FIG. 25 is a flowchart illustrating details of one step, which is different from the details illustrated in FIGS. 19A and 19B.

Change Operation of Condition to be Viewed as Duplicated Direction Based on Shape of Block FIG. 25 is a flowchart illustrating details of step S2013 which is different from the details illustrated in FIG. 19B. In step S2013 illustrated in FIG. 25, a mode addition processing is performed in the case where the determination of the derived (mode number is ±1) mode is added. As illustrated in FIG. 25, step S2013 includes steps S20131, S2022, S20232, S202320, S20235, S202350, and S20132.

As described above, steps S2022, S20232, and S20235 are steps related to the derivation of the derived mode. In this way, derivation processing of the derived mode can be used.

In step S20131, in a case where there is no mode Md in the MPM candidate list (YES), step S2022 and the subsequent steps are performed. In a case where there is a mode Md in the MPM candidate list (NO), step S2013 is terminated.

In step S2022, in a case where the mode Md is directional prediction (YES), step S20232 and subsequent steps are performed. In a case where the mode Md is not the directional prediction (NO), step S20132 is performed.

In step S202320, the MPM candidate list deriving unit 30421 determines whether there is a directional prediction mode Md_−1 adjacent to the mode Md in the MPM candidate list. In a case where there is no directional prediction mode Md_−1 in the MPM candidate list (YES), step S20235 and subsequent steps are performed. In a case where there is a directional prediction mode Md_−1 in the MPM candidate list (NO), step S2013 is terminated.

In step S202350, the MPM candidate list deriving unit 30421 determines whether there is a directional prediction mode Md_+1 adjacent to the mode Md in the MPM candidate list. In a case where there is no directional prediction mode Md_+1 in the MPM candidate list (YES), step S20132 is performed. In a case where there is a directional prediction mode Md_+1 in the MPM candidate list (NO), step S2013 is terminated.

Figure 26:
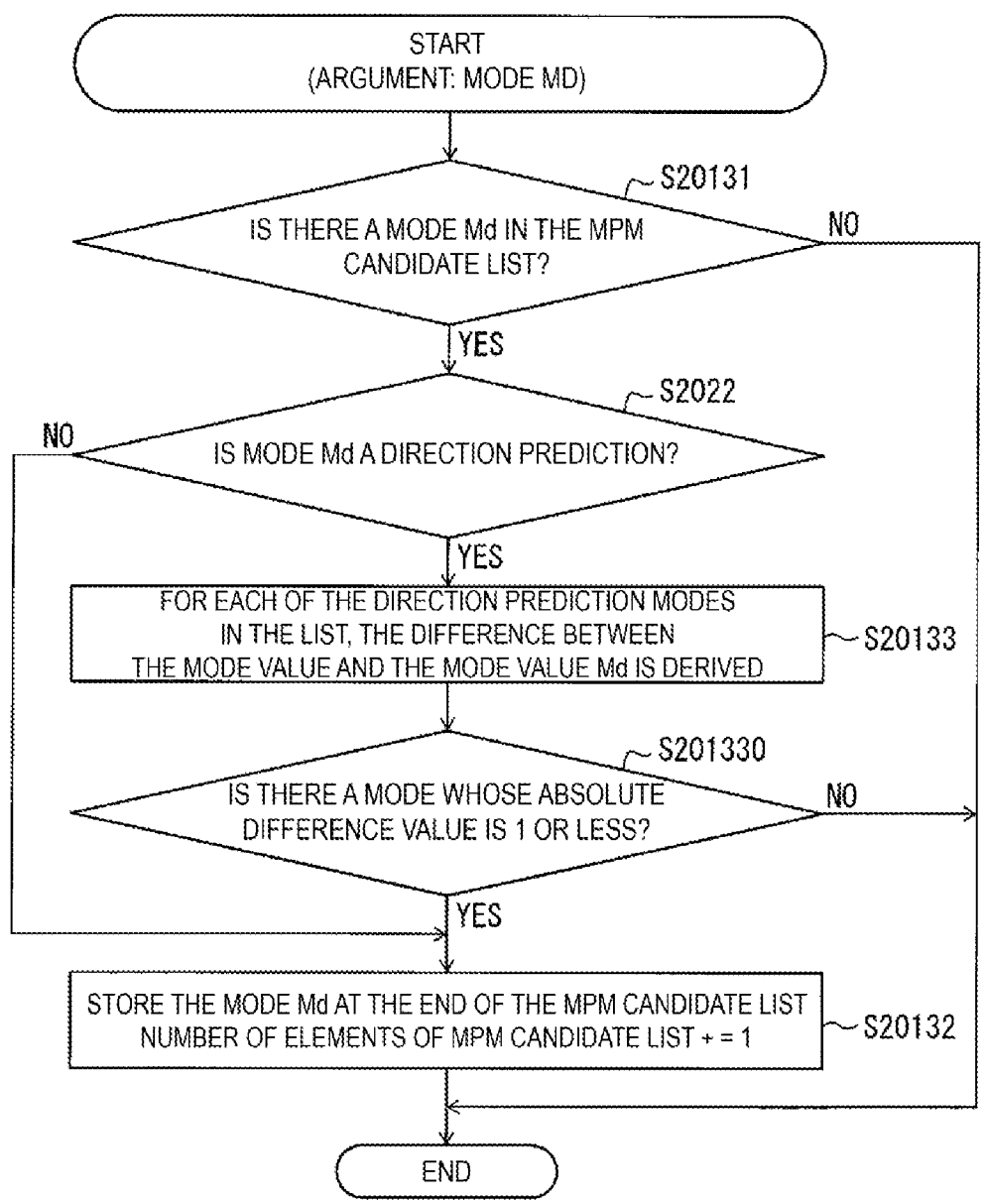
FIG. 26 is a flowchart illustrating details of one step, which is different from the details illustrated in FIG. 25.

Change Operation of Condition to be Viewed as Duplicated Direction Based on Shape of Block: Modified Example FIG. 26 is a flowchart illustrating the details of step S2013 which is different from the details illustrated in FIG. 25. In step S2013 illustrated in FIG. 26, mode addition processing is performed in the case of using the condition for the difference of the value of the mode number (mode value). As illustrated in FIG. 26, step S2013 includes steps S20131, S2022, S20133, S201330, and S20132. Since S20131 is the same as in FIG. 25, the description will be omitted.

In step S2022, in a case where the mode Md is directional prediction (YES), step S20133 and the subsequent steps are performed. In a case where the mode Md is not the directional prediction (NO), step S20132 is performed.

In step S20133, the MPM candidate list deriving unit 30421 derives a difference between the mode value of the directional prediction mode and the mode value of the mode Md for each of the directional prediction modes in the MPM candidate list.

In step S201330, the MPM candidate list deriving unit 30421 determines whether there is a mode in which the absolute value of the difference derived in step S20133 is equal to or less than 1 in the MPM candidate list. In a case where there is no mode in which the absolute value is equal to or less than 1 in the MPM candidate list (YES), step S20132 is performed. In a case where there is the mode in which the absolute value equal to or less than 1 in the MPM candidate list (NO), step S2013 is terminated.

A-5: Addition or Change of Adjacent Block Reference Position Based on Shape of Block It is a problem that in a case where the prediction mode of the adjacent block adjacent to the short side of the target block is prioritized, if the adjacent block reference position adjacent to the long side of the target block becomes excessively sparse, the adjacent block closest to the center of the target block is not referred to, and the coding efficiency is reduced.

By adding or changing the reference position of the adjacent block adjacent to the long side of the target block, it is possible to prevent from that the reference position becomes excessively sparse.

Additional Example

FIG. 27A is a schematic diagram illustrating an addition order of prediction modes when the MPM candidate list deriving unit 30421 adds the prediction mode to the MPM candidate list based on the shape of the block, which is different from the addition order illustrated in FIG. 22A. As illustrated in FIG. 27A, the MPM candidate list deriving unit 30421 adds the adjacent mode and the planar mode to the MPM candidate list in the following order.

(1) Intra prediction mode of the upper block of the target block (adjacent mode)

(2) Intra prediction mode of the left block of the target block (adjacent mode)

(3) PLANAR prediction mode
(4) DC prediction mode
(5) Intra prediction mode of the upper right block of the target block (adjacent mode)
(6) Intra prediction mode of the upper left block of the target block (adjacent mode)
(7) Intra prediction mode of the left middle block of the target block
(8) Intra prediction mode of the lower left block of the target block (adjacent mode)

Modification Example

FIG. 27B is a schematic diagram illustrating an addition order of prediction modes when the MPM candidate list deriving unit 30421 adds the prediction mode to the MPM candidate list based on the shape of the block, which is different from the addition order illustrated in FIG. 22B. As illustrated in FIG. 27B, the MPM candidate list deriving unit 30421 adds the adjacent mode and the planar mode to the MPM candidate list in the following order.
(1) Intra prediction mode of the upper block of the target block (adjacent mode)
(2) Intra prediction mode of the left middle block of the target block (adjacent mode)
(3) PLANAR prediction mode
(4) DC prediction mode
(5) Intra prediction mode of the upper right block of the target block (adjacent mode)
(6) Intra prediction mode of the upper left block of the target block (adjacent mode)
(7) Intra prediction mode of the lower left block of the target block (adjacent mode)

Alternatively, instead of (7), only (1) to (6) may be added.

Derivation Method of Intra Prediction Parameters (Chrominance) 1

Intra prediction mode IntraPredModeC [x0] [y0] applied to chrominance pixels will be described by referring to FIG. 14. The intra prediction mode IntraPredModeC [x0] [y0] is calculated by using the following three syntax elements.
 not_dm_chroma_flag [x0] [y0]
 not_lm_chroma_flag [x0] [y0]
 chroma_intra_mode_idx [x0] [y0]

not_dm_chroma_flag [x0] [y0] is a flag that equals to 1 in a case where the intra prediction mode of luminance is not used. not_lm_chroma_flag [x0] [y0] is a flag that equals to 1 in a case where linear prediction is not performed from luminance pixels in a case where the prediction mode list ModeList is used. chroma_intra_mode_idx [x0] [y0] is an index for identifying the intra prediction mode applied to the chrominance pixel. Note that x0 and y0 are the coordinates of the upper left luminance pixel of the target block in the picture, not the coordinates of the upper left chrominance pixel. In a case where both of the two flags (not_dm_chroma_flag [x0] [y0] and not_lm_chroma_flag [x0] [y0]) are 1, the intra prediction mode IntraPredModeC [x0] [y0] is derived from the prediction mode list ModeList. Examples of derivation processing by pseudo code are as follows.

```
if (not_dm_chroma _flag [x0] [y0] == 0) {
    // DM_CHROMA: Using intra prediction mode of luminance
    IntraPredModeC [x0] [y0] = IntraPredModeY [x0] [y0]
} Else {
    if (not_lm_chroma_flag [x0] [y0] == 0) {// The value in a case where there is not in the coding data is 1
        IntraPredModeC [x0] [y0] = LM_CHROMA // Linear prediction from luminance pixels
    } Else {
        IntraPredModeC [x0] [y0] = ModeList [chroma_intra_mode_idx [x0] [y0]]
    }
}
```

Note that, when DM_CHROMA is used for the chrominance intra prediction mode in a case where the chrominance format is 4:2:2, unlike the above-described pseudo code, by converting the prediction direction indicated by IntraPredModeY [x0] [y0] using a conversion table or conversion formula IntraPredModeC [x0] [y0] is derived.

Derivation Method of Intra Prediction Parameters (Chrominance) 2

The chrominance prediction mode list ModeList is derived as follows.

ModeList [ ]={PLANAR, VER, HOR, DC}

However, in a case where IntraPredModeY [x0] [y0] equals to ModeList [i] (i=0 to 3), ModeList [i] is as follows.

ModeList [i]=VDIA

That is, it is as illustrated in the following table. ModeList is determined by IntraPredModeY [x0] [y0]. Subscripts (0 to 3) of ModeList are selected by chroma_intra_mode_idx [x0] [y0].

TABLE 3

| | IntraPredModeY[x0][y0] | | | | |
|---|---|---|---|---|---|
| | PLANAR (0) | VER (50) | HOR (18) | DC (1) | others(X) (0 ≤ X ≤ 66) |
| ModeList[0] | VDIA(66) | PLANAR | PLANAR | PLANAR | PLANAR |
| ModeList[1] | VER | VDIR | VER | VER | VER |
| ModeList[2] | HOR | HOR | VDIR | HOR | HOR |
| ModeList[3] | DC | DC | DC | VDIR | DC |

A-6: Change of Prediction Mode List of Chrominance Based on Shape of Block

The above-described problem can be solved by changing the configuration of the chrominance prediction mode list according to whether the shape of the block is vertically long or horizontally long. Specifically, the configuration of the ModeList shown in Table 3 is changed according to whether the shape of the block is vertically long/horizontally long/square. More specifically, in a case where the shape of the block is horizontally long, ModeList is derived using the following table, and in other cases, ModeList is derived using Table 3. This is because, in Table 3 before change, VER is often prioritized (The smaller subscript of ModeList indicates the element).

TABLE 4

| | IntraPredModeY[x0][y0] | | | | |
|---|---|---|---|---|---|
| | PLANAR (0) | VER (50) | HOR (18) | DC (1) | others(X) (0 ≤ X ≤ 66) |
| ModeList[0] | 2 | PLANAR | PLANAR | PLANAR | PLANAR |
| ModeList[1] | HOR | 2 | VER | HOR | HOR |
| ModeList[2] | VER | HOR | 2 | VER | VER |
| ModeList[3] | DC | DC | DC | 2 | DC |

In Table 4, in a case where VER and HOR are both elements of ModeList, HOR is prioritized over VER. In addition, instead of VDIA (66, upper right) in Table 3, 2 (lower left) is an element of ModeList in Table 4.

Further, in a case where the shape of the block is distinguished and the shape of the block is vertically long, table 3 may be used, and in a case where the shape of the block is horizontally long, table 4 may be used, and in a case where the shape of the block is a square, table 5 may be used.

TABLE 5

| | IntraPredModeY[x0][y0] | | | | |
|---|---|---|---|---|---|
| | PLANAR (0) | VER (50) | HOR (18) | DC (1) | others(X) (0 ≤ X ≤ 66) |
| ModeList[0] | DIA(34) | PLANAR | PLANAR | PLANAR | PLANAR |
| ModeList[1] | VER | DIA | VER | VER | VER |
| ModeList[2] | HOR | HOR | DIA | HOR | HOR |
| ModeList[3] | DC | DC | DC | DIA | DC |

In Table 5, instead of VDIA (66, upper right) in Table 3, DIA (34, upper left) is an element of ModeList in Table 4.

As described above, even in the chrominance block, the prediction mode list having a configuration suitable for the shape of the block such as vertically long, horizontally long, and square can be used, and the coding efficiency is improved.

A-7: Derivation of MPM Candidate List According to QP

By controlling the derivation operation of the MPM candidate list according to the quantization parameter (QP), the above-described problem can be solved. Specifically, the above derivation operation is performed only in a case where the QP value in the target block satisfies a predetermined condition. Here, the "predetermined condition" designates a case where the QP value q in the target block is in a predetermined range. As in the following example, the derivation operation is performed according to the magnitude of the QP value.

Example 1: The above-described derivation operation is performed only for a block having a QP value q that is smaller than the threshold value q_th with respect to the threshold value q_th.

Example 2: In a case where the QP value q is larger than the threshold value q_th, in "<1. Addition of Adjacent mode and Planar mode>", the planar mode in which the addition order is (3) (4) is always set to (1) (2) or (2) (3).

In a block with a high QP value, the ratio of using the planar prediction mode is high. For this reason, there are cases where the coding efficiency can be sufficiently improved according to that (1) a planar mode is not prioritized in a block having a small QP value, or (2) a planar mode is prioritized in a block having a large QP value.

In the above-described deriving operation, the MPM candidate list is derived in accordance with the shape of the block, that is, the directional prediction mode corresponding to the shape of the block is prioritized, and the planar mode is not prioritized. Then, according to Example 1, the planar mode is not prioritized in the block having the small QP value. Also, according to Example 2, the planar mode is prioritized in a block having a large QP value. Therefore, the coding efficiency can be improved. Also, with the above, the derivation operation of the MPM candidate list can be simplified.

Note that, the derivation operation of the MPM candidate list may be controlled according to the size of the target block. For example, in a case where the size is large, the planar mode is prioritized.

Effect by Changing Derivation Method of MPM Candidate List Based on Shape of Block In the intra prediction parameter coding unit 113 illustrated in FIG. 15 and in the intra prediction parameter decoding unit 304 illustrated in FIG. 16, the MPM candidate list deriving unit 30421 derives the MPM candidate list based on the shape of the target block. At this time, as illustrated in FIG. 22, the MPM candidate list preferentially includes the intra prediction mode suitable for the shape of the target block.

Decoding

In the intra prediction parameter decoding unit 304 illustrated in FIG. 16, the MPM parameter decoding unit 30422 and the non-MPM parameter decoding unit 30423 decode the luminance prediction mode IntraPredModeY from the MPM candidate list.

At this time, the luminance prediction mode IntraPredModeY preferentially assigns a short code to the intra prediction mode suitable for the shape of the target block. Therefore, according to the target CU obtained by dividing the picture by the QTBT and the CU as it is, or the shape of the PU obtained by dividing the CU, the picture can be decoded more efficiently than the known one.

Coding Unit

In the intra prediction parameter coding unit 113 illustrated in FIG. 15, the MPM parameter deriving unit 11322 derives the intra prediction parameters prev_intra_luma_pred_flag and MPM_idx from the luminance prediction mode IntraPredModeY and the MPM candidate list. In addition, the non-MPM parameter deriving unit 11323 derives the intra prediction parameters prev_intra_luma_pred_flag, rem_selected_mode_flag, rem_selected_mode, and rem_non_selected_mode from the luminance prediction mode IntraPredModeY and the MPM candidate list.

At this time, each intra prediction parameter is preferentially assigned a short code to the intra prediction mode suitable for the shape of the target block. Therefore, the picture can be more efficiently coded according to the target CU obtained by QTBT division of the picture and the CU as it is, or the shape of the PU obtained by dividing the CU.

Embodiment 2

The present embodiment is different from the embodiment 1 in that the configuration/context of the MPM candidate list is changed based on the shape of the block or the like. Note that, in the following embodiments, for convenience of description, members having the same functions as those already described are denoted by the same reference numerals, and description of them is omitted.

CABAC Context of Luminance

There are a plurality of CABAC contexts of luminance intra prediction parameters, and they are selected according to the situation. Alternatively, there is an option in which the probability that each digit of the binarized value of the luminance intra prediction parameter 0 and 1 are viewed to be equal, that is, there is an option that does not use context (EP: Equal Probability).

The CABAC context of the luminance intra prediction parameter is divided as follows.
  prev_intra_luma_pred_flag [x0] [y0] (context number: 0)
  MPM_idx [x0] [y0] (MPMContext (candModeList [k]) and EP)
  rem_selected_mode_flag [x0] [y0] (9)
  rem_selected_mode [x0] [y0] (EP)
  rem_non_selected_mode [x0] [y0] (EP)
CABAC Context of Chrominance The CABAC context of the chrominance intra prediction parameter is divided as follows.
  not_dm_chroma_flag [x0] [y0] (0)
  not_lm_chroma_flag [x0] [y0] (1)
  chroma_intra_mode_idx [x0] [y0] (EP)
Context Derivation Method of MPMidx As described above, MPM_idx is an index for selecting the MPM from the MPM candidate list. MPM_idx takes a value from 0 to 5 and selects one from the 6 MPM candidates. The value of MPM_idx is coded as a coded bit string of maximum 5 bits (binary values: 0, 10, 110, 1110, 11110, 11111).

Here, the value of the k-th bit of the coded bit string of MPM_idx is $b_k$ (k=0 to 4 if the number of elements of the MPM candidate list is 6). The bit b k is 0/1 indicates that the k-th prediction mode of the candModeList [ ] (MPM candidate list) is "used/not used", respectively.

FIG. 28 is a schematic diagram illustrating the correspondence between each bit b k of the coded bit string of the MPM candidate mode index MPM_idx and the context c k used for decoding the bit b k according to the present embodiment. As illustrated in FIG. 28, for the range of k<3, the context c k is selected according to the type of the k-th prediction mode of candModeList [ ]. For k=3 and 4, it is "EP" indicating that no context is used.

In the following, the function or table for selecting a context is described as MPMContext ( ) That is, $c_k$=MPMContext (candModeList [k]).

MPMContext ( ) takes candModeList [k] as an argument and returns the value as follows.
  MPMContext (candModeList [k])=1 (candModeList [k]=0, 1)//plane
  MPMContext (candModeList [k])=2 (candModeList [k]=2 to 34)//horizontal direction
  MPMContext (candModeList [k])=3 (candModeList [k]=35 to 66)//vertical direction Thus, depending on the type of intra prediction mode stored in candModeList [k], the context of c k changes.

For example, in the case of candModeList [ ]={1, 24, 0, 23, 25, 50}, the context c k is obtained as follows.
  $c_0$=MPMContext (candModeList [0])=MPMContext (1)=1
  $c_1$=MPMContext (candModeList [1])=MPMContext (24)=2
  $c_2$=MPMContext (candModeList [2])=MPMContext (0)=1
B-1: Change in Number of MPM Candidate Mode/Context According to Shape of Block The above-described problem can be solved by changing the number of MPM candidate modes or changing the CABAC context of the MPM candidate mode index according to the shape of the block.
Changing Number of MPM Candidate Mode The number of prediction modes (MPM candidate modes) included in the MPM candidate list is set to a different number between a case where the shape of the block is square and a case where the shape of the block is non-square (vertically long/horizontally long). It is desirable to derive the MPM candidate list by applying the above-described derivation method. Then, the maximum bit number of the coded bit string representing MPM_idx is also increased/decreased by increasing/decreasing the MPM candidate mode. As in the case of "Context Derivation Method of MPM_idx", the maximum number of bits of the coded bit string representing MPM_idx may be {MPM candidate mode number−1} bits.

Example 1: in a case where the shape of the block is a square, the MPM candidate mode=6. In a case where the shape of the block is non-square, the MPM candidate mode=4. Note that, in a case where the shape of the block is non-square, it may reduce the MPM candidate mode by performing the processing so as to suppress the addition of the prediction mode in the short side direction of the target block.

Example 2: In a case where the shape of the block is a square, the MPM candidate mode=6. In a case where the shape of the block is non-square, the MPM candidate mode=8. Note that, in a case where the shape of the block is non-square, it may increase the number of MPM candidate modes by adding more prediction modes in the long side direction of the target block.

Example 3: If the derivation of the MPM candidate list according to the shape of the block is not limited to the examples 1 and 2, it may change the number of MPM candidate modes according to the shape of the block.
Change of CABAC Context of MPM Candidate Mode Index The CABAC context MPMContext of the MPM candidate mode index MPMidx is made different between a case where the shape of the block is square and a case where the shape of the block is non-square (vertically long/horizontally long).

Example 1

In a case where the shape of the block is a square: as described above "Context Derivation Method of MPM_idx"
  MPMContext (candModeList [k])=1 (candModeList [k]=0, 1)//plane
  MPMContext (candModeList [k])=2 (candModeList [k]=2 to 34)//horizontal direction
  MPMContext (candModeList [k])=3 (candModeList [k]=35 to 66)//vertical direction
  When the shape of the block is non-square:
  MPMContext (candModeList [k])=4 (candModeList [k]=0, 1)//plane
  MPMContext (candModeList [k])=5 (candModeList [k]=2 to 34)//horizontal direction
  MPMContext (candModeList [k])=6 (candModeList [k]=35 to 66)//Vertical direction Note that, the set of values of MPMContext (candModeList [k]) is not limited to the set of the example 1 {1, 2, 3} and the example 2 {4, 5, 6}. For example, the set of values of MPMContext (candModeList [k]) may be a set of {1, 3, 5} and {2, 4, 6}, or {1, 2, 3} and {1, 4, 5}, that is, it may be a different set in the case where the shape of the block is a square and the case where the shape of the block is a non-square shape.

Example 2

In a case where the shape of the block is a square: as described above "Context Derivation Method of MPM_idx"

MPMContext (candModeList [k])=1 (candModeList [k]=0, 1)//plane

MPMContext (candModeList [k])=2 (candModeList [k]=2 to 34)//horizontal direction MPMContext (candModeList [k])=3 (candModeList [k]=35 to 66)//vertical direction When the shape of the block is non-square (vertically long):

MPMContext (candModeList [k])=1 (candModeList [k]=0, 1)//plane

MPMContext (candModeList [k])=4 (candModeList [k]=42 to 58)//vertical direction (narrow)

MPMContext (candModeList [k])=5 (candModeList [k]=others)//Others others=2 to 41, 59 to 66

When the shape of the block is non-square (horizontally long):

MPMContext (candModeList [k])=1 (candModeList [k]=0, 1)//plane

MPMContext (candModeList [k])=6 (candModeList [k]=10 to 26)//horizontal direction (narrow)

MPMContext (candModeList [k])=7 (candModeList [k]=others)//others others=2 to 9, 27 to 66

As described above, by increasing or decreasing the number of MPM candidate modes according to the shape of the block, a number of MPM candidate modes suitable for the shape of the block can be included in the MPM candidate mode list. Therefore, the coding efficiency can be improved.

Further, by separating the CABAC context by shape of the block, the difference in the prediction mode selection made according to the shape of the block can be reflected to a probability that each digit of the binarized value of the luminance intra prediction parameter 0 and 1. Therefore, the coding efficiency can be improved.

Example 3-1

The CABAC context MPMContext of MPM candidate mode index MPM_idx may be assigned the same context vertically long and horizontally long by using symmetry. Specifically, in Example 2, MPMContext in the case where the shape of the block is non-square (horizontally long) may be changed as follows.

When the shape of the block is non-square (vertically long):

MPMContext (candModeList [k])=1 (candModeList [k]=0, 1)//plane

MPMContext (candModeList [k])=4 (candModeList [k]=42 to 58)//a narrow range in the long side direction MPMContext (candModeList [k])=5 (candModeList [k]=others)//Others others=2 to 41, 59 to 66

When the shape of the block is non-square (horizontally long):

MPMContext (candModeList [k])=1 (candModeList [k]=0, 1)//plane

MPMContext (candModeList [k])=5 (candModeList [k]=10 to 26)//a narrow range in the long side direction MPMContext (candModeList [k])=4 (candModeList [k]=others)//others others=2 to 9, 27 to 66

As described above, in the case where the shape of the block is non-square, in the case where the shape of the block is vertically long and the case where the shape of the block is horizontally long, while using the same context, in the long side of the target block and the short side of the target block, the bias between the probability that each digit of the value obtained by binarized the luminance intra prediction parameter 0 and 1 can be used.

Example 3-2

Also, in Example 3-1, the range of the direction of MPMContext (the range of candModeList [k]) may be changed as follows.

When the shape of the block is non-square (vertically long):

MPMContext (candModeList [k])=1 (candModeList [k]=0, 1)//plane

MPMContext (candModeList [k])=4 (candModeList [k]=35 to 66)//Short side direction MPMContext (candModeList [k])=5 (candModeList [k]=2 to 34)//Long side direction In a case where the shape of the block is non-square (horizontally long):

MPMContext (candModeList [k])=1 (candModeList [k]=0, 1)//plane

MPMContext (candModeList [k])=5 (candModeList [k]=2 to 34)//Short side direction MPMContext (candModeList [k])=4 (candModeList [k]=35 to 66)//Long side direction Example 4-1

FIG. 29A is a schematic diagram illustrating a relationship between a mode number CandModeList [k] and a context number MPMContext (candModeList [k]) in a case where a target block is non-square (vertically long) in shape in the example in which the plane is not shared according to the present embodiment. FIG. 29B is a schematic diagram in a case where the target block is non-square (vertically long) in FIG. 29A.

As illustrated in FIGS. 29A and 29B, in the example where the plane is not shared, MPMContext is assigned as follows.

In a case where the shape of the block is a square: as described above "Context Derivation Method of MPM_idx"

MPMContext (candModeList [k])=1 (candModeList [k]=0, 1)//plane

MPMContext (candModeList [k])=2 (candModeList [k]=2 to 34)//horizontal direction MPMContext (candModeList [k])=3 (candModeList [k]=35 to 66)//vertical direction In a case where the shape of the block is non-square:

MPMContext (candModeList [k])=4 (candModeList [k]=0, 1)//plane

MPMContext (candModeList [k])=5 (CandModeList [k]=2 to 34 && horizontally long)||(candModeList [k]=35 to 66 && vertically long)//long side direction (horizontally long)||long side direction (vertically long)

MPMContext (candModeList [k])=6 (CandModeList [k]=35 to 66 && horizontally long)||(candModeList [k]=2 to 34 && vertically long)//short side direction (horizontally long)||short side direction (vertically long)

Example 4-2

Figure 30A:
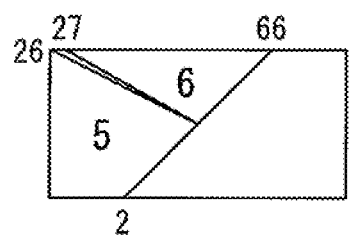
FIGS. 30A and 30B are schematic diagrams illustrating a relationship between a mode number and a context number in a case where the target block is non-square (vertically long) in the example of adjusting the range according to the shape of the block according to the embodiment 2.
Figure 30B:
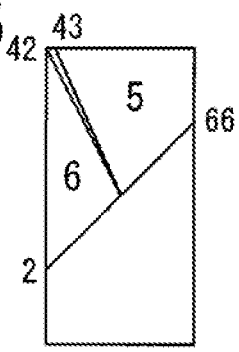

FIG. 30A is a schematic diagram illustrating a relationship between a mode number candModeList [k] and a context number MPMContext (candModeList [k]) in a case where the target block is non-square (horizontally long) in the example of adjusting the range according to the shape of the block according to the present embodiment. FIG. 30B is a schematic diagram of a case where the target block is non-square (vertically long) in FIG. 30A.

As illustrated in FIGS. 30A and 30B, in the example of adjusting the range according to the shape of the block, that is, in the example of distinguishing the vertically long and horizontally long of the shape of the block other than diagonal 45 degrees, MPM Context is assigned as follows. Note that, in a case where the shape of the block is square, it is as illustrated in Example 4-1. In a case where the shape of the block is non-square, the boundary for classifying the direction into vertical/horizontal/diagonal in the target block is changed according to the shape of the block.

In a case where the shape of the block is non-square:
MPMContext (candModeList [k])=4 (candModeList [k]=0, 1)//plane
MPMContext (candModeList [k])=5 ((CandModeList [k]=2 to (2+24) && horizontally long)||(candModeList [k]=(2+40+1) to 66 && vertically long))//long side direction (horizontally long)||long side direction (vertically long)
MPMContext (candModeList [k])=6 ((CandModeList [k]=(2+24+1) to 66 && horizontally long)||(candModeList [k]=2 to (2+40) && vertically long))//short side direction (horizontally long)||short side direction (vertically long)

Example 5-1

Figure 31A:
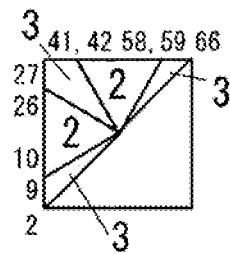
FIGS. 31A to 31C are schematic diagrams illustrating the relationship between a mode number and a context number in a case where the target block is square in an example using different contexts on a long side, a short side, and an diagonal direction of the target block according to the embodiment 2.
Figure 31B:
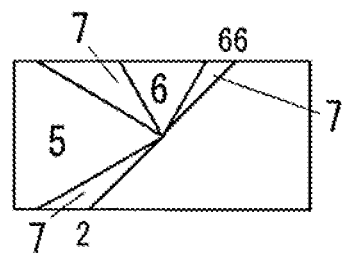
Figure 31C:
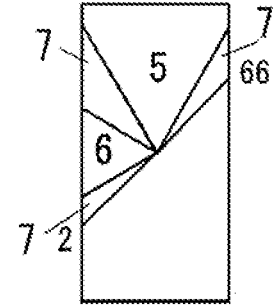

FIG. 31A is a schematic diagram illustrating the relationship between a mode number CandModeList [k] and a context number MPMContext (candModeList [k]) in a case where the target block is square in an example using different contexts on the long side, the short side, and the diagonal direction of the target block according to the present embodiment. FIG. 31B is a schematic diagram in the case where the target block is non-square (horizontally long) in FIG. 31A. FIG. 31C is a schematic diagram in the case where the target block is non-square (vertically long) in FIG. 31A.

As illustrated in FIGS. 31A to 31C, an example using different contexts in the long side and the short side and the diagonal direction of the target block, that is, the case where the target block is horizontally long and vertically long, in the example using symmetry to use the same context, MPMContext is assigned as follows.

In a case where the shape of the block is a square:
MPMContext (candModeList [k])=1 (candModeList [k]=0, 1)//plane
MPMContext (candModeList [k])=2 (candModeList [k]=10 to 26, 42 to 58)//horizontal or vertical direction
MPMContext (candModeList [k])=3 (candModeList [k]=2 to 9, 27 to 41, 59 to 66)//diagonal direction In a case where the shape of the block is non-square:
MPMContext (candModeList [k])=4 (candModeList [k]=0, 1)//plane
MPMContext (candModeList [k])=5 ((CandModeList [k]=10 to 26 && horizontally long)||(candModeList [k]=42 to 58 && vertically long))//long side direction (horizontally long)||long side direction (vertically long)
MPMContext (candModeList [k])=6 ((CandModeList [k]=42 to 58 && horizontally long)||(candModeList [k]=10 to 26 && vertically long))//short side direction (horizontally long)||short side direction (vertically long)
MPMContext (candModeList [k])=7 (candModeList [k]=2 to 9, 27 to 41, 59 to 66)//diagonal direction Example 5-2

In Example 5-1, in a case where the shape of the block is a square, another context may be used with vertical/horizontal. Note that, in a case where the shape of the block is non-square, it is as illustrated in Example 5-1.

In a case where the shape of the block is a square:
MPMContext (candModeList [k])=1 (candModeList [k]=0, 1)//plane
MPMContext (candModeList [k])=2 (candModeList [k]=2 to 34)//horizontal direction
MPMContext (candModeList [k])=3 (candModeList [k]=35 to 66)//vertical direction B-2: Number of MPM Candidate Mode/Change of Context According to Depth The above-described problem can be solved by changing the number of MPM candidate modes or changing the CABAC context of the MPM candidate mode index according to the depth. "Depth" means the number of times of division performed until the target block is obtained by dividing the CU.

Changing Number of MPM Candidate Mode

The number of prediction modes (MPM candidate modes) included in the MPM candidate list is set to a different number according to the depth. It is desirable to derive the MPM candidate list by applying the above-described derivation method. Then, the maximum bit number of the coded bit string representing MPM_idx is also increased/decreased by increasing/decreasing the MPM candidate mode. In this case, the maximum number of bits of the coded bit string representing MPM_idx is {MPM candidate mode number−1} bit.

Example 1

In a case where the depth d and the threshold d_th satisfy d<d_th, the number of MPM candidate modes is 3. In a case where the depth d and the threshold d_th satisfy d>=d_th, the number of MPM candidate modes is 6.

Example 2

The number of prediction modes (MPM candidate modes) included in the MPM candidate list may be set to a different number as follows in a case where the depth is deep (the depth value is large) as follows. In a case where the depth d and the threshold d_th satisfy d>d_th, the number of MPM candidate modes is 3. In a case where the depth d and the threshold d_th satisfy d<=d_th, the number of MPM candidate modes is 6.

Change of CABAC Context of MPM Candidate Mode Index

The CABAC context MPMContext of the MPM candidate mode index MPM_idx is selectively used according to the depth value d.

Example 1

In the case of d>=d_th: as described above "MPM_idx context derivation method"
MPMContext (candModeList [k])=1 (candModeList [k]=0, 1)//plane
MPMContext (candModeList [k])=2 (candModeList [k]=2 to 34)//horizontal direction
MPMContext (candModeList [k])=3 (candModeList [k]=35 to 66)//vertical direction
In the case of d<d_th:
MPMContext (candModeList [k])=4 (candModeList [k]=0, 1)//plane
MPMContext (candModeList [k])=5 (candModeList [k]=2 to 34)//horizontal direction MPMContext (candModeList [k])=6 (candModeList [k]=35 to 66)//Vertical direction Example 2

When d>=d_th: same as Example 1
In the case of d<d_th:
MPMContext (candModeList [k])=4 (candModeList [k]=0, 1)//plane
MPMContext (candModeList [k])=5 (candModeList [k]=2 to 66)//other than plane As described above, since the ratio of the planar prediction mode which is used for the block with the small depth value is high, many MPM candidate modes are unnecessary, and the coding efficiency can be improved by decreasing the number of MPM candidate modes. For example, if the number of MPM candidate modes is reduced to 3, the number of bits required to represent MPM_idx=2 can be reduced from known 3 bits to 2 bits.

Example 3

The CABAC context MPMContext of the MPM candidate mode index MPM_idx may be selectively used as follows in a case where the depth is deep (the depth value is large).
In the case of d<=d_th: as described above "(Context Derivation Method of MPM_idx)"
MPMContext (candModeList [k])=1 (candModeList [k]=0, 1)//plane
MPMContext (candModeList [k])=2 (candModeList [k]=2 to 34)//horizontal direction
MPMContext (candModeList [k])=3 (candModeList [k]=35 to 66)//vertical direction
In the case of d>d_th:
MPMContext (candModeList [k])=4 (candModeList [k]=0, 1)//plane
MPMContext (candModeList [k])=5 (candModeList [k]=2 to 34)//horizontal direction
MPMContext (candModeList [k])=6 (candModeList [k]=35 to 66)//Vertical direction Example 4

In the case of d<=d_th: same as in Example 3
In the case of d>d_th: the method for determining the context is also different
MPMContext (candModeList [k])=4 (candModeList [k]=0, 1)//plane
MPMContext (candModeList [k])=5 (candModeList [k]=2 to 66)//other than plane As described above, since the number of blocks with large depth values is large, the code amount of MPM_idx can be reduced by decreasing the number of MPM candidate modes. For example, if the number of MPM candidate modes is reduced to 3, the number of bits required to represent MPM_idx=2 can be reduced from known 3 bits to 2 bits. Also, by changing the context depending on the magnitude of the depth value, it can reflect the difference in the tendency of mode selection depending on the block size and the coding efficiency can be improved.

B-3: Fixing Context According to Block Size

The above-described problem can be solved, by fixing the context of the MPM candidate mode index (MPM_idx), in a case where the block size is large. First, it is determined that the block size is small or large under the conditions exemplified below.

The area of the target block is equal to or greater than the threshold value.
The length (short side, long side, or both) of the side of the target block is equal to or greater than the threshold value.
The depth is equal to or less than the threshold value.
Then, in a case where it is determined that the block size is large, the context MPMContext of MPM_idx is not changed according to the prediction direction. For example, it is as follows.
Example 1: Fix to $c_k$=n.
Example 2: $c_k$={n 1, n 2, n 3} (hereinafter EP).
(K=0, 1, 2 for all)
Note that n, n1, n2, and n3 may be context numbers that do not overlap with context numbers used in a case where the block size is not large with respect to MPM_idx.

As described above, in a case where the block size is large, the influence on the selection characteristic of the prediction mode due to the difference in shape is not clear as compared with the small block, thus the processing efficiency can be improved by fixing the context.

B-4: Changing Number of MPM Candidate Mode According to Block Size

The above-described problem can be solved, by changing the number of MPM candidate modes according to the block size and by changing the CABAC context of the MPM candidate mode index according to the block size.

Changing Number of MPM Candidate Mode

The number of prediction modes (MPM candidate modes) included in the MPM candidate list is set to a different number according to the block size. For example, if the block size s is the sum of the short side and the long side and s_th 1 and s_th 2 are threshold values, in the case of s<s_th 1∥s>s_th 2, there are 3 MPM candidate modes, in the case of s>=s_th 1 && s<=s_th 2, there are 6 MPM candidate modes. s_th 1 and s_th 2 are, for example, 8 (4+4) and 32 (16+16), respectively.

As described above, in a case where the block size is large, the planar prediction mode is used at a high rate, and in a case where the block size is small, the change of the prediction image is small even the prediction direction is changed, thus the large number of MPM candidate mode is unnecessary, coding efficiency can be improved by reducing the MPM candidate mode.

Embodiment 3

The present embodiment is different from Embodiments 1 and 2 in that the configuration of the intra prediction mode is changed based on a shape of the block. In the example illustrated in FIG. 12, the prediction direction is distributed at a substantially constant density and the density is slightly higher only in the horizontal direction/vertical direction. In the present embodiment, the arrangement of directional prediction is changed. The above-described problem can be solved by changing the configuration of the intra prediction mode illustrated in FIG. 12 according to the shape of the block.

Figure 32:
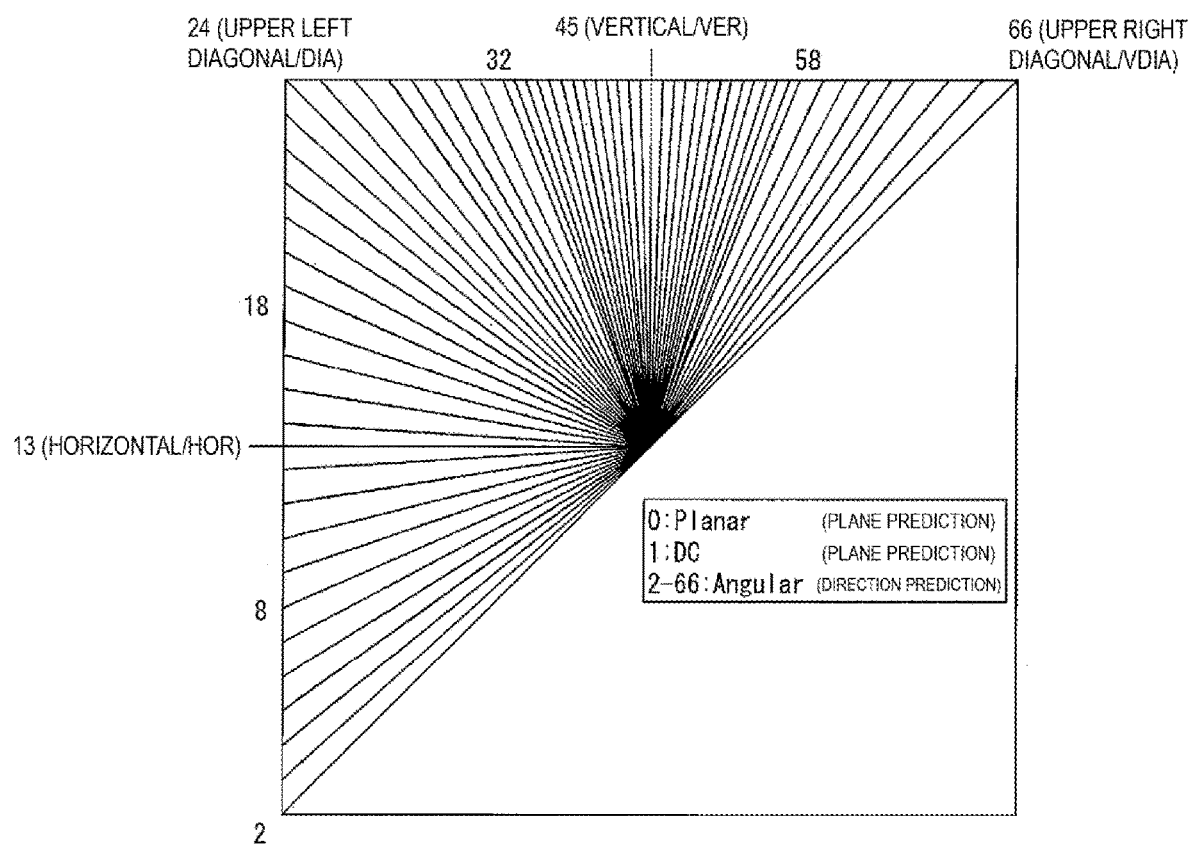
FIG. 32 is a schematic diagram illustrating a configuration of an intra prediction mode in a case where a shape of a block is vertically long according to an embodiment 3.

C-1: Density Change in Vertical/Horizontal Direction According to Vertically
Long/Horizontally Long Shape of the Block
Vertically Long Block FIG. 32 is a schematic diagram illustrating the configuration of the intra prediction mode in the case where the shape of the block is vertically long according to the present embodiment. As illustrated in FIG. 32, as compared with the example illustrated in FIG. 12, the vertical directional prediction density is further increased and the horizontal directional prediction density is decreased for the vertically long block. More specifically, the number of directional prediction modes arranged in the direction between the lower left direction and the upper left direction is smaller than the number of directional prediction modes arranged in the direction between the upper left direction and the upper right direction. Note that, in this case, the lower left direction/upper left direction/upper right direction designates an diagonal direction of 45 degrees.

However, as illustrated in FIG. 32, by changing the arrangement of the directional prediction modes, the association between the mode number and the direction of the directional prediction mode is different from the example illustrated in FIG. 12. For example, in the example illustrated in FIG. 12, the horizontal direction always corresponds to mode number 18. Also, the vertical direction always corresponds to the mode number 50. At this time, in order to distinguish the vertical direction, it is determined whether the mode number is 2 to 34. Further, in order to determine the lateral direction, it is determined whether the mode numbers is 35 to 66.

In the present embodiment, the mode number corresponding to the direction may be appropriately read and used as follows.

Mode number corresponding to the horizontal direction: 13

Mode number corresponding to the vertical direction: 45

Mode number to be determined when judging the vertical direction: 2 to 24

Mode number to be determined when judging the horizontal direction: 25 to 66

Note that, in FIG. 32 and FIGS. 33 to 36 to be described later, in the case of chrominance pixels, as intra prediction modes, Planar, VER, HOR, DC, VDIR, LM prediction (linear prediction from luminance pixel value) and DM prediction (Diverted intra prediction mode of luminance) can be used.

Horizontally Long Block

Figure 33:
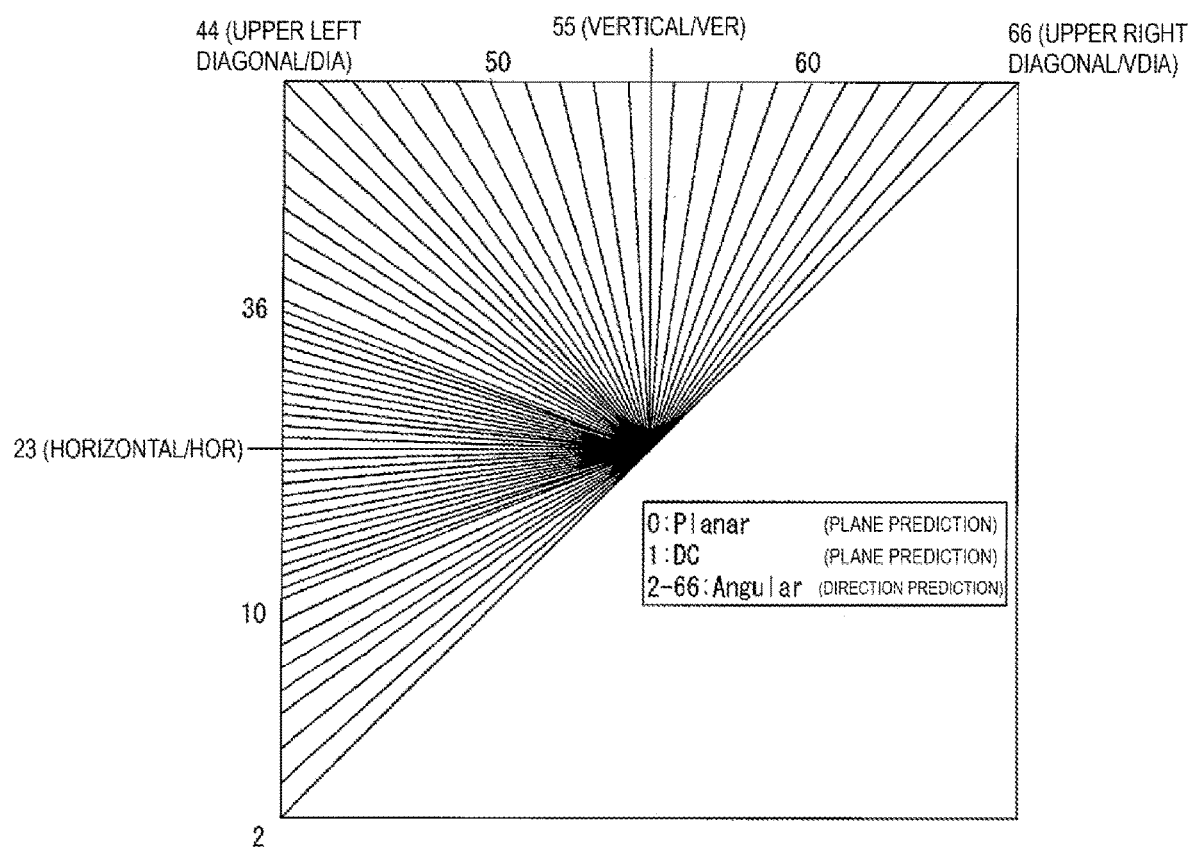
FIG. 33 is a schematic diagram illustrating a configuration of an intra prediction mode in a case where the shape of the block is horizontally long according to the embodiment 3.

FIG. 33 is a schematic diagram illustrating the configuration of the intra prediction mode in a case where the shape of the block is horizontally long according to the present embodiment. As illustrated in FIG. 33, as compared with the example illustrated in FIG. 12, for the horizontally long block, the density of directional prediction in the horizontal direction is further increased and the density of directional prediction in the vertical direction is decreased. More specifically, the number of directional prediction modes arranged in the direction between the lower left direction and the upper left direction is larger than the number of directional prediction modes arranged in the direction between the upper left direction and the upper right direction. Note that, in this case, the lower left direction/upper left direction/upper right direction designates an diagonal direction of 45 degrees.

However, as illustrated in FIG. 33, by changing the arrangement of the directional prediction modes, the association between the mode number and the direction of the directional prediction mode is different from the example illustrated in FIG. 12. In the present embodiment, the mode number corresponding to the direction may be appropriately read and used as follows.

Mode number corresponding to the horizontal direction: 23

Mode number corresponding to the vertical direction: 55

Mode number to be determined when judging the vertical direction: 2 to 44

Mode number to be determined when judging the horizontal direction: 45 to 66

Figure 34:
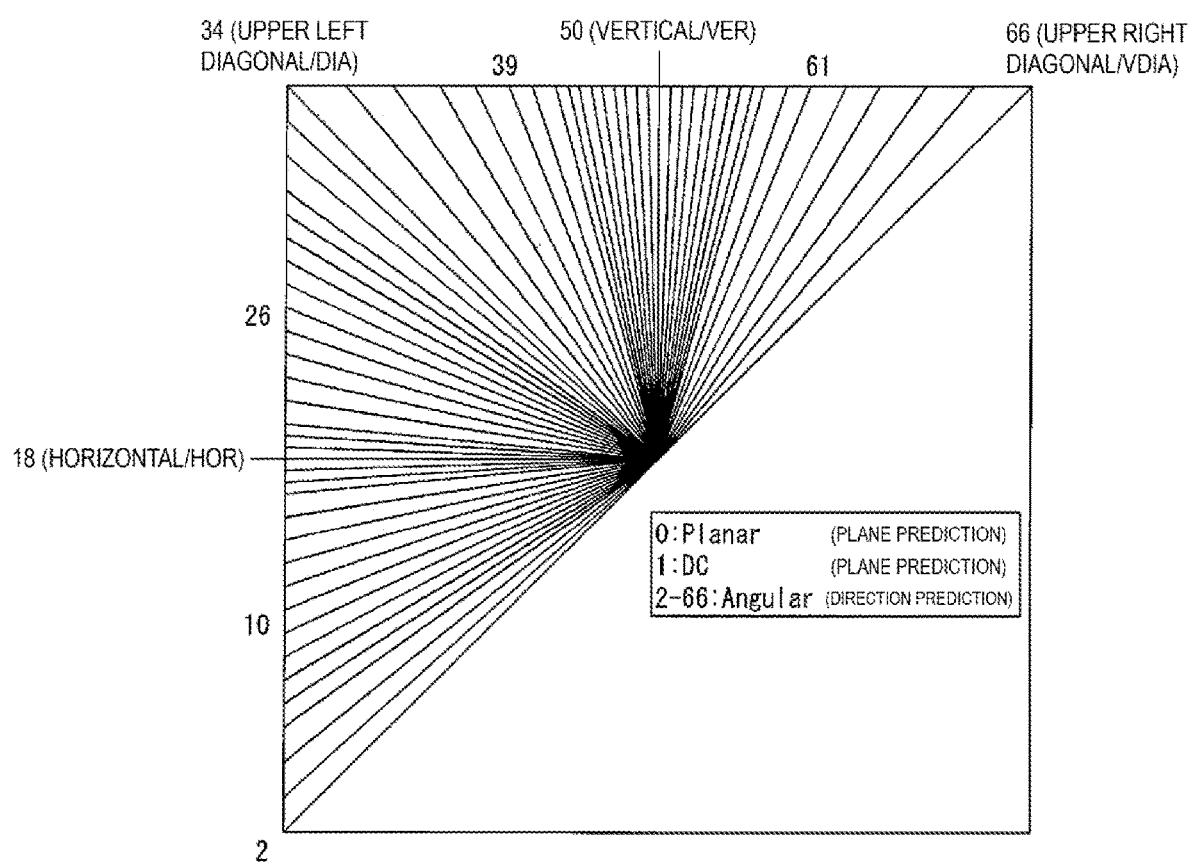
FIG. 34 is a schematic diagram illustrating a configuration of an intra prediction mode in a case where the shape of the block is vertically long according to the embodiment 3.

C-2: Density Change in Diagonal Direction According to Vertically Long/Horizontally Long Block Shape Vertically Long Block FIG. 34 is a schematic diagram illustrating the configuration of the intra prediction mode in a case where the shape of the block is vertically long according to the present embodiment. As illustrated in FIG. 34, as compared with the example illustrated in FIG. 12, the directional prediction in the diagonal direction is sparse for the vertically long block. More specifically, the directional prediction near the vertical direction is increased, and the directional prediction near the direction from the center of the target block to the upper left vertex/upper right vertex is decreased. The horizontal arrangement is not changed.

In other words, the number of directional prediction modes in the vicinity of the vertical in the arrangement of the directional prediction of the intra prediction mode applied to the vertically long block is larger than the number of the directional prediction modes in the vicinity (same range) in the vertical direction in the arrangement of the directional prediction of the intra mode prediction applied to other types of blocks. Here, the "directional prediction modes in the vicinity of the vertical" is, for example, a directional prediction mode in which the angle difference from the vertical direction is within ±22.5 degrees. The "number of directional prediction modes in the vicinity of the vertical" can be obtained by comparison as the number of directional prediction modes in which the angle difference with respect to the vertical direction is within ±22.5 degrees, for example.

Horizontally Long Block

Figure 35:
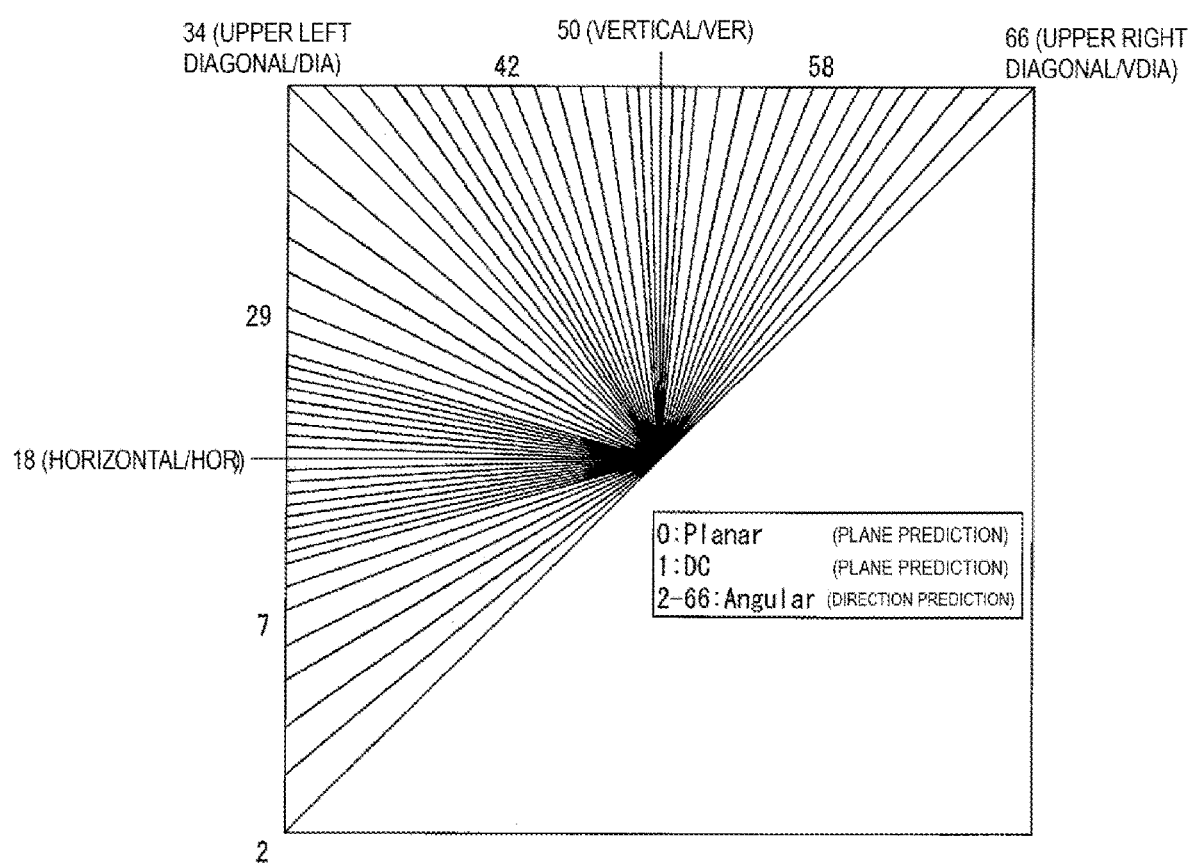
FIG. 35 is a schematic diagram illustrating a configuration of an intra prediction mode in a case where the shape of the block is horizontally long according to Embodiment 3.

FIG. 35 is a schematic diagram illustrating the configuration of the intra prediction mode in a case where the shape of the block is horizontally long according to the present embodiment. As illustrated in FIG. 35, as compared with the example illustrated in FIG. 12, the diagonal directional prediction is sparse for horizontally long blocks. More specifically, the prediction of the direction near the horizontal is increased, and the directional prediction near the direction from the center of the target block to the lower left vertex/upper left vertex is decreased. The arrangement in the vertical direction is not changed.

In other words, the number of directional prediction modes in the vicinity of the horizontal in the arrangement of the directional prediction of the intra prediction mode applied to the horizontally long block is larger than the number of the directional prediction modes in the vicinity (same range) in the horizontal direction in the arrangement of the directional prediction of the intra mode prediction applied to other types of blocks. Here, the "directional prediction modes in the vicinity of the horizontal" is, for example, a directional prediction mode in which the angle difference from the horizontal direction is within ±22.5 degrees. The "number of directional prediction modes in the vicinity of the horizontal" can be obtained by comparison as the number of directional prediction modes in which the angle difference from the horizontal direction is within ±22.5 degrees, for example.

Figure 36:
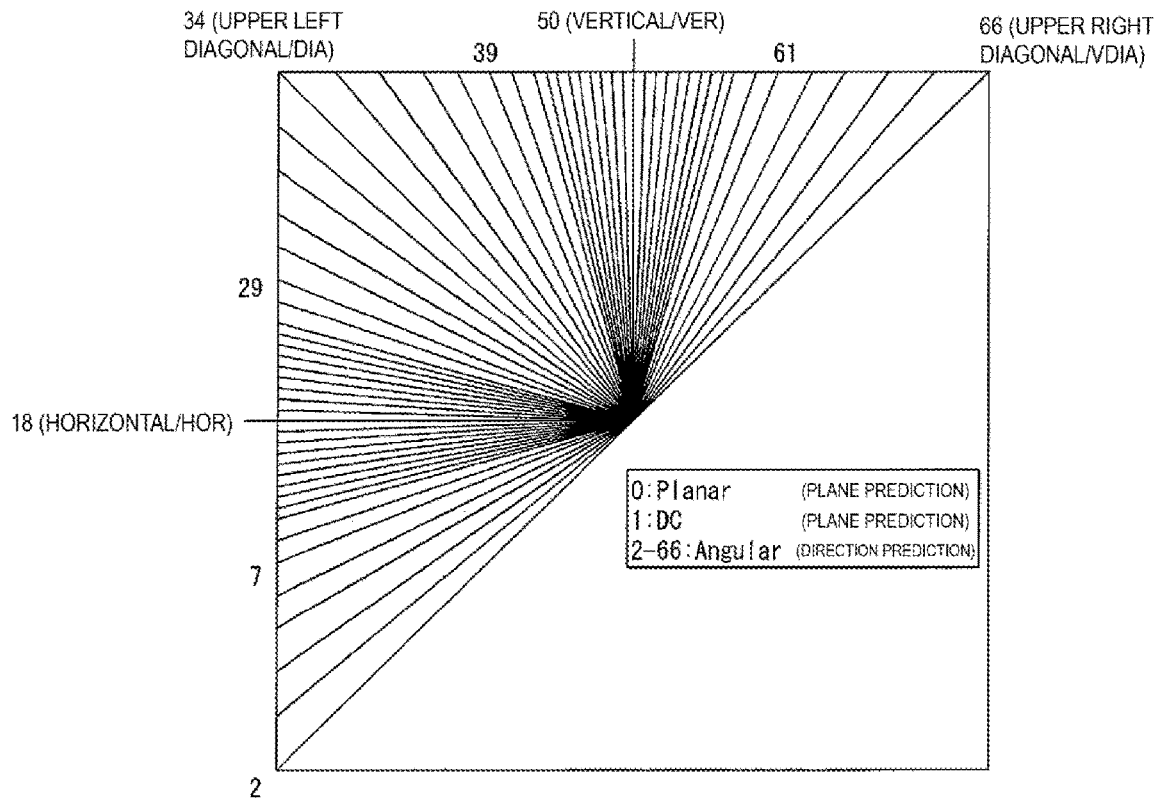
FIG. 36 is a schematic diagram illustrating a configuration of an intra prediction mode in a case where the shape of the block is non-square according to Embodiment 3.

C-3: Density Change in Diagonal Direction According to Square/Non-Square Block Shape Whether the shape of the block is a square shape or a non-square shape may be judged, in the case of a non-square shape, the density in the diagonal direction of the prediction direction may be changed in the directional prediction of the intra prediction mode. FIG. 36 is a schematic diagram illustrating a configuration of an intra prediction mode in a case where the shape of the block is non-square according to the present embodiment. As illustrated in FIG. 36, as compared with the example illustrated in FIG. 12, directional prediction near vertical and horizontal is increased. As a result, directional prediction near to the direction from the center of the target block to the lower left vertex/upper left vertex/upper right vertex is decreased. In other words, the arrangement of the intra prediction mode illustrated in FIG. 36 is one arrangement of the intra prediction modes illustrated in FIG. 34 (for vertically long) and FIG. 35 (for horizontally long).

Effect of Configuration Change of Intra Prediction Mode Based on Shape of Block

According to the above configuration, in a case where it is considered that there is a deviation in the prediction direction to be selected, by arranging the directional prediction mode with a denser arrangement with respect to the expected direction, the accuracy of the prediction image can be increased, and the coding efficiency can be improved.

Embodiment 4

In the following embodiments, for convenience of description, members having the same functions as those already described are denoted by the same reference numerals, and description of them is omitted.

Association Between REM Value and Intra Prediction Mode Number Based on Shape of Block As illustrated in FIG. 10, the shape of the block obtained by QTBT division is vertically long, horizontally long, and square. In the case where the shape of the block is vertically long, the non-MPM parameter decoding unit 30423 (FIG. 16) associates the value of RemIntraPredMode with the intra prediction mode number as shown in Table 4, such that the value of RemIntraPredMode is set in descending order with respect to the intra prediction mode number from 66 (upper right) to counterclockwise in the direction illustrated in FIG. 12.

On the other hand, in a case where the shape of the block is horizontally long or square, the non-MPM parameter decoding unit 30423 associates the value of RemIntraPred- Mode with the intra prediction mode number as shown in Table 2, such that the value of RemIntraPredMode is set in ascending order with respect to the intra prediction mode number from 2 (lower left) to the clockwise in the direction illustrated in FIG. 12.

Figure 37:
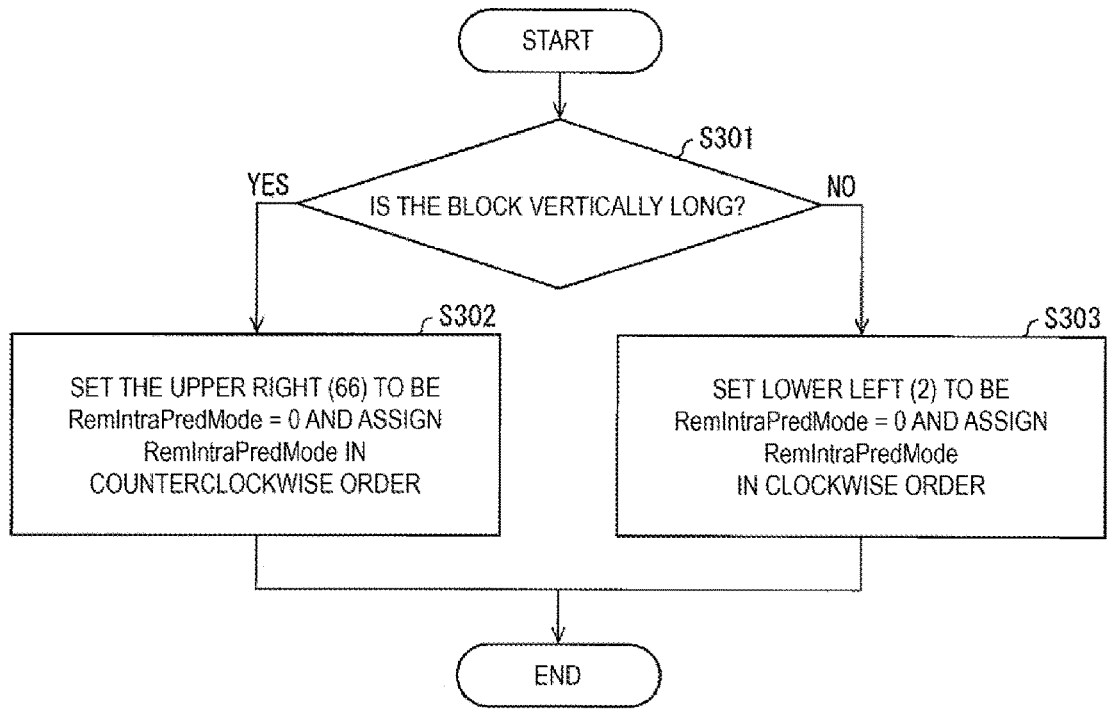
FIG. 37 is a flowchart illustrating the operation of associating a value of REM with an intra prediction mode number based on the shape of the block by a non-MPM parameter decoding unit of the intra prediction parameter decoding unit illustrated in FIG. 16.

FIG. 37 is a flowchart illustrating the operation of associating the value of REM with the intra prediction mode number based on the shape of the block by the non-MPM parameter decoding unit 30423 of the intra prediction parameter decoding unit 304 illustrated in FIG. 16. As illustrated in FIG. 37, in step S 301, the non-MPM parameter decoding unit 30423 determines whether the block is vertically long. In a case where the block is vertically long (YES), step S302 is performed. In a case where the block is not vertically long, step S303 is performed. In step S302, the non-MPM parameter decoding unit 30423 associates the value of RemIntraPredMode with the intra prediction mode number such that the value of RemIntraPredMode is set in descending order with respect to the intra prediction mode number from 66 (upper right) to counterclockwise in the direction illustrated in FIG. 12. In step S303, the value of RemIntraPredMode are associated with the intra prediction mode number such that the value of RemIntraPredMode is set in ascending order with respect to the intra prediction mode number from 2 (lower left) to clockwise in the direction illustrated in FIG. 12.

Note that, in a case where the mode number 66 is MPM in step S302, the intra prediction mode number which is the first non-MPM is set to RemIntraPredMode=0 in counterclockwise. Similarly, also in step S 303, if the mode number 2 is MPM, the intra prediction mode number which is the first non-MPM is set to RemIntraPredMode=0 in clockwise.

As described above, the non-MPM parameter decoding unit 30423 associates rem_selected_mode and rem_non_selected_mode, which are parameters for deriving the intra prediction mode, with RemIntraPredMode which is an intra prediction mode not included in the MPM candidate list in the order according to a directionality in terms of the target block.

Here, the directionality with respect to the target block means the direction in which the long side of the target block

TABLE 6

| A: TYPE OF INTRA PREDICTION MODE (MODE NUMBER) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| B: MPM CANDIDATE (CANDMODELIST) | X | X | | | | | | | | | | | | | | | | | X | | | | |
| C: RemIntraPredMode | | | 60 | 59 | 58 | 57 | 56 | 55 | 54 | 53 | 52 | 51 | 50 | 49 | 48 | 47 | 46 | 45 | | 44 | 43 | 42 | 41 |
| D: rem_selected_mode | | | 15 | | | | 14 | | | | 13 | | | | 12 | | | | | 11 | | | |
| E: rem_non_selected_mode | | | | 44 | 43 | 42 | | 41 | 40 | 39 | | 38 | 37 | 36 | | 35 | 34 | 33 | | | 32 | 31 | 30 |
| A: TYPE OF INTRA PREDICTION MODE (MODE NUMBER) | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
| B: MPM CANDIDATE (CANDMODELIST) | | | | | | | | | | | | | | | | | | | | | | | |
| C: RemIntraPredMode | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 |
| D: rem_selected_mode | 10 | | | | 9 | | | | 8 | | | | 7 | | | | 6 | | | | 5 | | |
| E: rem_non_selected_mode | | 29 | 28 | 27 | | 26 | 25 | 24 | | 23 | 22 | 21 | | 20 | 19 | 18 | | 17 | 16 | 15 | | 14 | 13 |
| A: TYPE OF INTRA PREDICTION MODE (MODE NUMBER) | 46 | 47 | 48 | 49 | 50 | 51 | 52 | 53 | 54 | 55 | 56 | 57 | 58 | 59 | 60 | 61 | 62 | 63 | 64 | 65 | 66 | | |
| B: MPM CANDIDATE (CANDMODELIST) | | | X | X | X | | | | | | | | | | | | | | | | | | |
| C: RemIntraPredMode | 17 | 16 | 15 | | | | 14 | 13 | 12 | 11 | 10 | 9 | 8 | 7 | 6 | 5 | 4 | 3 | 2 | 1 | 0 | | |
| D: rem_selected_mode | | 4 | | | | | | 3 | | | | 2 | | | | 1 | | | | | 0 | | |
| E: rem_non_selected_mode | 12 | | 11 | | | | 10 | 9 | | 8 | 7 | 6 | | 5 | 4 | 3 | | 2 | 1 | 0 | | | | extends. Then, the non-MPM parameter decoding unit 30423 associates the intra prediction mode along the extending direction of the long side of the target block in RemIntraPredMode, that is, the non-MPM parameter decoding unit 30423 associates the intra prediction mode of the vertical direction (35 to 66) in the direction illustrated in FIG. 12 if the target block is vertically long as shown in Table 4 with rem_selected_mode and rem_non_selected_mode with a smaller number than the intra prediction mode in the horizontal direction (2 to 34), and associates the intra prediction mode of the horizontal direction (2 to 34) in the direction illustrated in FIG. 12, if the target block is horizontally long, as illustrated in Table 2, with rem_selected_mode and rem_non_selected_mode with a smaller number than the intra prediction mode in the vertical direction (35 to 66).

As described above, the image decoding apparatus 31 (FIG. 5) includes an MPM candidate list deriving unit 30421 configured to derive an MPM candidate list including a candidate of a target intra prediction mode used for intra prediction of a target block, and a non-MPM parameter decoding unit 30423 which is not only a decoding unit configured to decode rem_selected_mode and rem_non_selected_mode which are parameters for deriving the target intra prediction mode in a case where the target intra prediction mode is not included in the MPM candidate list, but also a deriving unit configured to derive the target intra prediction mode by associating rem_selected_mode and rem_non_selected_mode with intra prediction modes which are not included in the MPM candidate list in an order according to a directionality in terms of the target block.
Effect of Association Between Rem Value and Intra Prediction Mode Number Based on Shape of Block rem_non_selected_mode is variable length coded. Also, in this variable length coding, the smaller rem_non_selected_mode is coded into a shorter code. For example, rem_non_selected_mode associated with "0" rather than rem_non_selected_mode associated with "44" is coded into a shorter code.

In a case where the block is vertically long, the non-MPM parameter decoding unit 30423 associates a smaller rem_non_selected_mode with an intra prediction mode number closer to 66, as illustrated in Table 4. At this time, the prediction direction of the block is highly likely to be the prediction direction corresponding to the intra prediction mode number closer to 66 (upper right) than 2 (lower left) in the direction illustrated in FIG. 12. In addition, in a case where the block is horizontally long, the non-MPM parameter decoding unit 30423 associates a smaller rem_non_selected_mode with an intra prediction mode number closer to 2 as illustrated in Table 2. At this time, the prediction direction of the block is highly likely to be the prediction direction corresponding to the intra prediction mode number closer to 2 (lower left) than 66 (upper right) in the direction illustrated in FIG. 12. Therefore, the non-MPM parameter decoding unit 30423 associates a prediction direction highly likely to be selected with a shorter code, thus the code amount can be reduced.

The coding process corresponding to the above-described decoding process is performed in the image coding apparatus 11 (FIG. 6). That is, the image coding apparatus 11 includes an MPM candidate list deriving unit 30421 configured to derive an MPM candidate list including a candidate of a target intra prediction mode used for intra prediction of a target block, and a non-MPM parameter deriving unit 11323 (FIG. 15) which is not only a coding unit configured to code rem_selected_mode and rem_non_selected_mode which are parameters for deriving the target intra prediction mode in a case where the target intra prediction mode is not included in the MPM candidate list, but also a deriving unit configured to code a target intra prediction mode by associating rem_selected_mode and rem_non_selected_mode with intra prediction modes which are not included in the MPM candidate list in the order according to a directionality in terms of the target block. As described above, in the coding processing, the MPM parameter deriving unit 11322 associates prediction directions with high possibility of being selected with shorter codes, thus the code amount can be reduced.

Embodiment 5

The present embodiment is different from the above embodiment in that the value of REM is associated with the intra prediction mode number based on a direction of the MPM. Note that, in the following embodiments, for convenience of description, members having the same functions as those already described are denoted by the same reference numerals, and description of them is omitted.
Correlation Between Rem Value Based on MPM Direction and Intra Prediction Mode Number The non-MPM parameter decoding unit 30423 associates the value of REM with the intra prediction mode number from the dominant side in the number of Vertical and horizontal directional prediction in the MPM. More specifically, if $C\_v > C\_h$, when the number of vertical prediction modes included in the MPM candidate list is $C\_v$ and the number of horizontal prediction modes is $C\_h$, the non-MPM parameter decoding unit 30423 associates the value of REM with the intra prediction mode number such that the value of RemIntraPredMode is set in descending order with respect to the intra prediction mode number from the upper right (66) in the direction illustrated in FIG. 12.

The fact that the MPM candidate list includes a lot of MPM in the vertical direction indicates that there are many prediction modes in the vertical direction around the target block. Therefore, even in a case where MPM is not used, it is expected that the prediction mode in the vertical direction is used.

In the determination of "vertical direction" and "horizontal direction", for example, the prediction modes corresponding to the mode numbers 2 to 34 are determined to be "horizontal direction" and the prediction modes corresponding to the mode numbers 35 to 66 are determined to be "vertical direction". However, it is not limited to this example, the range of the mode number corresponding to the prediction mode may be changed when determining the prediction mode to be vertical/horizontal depending on the shape of the block. For example, the diagonal line of the block may be used as a boundary when determining whether it is vertical or horizontal. Alternatively, as another example, a mode number included in a predetermined range in the vicinity of the horizontal (18) direction may be set to "horizontal direction", and a mode number included a predetermined range in the vicinity of the vertical (50) direction may be set to "vertical direction".

Specifically, for example, in a case where the MPM candidate list is {49, 18, 0, 1, 50, 51}, $C\_v=3$ and $C\_h=1$. Therefore, as illustrated in Table 4, the non-MPM parameter decoding unit 30423 associates RemIntraPredMode with the intra prediction mode number such that the value of RemIntraPredMode is set in descending order with respect to the intra prediction mode number from the upper right to the counterclockwise in the direction illustrated in FIG. 12.

Figure 38:
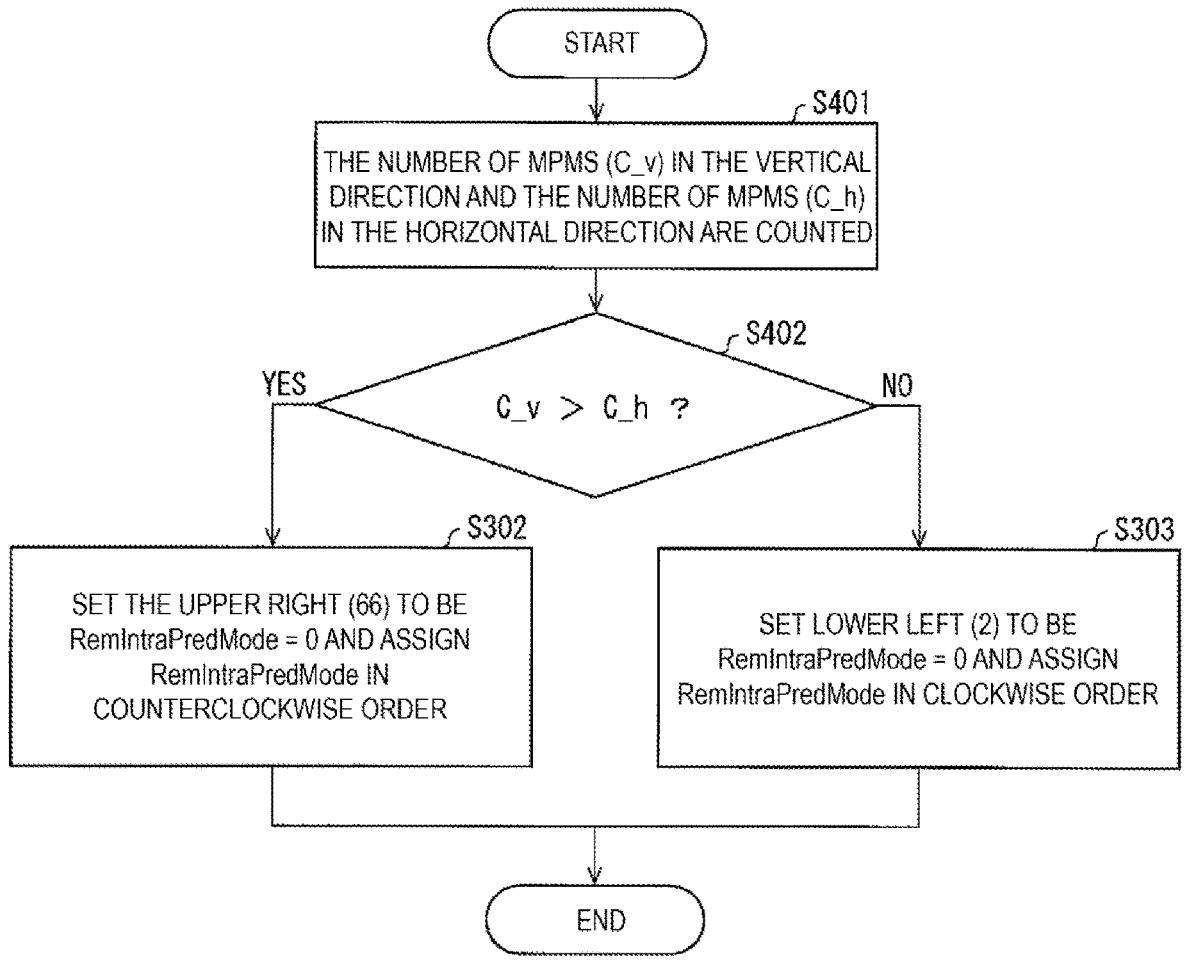
FIG. 38 is a flowchart illustrating the operation of associating the value of REM with the intra prediction mode number based on a direction of MPM by the non-MPM parameter decoding unit of the intra prediction parameter decoding unit illustrated in FIG. 16.

FIG. 38 is a flowchart illustrating the operation of associating the value of REM with the intra prediction mode number based on the direction of MPM by the non-MPM parameter decoding unit 30423 of the intra prediction parameter decoding unit 304 illustrated in FIG. 16. As illustrated in FIG. 38, in step S401, the non-MPM parameter decoding unit 30423 counts the MPM number (C_v) in the vertical direction and the MPM number (C_h) in the horizontal direction. In step S402, the non-MPM parameter decoding unit 30423 determines whether C_v>C_h. In a case where C_v>C_h (YES), step S302 is performed. In a case where C_v>C_h is not satisfied (NO), step S303 is performed.

As described above, the non-MPM parameter decoding unit 30423 associates rem_selected_mode and rem_non_selected_mode, which are parameters for deriving the intra prediction mode, with RemIntraPredMode which is an intra prediction mode not included in the MPM candidate list in the order according to a directionality in terms of the target block.

In the present embodiment, the directionality with respect to the target block means the prediction direction of the intra prediction mode included in the MPM candidate list.

Then, the intra prediction mode included in the MPM candidate list is divided into two direction groups. For example, in a case where the MPM candidate list is {49, 18, 0, 1, 50, 51}, excluding 0 and 1 which are the planar prediction modes, the intra prediction modes are divided into a first direction group composed of {49, 50, 51} of "vertical direction" and a second direction group of "{18}" of "horizontal direction". The number of intra prediction modes included in the first direction group is larger than the number of intra prediction modes included in the second direction group. In this example, the non-MPM parameter decoding unit 30423 associates the intra prediction mode corresponding to the first direction group, which is a direction group including more intra prediction modes in RemIntraPredMode, that is, the intra prediction mode of the vertical direction (35 to 66) in the direction illustrated in FIG. 12, with rem_selected_ mode and rem_non_ selected_mode having smaller numbers than intra prediction modes in the horizontal direction (2 to 34).

In addition, in an example in which the number of intra prediction modes included in the second directional group is greater than the number of intra prediction modes included in the first directional group, the non-MPM parameter decoding unit 30423 associates the intra prediction mode corresponding to the second direction group, which is a direction group including more intra prediction modes in RemIntraPredMode, that is, the intra prediction mode of the horizontal direction (2 to 34) in the direction illustrated in FIG. 12, with rem_selected_mode and rem_non_ selected_mode having smaller numbers than intra prediction modes in the vertical direction (35 to 66).

Effect of Associating the Value of REM Based on the Direction of MPM and Intra Prediction Mode Number rem_non_selected_mode is variable length coded. Also, in this variable length coding, the smaller rem_non_selected_mode is coded into a shorter code. In a case where the MPM candidate list includes more MPM in the vertical direction than MPM in the horizontal direction (C_v>C_h), the non-MPM parameter decoding unit 30423 associates the smaller rem_non_selected_mode with the intra prediction mode number closer to 66, as shown in Table 4. At this time, the prediction direction of the block is highly likely to be the prediction direction corresponding to the intra prediction mode number closer to 66 (upper right) than 2 (lower left) in the direction illustrated in FIG. 12. Also, in a case where the MPM candidate list does not include more MPM in the vertical direction than MPM in the horizontal direction (C_v<C_h), the non-MPM parameter decoding unit 30423 associates the smaller rem_non_selected_mode with the intra prediction mode number closer to 2, as shown in Table 2. At this time, the prediction direction of the block is highly likely to be the prediction direction corresponding to the intra prediction mode number closer to 2 (lower left) than 66 (upper right) in the direction illustrated in FIG. 12. Therefore, the non-MPM parameter decoding unit 30423 associates a prediction direction highly likely to be selected with a shorter code, thus the code amount can be reduced.

The coding processing corresponding to the above-described decoding processing is performed in the image coding apparatus 11. In the coding process, the MPM parameter deriving unit 11322 (FIG. 15) associates the prediction direction highly likely to be selected with the shorter code, thus the code amount can be reduced.

Embodiment 6

The present embodiment is different from the above embodiment in that the value of REM is associated with the intra prediction mode number based on a distance to the MPM.

Association Between the Value of Rem and Intra Prediction Mode Number Based on Distance to MPM The non-MPM parameter decoding unit 30423 associates the value of REM with the value of RemIntraPredMode in descending order wherein the absolute value of the difference of the intra prediction mode number between a certain intra prediction mode and the nearest MPM is small. Here, the "nearest MPM" means an MPM closest to a certain intra prediction mode number among a plurality of MPMs included in the MPM candidate list, in a case where paying attention to the certain intra prediction mode number. Then, the absolute value of the difference between the nearest MPM and the intra prediction mode number is referred to as "distance to the MPM". Note that the non-MPM parameter decoding unit 30423 does not set the MPM of the planar prediction mode (PLANAR and DC) included in the MPM candidate list as a target for determining the distance to MPM.

The non-MPM parameter decoding unit 30423 associates the RemIntraPredMode with the REM having the same distance to MPM, for example, from the lower left in the direction illustrated in FIG. 12 in clockwise (descending)/from the upper right to counterclockwise (ascending).

The correspondence based on the distance to the MPM of the present embodiment and the correspondence based on the shape of the block (1) described above may be combined. Also, the correspondence based on the distance to the MPM of the present embodiment and the correspondence based on the direction of MPM (2) described above may be combined. Furthermore, the correspondence based on the distance to the MPM of the present embodiment and the above (1) and (2) may be combined.

Figure 39:
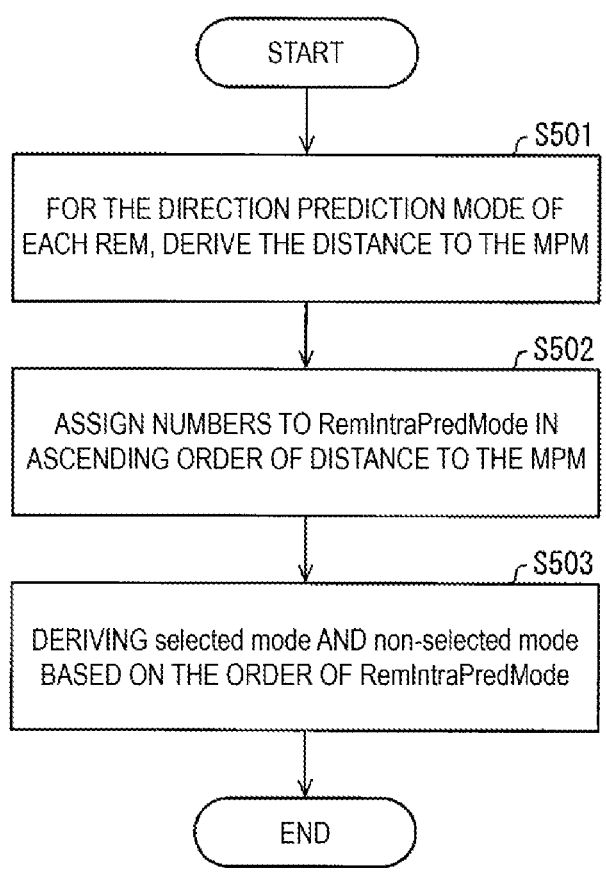
FIG. 39 is a flowchart illustrating the operation of associating the value of REM with the intra prediction mode number based on a distance to the MPM by the non-MPM parameter decoding unit of the intra prediction parameter decoding unit illustrated in FIG. 16.

FIG. 39 is a flowchart illustrating the operation of associating the value of REM with the intra prediction mode number based on the distance to the MPM by the non-MPM parameter decoding unit 30423 of the intra prediction parameter decoding unit 304 illustrated in FIG. 16. As illustrated in FIG. 39, in step S501, the non-MPM parameter decoding unit 30423 derives the distance to the MPM for each directional prediction mode. In step S502, the non-MPM parameter decoding unit 30423 assigns the RemIntraPredMode number to the REM in ascending order of the distance to the MPM. In step S503, the non-MPM parameter decoding unit 30423 derives rem_selected_mode and rem_non_selected mode based on the order of RemIntraPredMode.

TABLE 7

| A: TYPE OF INTRA PREDICTION MODE (MODE NUMBER) | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|
| B: MPM CANDIDATE (CANDMODELIST) | X | | | | | | | | | | | | | | | | X | | | | | X |
| C: DISTANCE TO MPM | 0 | 1 | 2 | 3 | 4 | 5 | 6 | 7 | 8 | 7 | 6 | 5 | 4 | 3 | 2 | 1 | 0 | 1 | 2 | 2 | 1 | 0 |
| D: RemIntraPredMode | | 0 | 8 | 16 | 22 | 28 | 34 | 40 | 46 | 41 | 35 | 29 | 23 | 17 | 9 | 1 | | 2 | 10 | 11 | 3 | |

| A: TYPE OF INTRA PREDICTION MODE (MODE NUMBER) | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|---|---|---|---|---|
| B: MPM CANDIDATE (CANDMODELIST) | | | | | | | | | | | | | | | | | | | | | | |
| C: DISTANCE TO MPM | 1 | 2 | 3 | 4 | 5 | 6 | 7 | 8 | 9 | 10 | 11 | 12 | 13 | 12 | 11 | 10 | 9 | 8 | 7 | 6 | 5 | 4 |
| D: RemIntraPredMode | 4 | 12 | 18 | 24 | 30 | 36 | 42 | 47 | 51 | 54 | 56 | 58 | 60 | 59 | 57 | 55 | 52 | 48 | 43 | 37 | 31 | 25 |

| A: TYPE OF INTRA PREDICTION MODE (MODE NUMBER) | 46 | 47 | 48 | 49 | 50 | 51 | 52 | 53 | 54 | 55 | 56 | 57 | 58 | 59 | 60 | 61 | 62 | 63 | 64 | 65 | 66 |
|---|---|---|---|---|---|---|---|---|---|---|---|---|---|---|---|---|---|---|---|---|---|
| B: MPM CANDIDATE (CANDMODELIST) | | | X | | | | | | | | | | | | | | | | | | |
| C: DISTANCE TO MPM | 3 | 2 | 1 | 0 | 1 | 2 | 3 | 4 | 5 | 6 | 7 | 8 | 9 | 8 | 7 | 6 | 5 | 4 | 3 | 2 | 1 |
| D: RemIntraPredMode | 19 | 13 | 5 | | 6 | 14 | 20 | 26 | 32 | 38 | 44 | 49 | 53 | 50 | 45 | 39 | 33 | 27 | 21 | 15 | 7 |

Specifically, in the case of the MPM candidate list={2, 49, 0, 1, 18, 23}, as illustrated in Table 5, the non-MPM parameter decoding unit 30423 derives the distance between each directional prediction mode which is the target REM and the MPM, and assigns the RemIntraPredMode number. As described above, the non-MPM parameter decoding unit 30423 associates RemIntraPredMode with each directional prediction mode, which is REM, in the order of the distance that is the base point (the intra prediction mode indicated by black in Table 5) of MPM.

More specifically, the non-MPM parameter decoding unit 30423 associates a smaller RemIntraPredMode, that is, a rem_non_selected mode with a shorter code, with an intra prediction mode has a smaller absolute value of the difference of the mode number between the directional prediction mode and MPM, that is, a smaller absolute value of an angle difference in prediction direction, among the directional prediction modes.

Elimination of Distribution Bias of Selected Mode

As described above, the selected mode is such that the remainder obtained by dividing RemIntraPredMode by 4 is 0. In the example shown in Table 5, since RemIntraPredMode 0, 8, and 16 to which mode numbers 3, 4, and 5 are assigned, are selected mode, the distribution of the selected mode is biased. As described above, when coding a selected mode having a biased distribution, coding efficiency may be lowered.

Therefore, the non-MPM parameter decoding unit 30423 selects the selected mode based on the RemIntraPredMode before shifting based on the distance to the MPM, that is, based on the RemIntraPredMode in the case where values are associated in order from the lower left of the directional prediction mode in the direction illustrated in FIG. 12 as shown in Table 6. Next, the non-MPM parameter decoding unit 30423 selects a directional prediction mode that is neither the MPM nor the selected mode as the non-selected_mode, and associates the values in ascending order of the distance to the MPM. With the above, distribution bias of the selected mode can be avoided.

Note that, since the value of RemIntraPredMode is not directly coded, the non-MPM parameter decoding unit 30423 does not necessarily need to derive the value of RemIntraPredMode. In this example, since the selected mode and the non-selected mode are derived in different ways, the non-MPM parameter decoding unit 30423 omits the derivation of RemIntraPredMode and directly derives the value of rem_non_selected_mode.

TABLE 8

| A: TYPE OF INTRA PREDICTION MODE (MODE NUMBER) | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|
| B: MPM CANDIDATE (CANDMODELIST) | X | | | | | | | | | | | | | | | | X | | | | | X |
| C: DISTANCE TO MPM | 0 | 1 | 2 | 3 | 4 | 5 | 6 | 7 | 8 | 7 | 6 | 5 | 4 | 3 | 2 | 1 | 0 | 1 | 2 | 2 | 1 | 0 |
| D: RemIntraPredMode BEFORE SHIFTING | | 0 | 1 | 2 | 3 | 4 | 5 | 6 | 7 | 8 | 9 | 10 | 11 | 12 | 13 | 14 | | 15 | 16 | 17 | 18 | |
| E: rem_selected_mode | | 0 | | | | 1 | | | | 2 | | | | 3 | | | | | | | | |
| F: rem_non_selected_mode | | | 5 | 11 | 16 | | 24 | 29 | 34 | | 25 | 21 | 17 | | 6 | 0 | | 1 | | 7 | 2 | |
| G: RemIntraPredMode | | 0 | 8 | 16 | 22 | 28 | 34 | 40 | 46 | 41 | 35 | 29 | 23 | 17 | 9 | 1 | | 2 | 10 | 11 | 3 | |

| A: TYPE OF INTRA PREDICTION MODE (MODE NUMBER) | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|---|---|---|---|---|
| B: MPM CANDIDATE (CANDMODELIST) | | | | | | | | | | | | | | | | | | | | | | |
| C: DISTANCE TO MPM | 1 | 2 | 3 | 4 | 5 | 6 | 7 | 8 | 9 | 10 | 11 | 12 | 13 | 12 | 11 | 10 | 9 | 8 | 7 | 6 | 5 | 4 |
| D: RemIntraPredMode BEFORE SHIFTING | 19 | 20 | 21 | 22 | 23 | 24 | 25 | 26 | 27 | 28 | 29 | 30 | 31 | 32 | 33 | 34 | 35 | 36 | 37 | 38 | 39 | 40 |

TABLE 8-continued

| F: rem_non_selected_mode | 3 | | 12 | 18 | 22 | | 30 | 35 | 38 | | 41 | 43 | 44 | | 42 | 40 | 39 | | 31 | 28 | 23 | |
|---|---|---|---|---|---|---|---|---|---|---|---|---|---|---|---|---|---|---|---|---|---|---|
| G: RemIntraPredMode | 4 | 12 | 18 | 24 | 30 | 36 | 42 | 47 | 51 | 54 | 56 | 58 | 60 | 59 | 57 | 55 | 52 | 48 | 43 | 37 | 31 | 25 |

| | | | | | | | | | | | | | | | | | | | | | | |
|---|---|---|---|---|---|---|---|---|---|---|---|---|---|---|---|---|---|---|---|---|---|---|
| E: rem_selected_mode | | 5 | | | | 6 | | | 7 | | | | 8 | | | | 9 | | | | | 10 |
| A: TYPE OF INTRA PREDICTION MODE (MODE NUMBER) | 46 | 47 | 48 | 49 | 50 | 51 | 52 | 53 | 54 | 55 | 56 | 57 | 58 | 59 | 60 | 61 | 62 | 63 | 64 | 65 | 66 | |
| B: MPM CANDIDATE (CANDMODELIST) | | | | X | | | | | | | | | | | | | | | | | | |
| C: DISTANCE TO MPM | 3 | 2 | 1 | 0 | 1 | 2 | 3 | 4 | 5 | 6 | 7 | 8 | 9 | 8 | 7 | 6 | 5 | 4 | 3 | 2 | 1 | |
| D: RemIntraPredMode BEFORE SHIFTING | 41 | 42 | 43 | | 44 | 45 | 46 | 47 | 48 | 49 | 50 | 51 | 52 | 53 | 54 | 55 | 56 | 57 | 58 | 59 | 60 | |
| E: rem_selected_mode | | | | | | 11 | | | | 12 | | | | 13 | | | | 14 | | | | 15 |
| F: rem_non_selected_mode | 13 | 8 | 4 | | | 9 | 14 | 19 | | 27 | 32 | 36 | | 37 | 33 | 28 | | 20 | 15 | 10 | | |
| G: RemIntraPredMode | 19 | 13 | 5 | | 6 | 14 | 20 | 26 | 32 | 38 | 44 | 49 | 53 | 50 | 45 | 39 | 33 | 27 | 21 | 15 | 7 | |

More specifically, in the case of the MPM candidate list={2, 49, 0, 1, 18, 23}, the non-MPM parameter decoding unit 30423 derives the distance to the MPM and assigns an intra prediction mode number to RemIntraPredMode, as shown in Table 6

Figure 40:
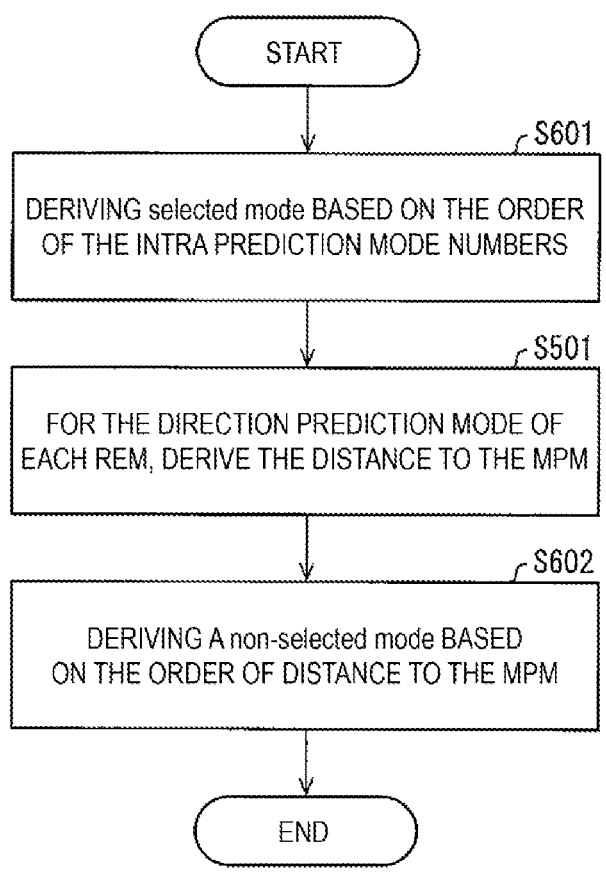
FIG. 40 is a flowchart illustrating another operation of associating the value of REM with the intra prediction mode number based on the distance to the MPM by the non-MPM parameter decoding unit of the intra prediction parameter decoding unit illustrated in FIG. 16.

FIG. 40 is a flowchart illustrating another operation of associating the value of REM with the intra prediction mode number based on the distance to the MPM by the non-MPM parameter decoding unit 30423 of the intra prediction parameter decoding unit 304 illustrated in FIG. 16. As illustrated in FIG. 40, in step S601, rem_selected_mode is derived based on the order of the intra prediction mode numbers. In step S602, the non-MPM parameter decoding unit 30423 derives rem_non_selecter_mode based on the order of distances from the MPM.

Derivation Method of Distance to MPM

As an example, the non-MPM parameter decoding unit 30423 can derive the distance from the MPM as follows.

(1) REM: A set of directional prediction modes other than MPM.

(2) MPM of directional prediction: A set of MPMs other than planar prediction mode (PLANAR and DC).

(3) Loop the following processing for each REM.

For the MPM of each directional prediction, derive the distance (the absolute value of the difference between the intra prediction mode numbers). However, in a case where the MPM is sorted with respect to the intra prediction mode number, since it is clear that other MPMs are farther than the immediately right and left MPM if they are derived for the immediately preceding MPM, respectively, in the counterclockwise (descending)/clockwise (ascending) order, a loop of processing for the other MPM may be omitted.

Select the minimum value among the derived distances.

As described above, the image decoding device 31 (FIG. 5) includes an MPM candidate list deriving unit 30421 configured to derive an MPM candidate list including candidates of the target intra prediction mode used for intra prediction of the target block, and a non-MPM parameter decoding unit 30423 which is not only a decoding unit configured to decode RemIntraPredMode which is a parameter for deriving the target intra prediction mode in a case where the target intra prediction mode is not included in the MPM candidate list, but also a deriving unit configured to derive the target intra prediction mode by associating rem_selected_mode and rem_non_selected_mode with intra prediction modes which are not included in the MPM candidate list and associating rem_non_selected_mode in the order in which the intra prediction mode included in the MPM candidate list is used as a base point.

Effect of Association Between REM Value and Intra Prediction Mode Number Based on Distance to MPM rem_non_selected_mode is variable length coded. Also, in this variable length coding, the smaller rem_non_selected_mode is coded into a shorter code. As illustrated in Table 6, the non-MPM parameter decoding unit 30423 associates a smaller rem_non_selected_mode with an intra prediction mode number closer to MPM (MPM candidate) included in the MPM candidate list. At this time, the prediction direction of the block is highly likely to be the prediction direction corresponding to the intra prediction mode number close to the MPM included in the MPM candidate list. Therefore, the non-MPM parameter decoding unit 30423 associates a prediction direction highly likely to be selected with a shorter code, thus the code amount can be reduced.

In the above description, the RemIntraPredMode is divided into the selected mode and the non-selected mode. However, the selected mode may be set to 0 such that the selected mode is not coded and decoded.

Specifically, first, as illustrated in FIG. 39, the non-MPM parameter decoding unit 30423 associates the value of REM with the intra prediction mode number based on the distance to the MPM. By executing the processing in step S501 and step S502 in FIG. 39, the non-MPM parameter decoding unit 30423 assigns the RemIntraPredMode number to the REM in ascending order of distance to the MPM. In this case, the process of step S503 is not performed. For example, in the case of the MPM candidate list={2, 49, 0, 1, 18, 23}, as illustrated in Table 7, the non-MPM parameter decoding unit 30423 associates each directional prediction mode, with the RemIntraPredMode number ordered by the distance to the MPM.

Next, N-bit fixed-length codes are allocated to 2^N intra prediction modes in ascending order of RemIntraPredMode, and variable length codes are allocated to the remaining intra prediction modes by the methods described. Here, N is a positive integer.

Alternatively, for all intra prediction modes corresponding to RemIntraPredMode, a variable length code may be assigned in the manner described so far, starting with a small value of RemIntraPredMode. In this case, among the non-selected modes, a part of the prediction direction with a higher possibility of being selected may be associated with a shorter code.

By processing in this way, short codes can be assigned to the intra prediction mode in which the distance to the MPM is close with a high occurrence frequency, thus the code amount can be reduced.

The coding process corresponding to the above-described decoding process is performed in the image coding apparatus 11 (FIG. 6). That is, the image coding apparatus 11 includes an MPM candidate list deriving unit 30421 configured to derive an MPM candidate list including candidates of the target intra prediction mode used for intra prediction of the target block, and a non-MPM parameter deriving unit 11323 (FIG. 15) which is not only a coding unit configured to code RemIntraPredMode which are parameters for deriving the target intra prediction mode in a case where the target intra prediction mode is not included in the MPM candidate list, but also a deriving unit configured to derive a target intra prediction mode by associating rem_selected_mode and rem_non_selected_mode with intra prediction modes which are not included in the MPM candidate list and associating rem_non-selected_mode in the order of the intra prediction mode included in the MPM candidate list as the base point. As described above, in the coding processing, the MPM parameter deriving unit 11322 associates prediction directions with high possibility of being selected with shorter codes, thus the code amount can be reduced.

Other

Note that the image coding apparatus 11 and the image decoding apparatus 31 in the above-described embodiment, for example, the entropy decoding unit 301, the prediction parameter decoding unit 302, the loop filter 305, the prediction image generation unit 308, the inverse quantization/inverse DCT Unit 311, an addition unit 312, a prediction image generation unit 101, a subtraction unit 102, a DCT/quantizing unit 103, an entropy coding unit 104, an inverse quantization/inverse DCT unit 105, a loop filter 107, a coding parameter determination unit 110, the prediction parameter coding unit 111, and the blocks included in each unit may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either of the image coding apparatus 11 or the image decoding apparatus 31, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Additionally, part or all of the image encoding apparatus 11 and the image decoding apparatus 31 in the above-described embodiments may be realized as an integrated circuit such as an Large Scale Integration (LSI). Each of the functional blocks of the image encoding device 11 and the image decoding device 31 may be individually implemented as a processor or a part or the whole of them may be integrated into a processor. The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, an integrated circuit may use depending on the technology.

Application Example

The image coding apparatus 11 and the image decoding apparatus 31 described above can be used by being mounted in various apparatuses for performing transmitting, receiving, recording, and reproducing videos. Note that, the video may be a natural video captured by a camera or the like, or may be an artificial video (including CG and GUI) generated by a computer or the like.

Figure 8A:
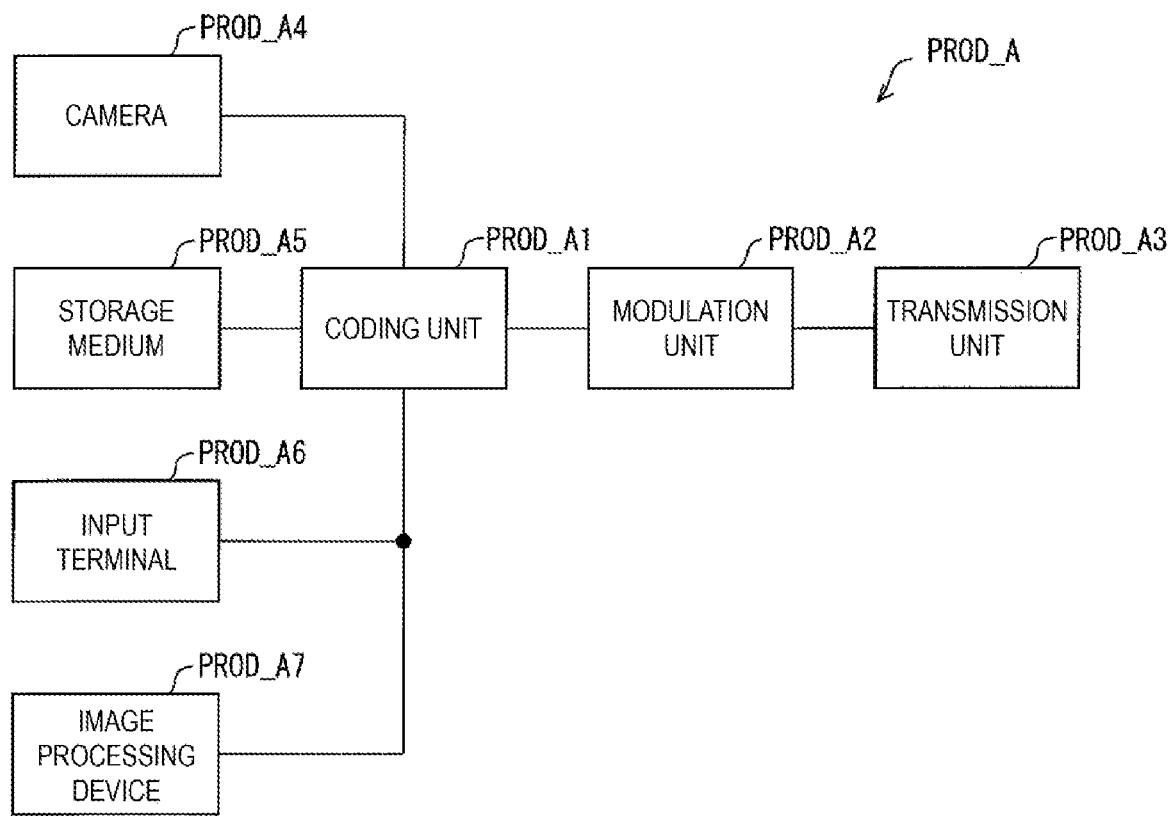
FIGS. 8A and 8B are diagrams illustrating a configuration of a transmission device provided with the image coding apparatus and a reception device provided with the image decoding apparatus according to the embodiment 1.
Figure 8B:
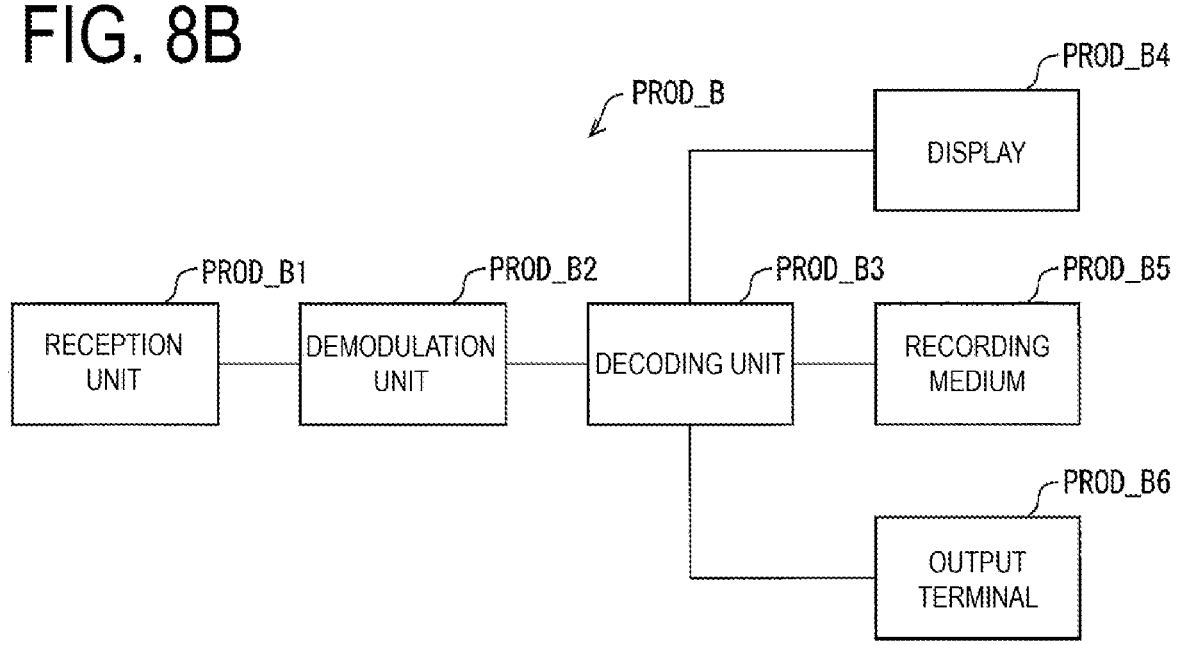

First, it is described by referring to FIGS. 8A and 8B that the image coding apparatus 11 and the image decoding apparatus 31 described above can be used for transmission and reception of videos.

FIG. 8A is a block diagram illustrating the configuration of the transmission apparatus PROD_A mounted with the image coding apparatus 11. As illustrated FIG. 8A, the transmission apparatus PROD_A includes a coding unit PROD_A1 configured to obtain coding data by coding a video, a modulation unit PROD_A2 configured to obtain a modulated signal by modulating a carrier wave with the coding data obtained by the coding section PROD_A1, and a transmission unit PROD_A3 configured to transmit the modulation signal obtained by the modulation unit PROD_A2. The above-described image coding apparatus 11 is used as the coding unit PROD_A1.

The transmission apparatus PROD_A, as a supply source of a video input to the coding unit PROD_A1, may further include a camera PROD_A4 configured to capture the video, a recording medium PROD_A5 configured to record the video, an input terminal PROD_A6 configured to input the video, and an image processing unit PROD_A7 configured to generate or process an image. In FIG. 8A, a configuration in which all of these are provided in the transmission apparatus PROD_A is illustrated, but a part thereof may be omitted.

Note that the recording medium PROD_A5 may be one in which a video not coded is recorded, and may be a recording of a video coded by a coding method for recording different from the coding method for transmission. In the latter case, a decoding unit (not illustrated) may be interposed between the recording medium PROD_A 5 and the coding unit PROD_A 1 to decode the coding data read from the recording medium PROD_A 5 according to the coding scheme for recording.

FIG. 8B is a block diagram illustrating the configuration of the reception device PROD_B mounted with the image decoding apparatus 31. As illustrated in FIG. 8B, the receiving device PROD_B includes a reception unit PROD_B1 configured to receive the modulation signal, a demodulation unit PROD_B2 configured to obtain the coding data by demodulating the modulation signal received by the reception unit PROD_B1, and a decoding unit PROD_B3 configured to obtain a video by decoding the coding data obtained by the unit PROD_B2. The above-described image coding apparatus 31 is used as the decoding unit PROD_B3.

The receiving device PROD_B, as a supply source of a video output to the decoding unit PROD_B3, may further include a display PROD_B4 configured to display the video, a recording medium PROD_B5 configured to record the video, and an output terminal PROD_B6 configured to output the video to the outside. In FIG. 8B, a configuration in which all of these are provided in the reception apparatus PROD_A is illustrated, but a part thereof may be omitted.

Note that the recording medium PROD_B5 may be one in which a video not coded for recording, and may be coded by a coding method for recording different from the coding method for transmission. In the latter case, a coding unit (not illustrated) configured to codes the video acquired from the decoding unit PROD_B3 according to the coding method for recording may be interposed between the decoding unit PROD_B3 and the recording medium PROD_B5.

Note that the transmission medium for transmitting the modulated signal may be wireless or wired. Further, the transmission mode of transmitting the modulated signal may be broadcasting (in this case, a transmission mode in which a transmission destination is not specified in advance), or may be communication (in this case, a transmission mode in which a transmission destination is specified in advance). That is, the transmission of the modulated signal may be realized by any of radio broadcast, cable broadcast, wireless communication, and wired communication.

For example, a terrestrial digital broadcasting broadcast station (broadcasting facility, and the like)/receiving station (television receiver, and the like) is an example of a transmission apparatus PROD_A/reception apparatus PROD_B that transmits and receives modulated signals by radio broadcasting. Further, a cable TV broadcasting broadcast station (broadcasting facility, and the like)/receiving station (television receiver, and the like) is an example of a transmitting apparatus PROD_A/reception apparatus PROD_B that transmits and receives modulated signals by cable broadcasting.

In addition, server (workstations and the like)/client (television receiver, personal computer, smart phone, and the like) such as Video On Demand (VOD) service and video sharing service using the Internet is an example of the transmission apparatus PROD_A/reception apparatus PROD_B that transmits and receives modulated signals by communication (normally, either a wireless or a wired is used as a transmission medium in the LAN, and wired is used as a transmission medium in the WAN). Here, the personal computer includes a desktop PC, a laptop PC, and a tablet PC. In addition, the smartphone includes multifunctional mobile phone terminal.

Note that the client of the video sharing service has a function to decode the coding data downloaded from the server and display it on the display, and to code the video captured by the camera and upload it to the server. That is, the client of the video sharing service has functions of both the transmission apparatus PROD_A and the reception apparatus PROD_B.

Figure 9A:
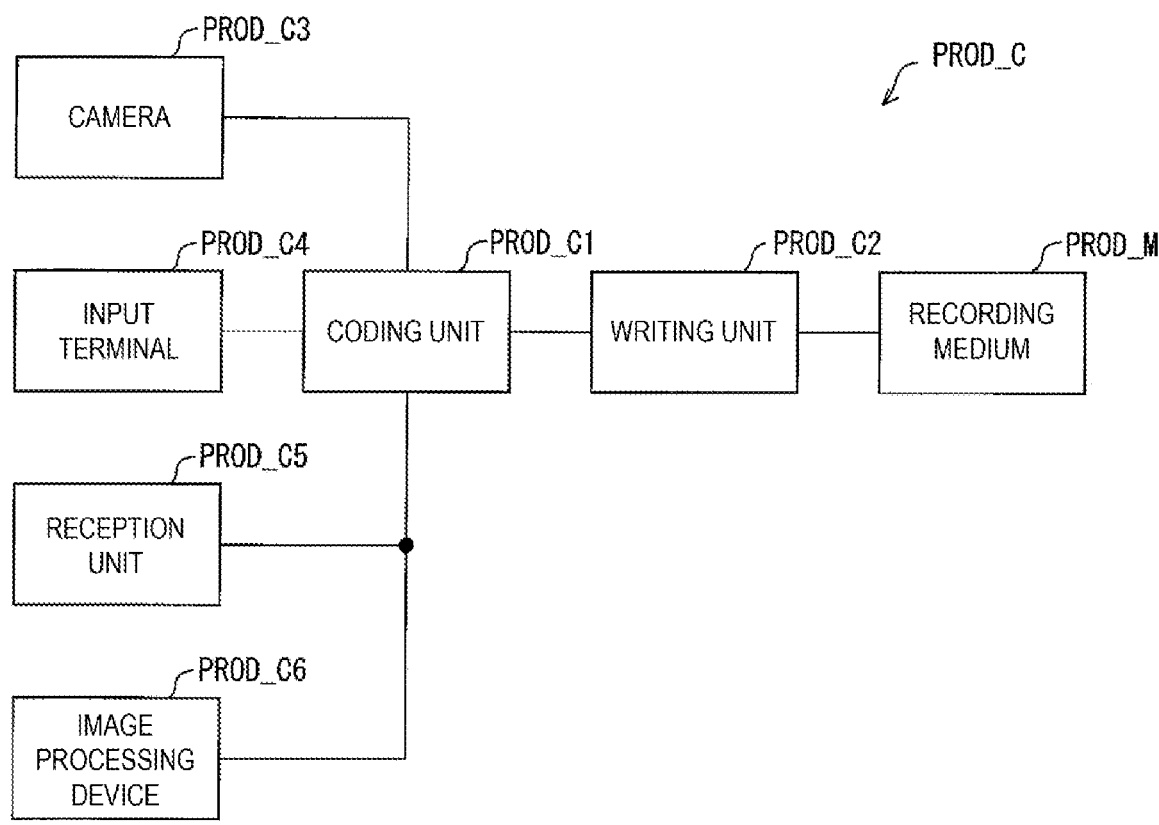
FIGS. 9A and 9B are diagrams illustrating a configuration of a recording device provided with the image coding apparatus and a playback device provided with the image decoding apparatus according to the embodiment 1.
Figure 9B:
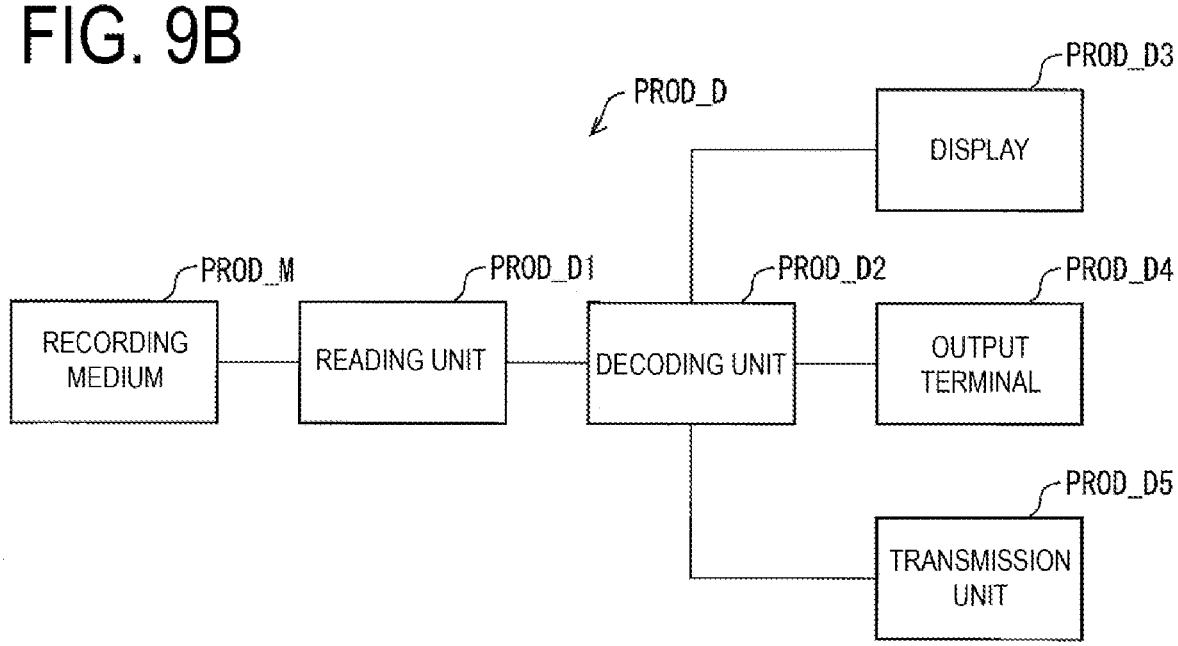

Next, it is described by referring to FIGS. 9A and 9B that the image coding apparatus 11 and the image decoding apparatus 31 described above can be used for recording and playback of videos.

FIG. 9A is a block diagram illustrating the configuration of a recording apparatus PROD_C mounted with the image coding apparatus 11. As illustrated FIG. 9A, the recording apparatus PROD_C includes a coding unit PROD_C1 configured to obtain coding data by coding a video, a writing unit PROD_C2 configured to write the coding data obtained by the coding unit PROD_C1 into a recording medium PROD_M. The above-described image coding apparatus 11 is used as the coding unit PROD_C1.

Note that the recording medium PROD_M may be a type connected to the recording apparatus PROD_C, such as (1) a Hard Disk Drive (HDD) or a Solid State Drive (SSD), or (2) an SD memory card Or a Universal Serial Bus (USB) flash memory, or may be loaded in a drive device (not illustrated) built in the recording apparatus PROD_C, such as (3) a Digital Versatile Disc (DVD) or a Blu-ray Disc (BD, registered trademark).

The recording device PROD_C, as a supply source of a video input to the coding unit PROD_C1, may further include a camera PROD_C3 configured to capture the video, an input terminal PROD_C4 configured to input the video, a reception unit PROD_C5 configured to receive the video, and an image processing unit PROD_C6 configured to generate or process an image. In FIG. 9A, a configuration in which all of these are provided in the recording apparatus PROD_C is illustrated, but a part thereof may be omitted.

Note that the reception unit PROD_C5 may receive an uncoded video and may receive coding data coded by a coding method for transmission different from the coding method for recording. In the latter case, a transmission decoding unit (not illustrated) for decoding the coding data coded by the coding method for transmission may be interposed between the reception unit PROD_C5 and the coding unit PROD_C1.

Examples of such a recording apparatus PROD_C include a DVD recorder, a BD recorder, a Hard Disk Drive (HDD) recorder, and the like (in this case, the input terminal PROD_C4 or the reception unit PROD_C5 is a main supply source of video). In addition, a camcorder (in this case, the camera PROD_C3 is the main supply source of video), a personal computer (in this case, the reception unit PROD_C5 or the image processing unit C6 is a main supply source of video), a smartphone, The camera PROD_C3 or the reception unit PROD_C5 is a main supply source of video), and the like are examples of such a recording device PROD_C.

FIG. 9B is a block diagram illustrating the configuration of a playback apparatus PROD_D mounted with the image decoding apparatus 31. As illustrated in FIG. 9B, the playback apparatus PROD_D includes a reading section PROD_D1 configured to read coding data written in a recording medium PROD_M, and a decoding unit PROD_D2 configured to obtain a video by decoding the coding data read by the reading unit PROD_D1. The above-described image coding apparatus 31 is used as the decoding unit PROD_D2.

Note that the recording medium PROD_M may be a type built in the playback apparatus PROD_D, such as (1) HDD, SSD, and the like, or may be a type connected to the playback apparatus PROD_D, such as (2) an SD memory card or a USB flash memory, or may be a type loaded in a drive device (not illustrated) built in the playback device PROD_D, such as (3) DVD, BD and the like.

In addition, the playback device PROD_D, as a supply source of a video output to the decoding unit PROD_D3, may further include a display PROD_D3 configured to display the video, an output terminal PROD_D4 configured to output the video to the outside, and a transmission unit PROD_D5 configured to transmit a video. In FIG. 9B, a configuration in which all of these are provided in the playback apparatus PROD_D is illustrated, but a part thereof may be omitted.

Note that the transmission unit PROD D5 may transmit an uncoded video and may transmit coding data coded by a coding method for transmission different from the coding method for recording. In the latter case, a coding unit (not illustrated) configured to codes the video according to the coding method for transmission may be interposed between the decoding unit PROD_D2 and the transmission PROD_D5.

Examples of such a playback device PROD_D include a DVD player, a BD player, an HDD player, and the like (in this case, the output terminal PROD_D4 to which a television receiver or the like is connected is a main supply source of video). In addition, a television receiver (in this case, the display PROD_D3 is a main supply source of video), a digital signage (also referred to as an electronic signage or an electronic bulletin board, the display PROD_D3 or the transmission unit PROD_D5 is the main supply of video), a desktop type PC (In this case, the output terminal PROD_D4 or the transmission unit PROD_D5 is the main supply source of video), a laptop type or tablet type PC (in this case, the display PROD_D3 or the transmission unit PROD_D5 is the main supply source of video), a smartphone (in this case, the display PROD_D3 or the transmission unit PROD_D5 is the main supply source of video), and the like are examples of such a playback device PROD_D.

Hardware Realization and Software Realization

Further, the blocks of the image decoding apparatus 31 and the image coding apparatus 11 described above may be realized by hardware using a logic circuit formed on an integrated circuit (IC chip), or may be realized by software using a Central Processing Unit (CPU).

In the latter case, each of the above-described apparatuses may include a CPU configured to perform commands of a program for realizing the functions, a Read Only Memory (ROM) in which the program is stored, a Random Access Memory (RAM) in which the program is loaded, and a storage device (recording medium) such as a memory for storing the program and various data, and the like. The object of the embodiments of the disclosure is achieved by supplying a recording medium, which records program code of a control program (executable program, intermediate code program, supply source program) of each of the above-described apparatuses, to each of the above-described apparatuses, and by reading and performing the program code recorded on the recording medium, wherein each of the above-described apparatuses is software that realizes the above-described functions.

Examples of the recording medium include tape such as a magnetic tape and a cassette tape, disk including magnetic disk such as a floppy (registered trademark) disk/hard disk, and optical disk such as a Compact Disc Read-Only Memory (CD-ROM)/Magneto-Optical disc Disk (MO disk)/Mini Disc (MD)/Digital Versatile Disc (DVD)/CD Recordable (CD-R)/Blu-ray Disc (registered trademark), card such as IC card (including memory card)/optical card, semiconductor memory such as mask ROM/Erasable Programmable Read-Only Memory (EPROM)/Electrically Erasable Read-Only Memory (EEPROM, registered trademark)/flash ROM, and logic circuit such as Programmable Logic Device (PLD) and Field Programmable Gate Array (FPGA), and the like.

Further, each of the above devices may be configured to be connectable to a communication network, and the program code may be supplied via a communication network. The communication network is not particularly limited as long as it can transmit the program code. For example, the Internet, Intranet, Extranet, LAN (Local Area Network), ISDN (Integrated Services Digital Network), VAN (Value-Added Network), CATV (Community Antenna television/Cable Television) communication network, Virtual Private Network, telephone network, mobile communication network, satellite communication network, and the like can be used. In addition, the transmission medium constituting the communication network may be a medium capable of transmitting the program code, and is not limited to a specific configuration or type. For example, wired such as Institute of Electrical and Electronic Engineers (IEEE) 1394, USB, power line carrier, cable TV line, telephone line, Asymmetric Digital Subscriber Line (ADSL), infrared light such as Infrared Data Association (IrDA), remote control, and wireless such as BlueTooth (registered trademark), IEEE 802.11 radio, High Data Rate (HDR), Near Field Communication (NFC), Digital Living Network Alliance (DLNA, Registered Trademark), mobile phone network, satellite line, terrestrial digital broadcasting network, and the like can be used. The embodiment of the disclosure can also be realized in the form of a computer data signal embedded in a carrier wave in which the program code is embodied by electronic transmission.

Supplemental Note

The embodiment of the disclosure is not limited to each of the above-described embodiments. It is possible to make various modifications within the scope of the claims. Embodiments obtained by appropriately combining technical elements disclosed in different embodiments falls also within the technical scope of the disclosure. Further, when technical elements disclosed in the respective embodiments are combined, it is possible to form a new technical feature.

CROSS-REFERENCE OF RELATED APPLICATION

The present application claims priority based on Japanese patent application No. 2016-166320 filed on Aug. 26, 2016, and Japanese Patent Application No. 2016-188789 filed on Sep. 27, 2016, all of the contents of which are incorporated herein by reference.

INDUSTRIAL APPLICABILITY

Embodiments of the disclosure can be suitably applied to an image decoding apparatus that decodes coding data in which image data is coded, and an image coding apparatus that generates coding data in which image data is coded. Further, the disclosure can be suitably applied to a data structure of coding data generated by an image coding apparatus and referred to by an image decoding apparatus.

REFERENCE SIGNS LIST

11 Image coding apparatus
31 Image decoding apparatus
1131 Intra prediction parameter coding control unit
3041 Intra prediction parameter decoding control unit
11322 MPM parameter deriving unit (parameter deriving unit)

The invention claimed is:

1. An image decoding apparatus configured to use a binary tree division in addition to a quad tree division when dividing a picture and decode the picture, the image decoding apparatus comprising:
an intra prediction parameter decoding control unit configured to change a first association between a plurality of prediction directions and a plurality of mode indices in an intra prediction mode into a second association based on a shape of a block; and
a prediction image generation unit configured to generate a prediction image by referring to the plurality of mode indices and the second association,
wherein the intra prediction parameter decoding control unit changes a number of first portions of the plurality of prediction directions based on the shape of the block to generate a plurality of changed prediction directions for determining the second association based on the plurality of changed prediction directions, wherein the plurality of prediction directions directed toward a first direction region are the first portions of the plurality of prediction directions.

2. An image coding apparatus configured to use a binary tree division in addition to a quad tree division when dividing a picture and decode the picture, the image coding apparatus comprising:

an intra prediction parameter decoding control unit configured to change a first association between a plurality of prediction directions and a plurality of mode indices in an intra prediction mode into a second association based on a shape of a block; and a prediction image generation unit configured to generate a prediction image by referring the plurality of mode indices and the second association, wherein the intra prediction parameter decoding control unit changes a number of first portions of the plurality of prediction directions based on the shape of the block to generate a plurality of changed prediction directions for determining the second association based on the plurality of changed prediction directions, wherein the plurality of prediction directions directed toward a first direction region are the first portions of the plurality of prediction directions.

3. The image decoding apparatus of claim 1, wherein the first direction region is arranged between a lower left direction and a upper left direction of the block when a width of the block is greater than a height of the block.

4. The image decoding apparatus of claim 3, wherein the lower left direction is a first direction of 45 degrees from the top-right to the bottom-left and the upper left direction is a second direction of 45 degrees from the bottom-right to the top-left.

5. The image decoding apparatus of claim 1, wherein the first direction region is arranged between a upper right direction and a upper left direction of the block when a width of the block is less than a height of the block.

6. The image decoding apparatus of claim 5, wherein the upper right direction is a first direction of 45 degrees from the bottom-left to the top-right and the upper left direction is a second direction of 45 degrees from the bottom-right to the top-left.

7. The image decoding apparatus of claim 1, wherein the intra prediction parameter decoding control unit changes a number of second portions of the plurality of prediction directions to generate the plurality of changed prediction directions based on the shape of the block and determines the second association based on the plurality of changed prediction directions, wherein the plurality of prediction directions directed toward a second direction region are the second portions of the plurality of prediction directions.

8. The image decoding apparatus of claim 7, wherein the second direction region is arranged in a right side of a upper left direction of the block when a width of the block is greater than a height of the block.

9. The image decoding apparatus of claim 7, wherein the second direction region is arranged below a upper left direction of the block when a width of the block is less than a height of the block.

10. The image decoding apparatus of claim 7, wherein the number of the second portions of the plurality of prediction directions is decreased when the number of the first portions of the plurality of prediction directions is increased based on the shape of the block.

11. The image decoding apparatus of claim 7, wherein the number of the second portions of the plurality of prediction directions is increased when the number of the first portions of the plurality of prediction directions is decreased based on the shape of the block.

12. The image decoding apparatus of claim 1, wherein a number of the plurality of prediction directions is equal to a number of the plurality of changed prediction directions.

* * * * *